(12) United States Patent
Lee

(10) Patent No.: US 12,542,275 B2
(45) Date of Patent: Feb. 3, 2026

(54) BILAYER-STRUCTURED SILICON CARBON COMPOSITE ANODE MATERIAL, PREPARATION METHOD THEREOF AND SECONDARY BATTERY COMPRISING THE SAME

(71) Applicant: LEMON ENERGY INC., Incheon (KR)

(72) Inventor: Si Hyun Lee, Incheon (KR)

(73) Assignee: LEMON ENERGY INC., Incheon (KR)

( * ) Notice: Subject to any disclaimer, the term of this patent is extended or adjusted under 35 U.S.C. 154(b) by 501 days.

(21) Appl. No.: 18/100,638

(22) Filed: Jan. 24, 2023

(65) Prior Publication Data

US 2023/0238517 A1  Jul. 27, 2023

(30) Foreign Application Priority Data

Jan. 25, 2022  (KR) .................. 10-2022-0010663
Feb. 24, 2022  (KR) .................. 10-2022-0024473

(51) Int. Cl.
| | |
|---|---|
| H01M 4/36 | (2006.01) |
| H01M 4/04 | (2006.01) |
| H01M 4/38 | (2006.01) |
| H01M 4/583 | (2010.01) |
| H01M 10/0525 | (2010.01) |
| H01M 4/02 | (2006.01) |

(52) U.S. Cl.
CPC ......... *H01M 4/366* (2013.01); *H01M 4/0471* (2013.01); *H01M 4/364* (2013.01); *H01M 4/386* (2013.01); *H01M 4/583* (2013.01); *H01M 10/0525* (2013.01); *H01M 2004/027* (2013.01)

(58) Field of Classification Search
None
See application file for complete search history.

(56) References Cited

U.S. PATENT DOCUMENTS

2010/0176337 A1* 7/2010 Zhamu .................. H01M 4/587
977/734

FOREIGN PATENT DOCUMENTS

| KR | 10-2014-0085822 A | 7/2014 |
|---|---|---|
| KR | 10-2185490 B1 | 12/2020 |
| KR | 10-2271632 B1 | 7/2021 |

* cited by examiner

*Primary Examiner* — Carlos Barcena
(74) *Attorney, Agent, or Firm* — Schmeiser, Olsen & Watts LLP

(57) ABSTRACT

A bilayer-structured silicon carbon composite anode material, a method of preparing the same, and a secondary battery including the same is provided. The method of preparing the anode material includes: drying a first mixture including graphite balls, a nano-silicon slurry, pitch, and flake graphite to prepare a dried product; sintering the dried product to prepare a sintered product including a hard coating layer formed on an outermost surface thereof and containing amorphous hard carbon; mixing the sintered product with a carbon precursor, followed by heat treatment to form a soft coating layer on an outer circumferential surface of the sintered product; and forming a carbon nanotube layer on an outer circumferential surface of the soft coating layer.

20 Claims, 9 Drawing Sheets

BILAYER-STRUCTURED SILICON CARBON COMPOSITE ANODE MATERIAL, PREPARATION METHOD THEREOF AND SECONDARY BATTERY COMPRISING THE SAME

CROSS-REFERENCE TO RELATED APPLICATION

This application claims priority to Korean Patent Application No. 10-2022-0010663, having a filing date of Jan. 25, 2022, and Korean Patent Application No. 10-2022-0024473, having a filing date of Feb. 24, 2022, the entire contents both of which are incorporated herein by reference.

FIELD OF TECHNOLOGY

The following relates to a bilayer-structured silicon carbon composite anode material, a preparation method thereof, and a secondary battery including the same.

BACKGROUND

Currently, generation of greenhouse gas including carbon dioxide and the like and global temperature rise due to the use of fossil energy are of serious concern. Regulation on emission of carbon dioxide is strengthened in countries around the world and introduction of electric vehicles using electricity as a power source is rapidly increasing to replace internal combustion vehicles driven by fossil fuels as a power source. Secondary batteries are essential parts of electric vehicles to supply electricity thereto and can be repeatedly used through charging, unlike primary batteries used once and discarded. In addition to the electric vehicles, the secondary batteries are used in various fields, such as notebook PCs, mobile devices, vertical take-off/landing aircraft used for Urban Air Mobility (UAM), and electric storage systems. In recent years, demand for high-capacity, low-weight, and high-efficiency secondary batteries has increased with industrial development and research for development of such secondary batteries has been actively conducted.

Representative secondary batteries include lead storage batteries, nickel-cadmium batteries, and lithium-ion secondary batteries. Among these secondary batteries, the lithium secondary batteries generate electrical energy through intercalation and deintercalation of lithium ions (Li+) during charging/discharging, and have light weight and high energy density to be used in various fields, such as electric vehicles and the like.

The lithium secondary battery includes a cathode; an anode; an electrolyte disposed between the cathode and the anode; and a separator embedded in the electrolyte, in which each of the cathode and the anode includes active materials on a current collector. In the lithium secondary battery, a cathode material includes a lithium transition metal oxide and determines capacity and average voltage of the lithium ion battery as a lithium ion source, and an anode material stores and releases lithium ions emitted from the cathode to allow electric current to flow through an external circuit. The electrolyte acts as a medium for movement of lithium ions between the cathode and the anode inside the secondary battery.

In a typical lithium-ion battery, crystalline carbon materials or amorphous carbon materials, such as natural graphite and artificial graphite, are used as the anode materials.

In recent years, silicon (Si) has attracted attention as an anode material instead of carbon. Since graphite used as the anode material in the art can store 1 lithium ion per 6 carbon atoms, whereas silicon (Si) can store 4.4 lithium ions per atom, silicon has advantages of a higher energy density than graphite and a very fast charge/discharge rate.

However, a silicon anode material has a problem of low structural stability. In the lithium-ion battery, the anode material undergoes anode volume expansion (lithiation) in the course of storing lithium ions. That is, graphite allows a volume expansion of about 10% to 20%, whereas silicon (Si) allows a large volume expansion of 4 to 5 times through reaction of 4.4 lithium ions per silicon to form $Li_{22}Si_5$ alloys. In particular, the silicon anode material has high crystal brittleness and thus can suffer from pulverization (particle cracking, destruction) and electrical separation from the current collector (Cu electrode plate) during repeated charging/discharging of the lithium-ion battery, causing rapid capacity decay and decrease in lifespan of the lithium ion battery.

In addition, the silicon anode material has a problem of rapid deterioration in efficiency due to change in an interface state between the anode material, the electrolyte, and the electrode. This is caused by generation of numerous lithium traps when silicon particles are broken due to expansion of the anode material during charging of the secondary battery. More specifically, since a solid electrolyte interphase (SEI) layer can be easily broken by mechanical stress during expansion of the silicon particles, a large amount of the SEI layer is formed on outer circumferential surfaces of the silicon particles to reduce a gap between the silicon particles when destruction and regeneration of the SEI layer is repeated during charging/discharging of the secondary battery, thereby causing deterioration in electrical contact between the silicon particles and a lithium trap phenomenon. The SEI layer is a protective film formed on an outer circumferential surface of the active material upon reaction of the electrolyte with the active material of the electrode and has high lithium ion conductivity despite low electron mobility, thereby providing a passage through which lithium ions move between the electrolyte and the anode material. Since graphite allows a small volume change, there is no problem with the SEI layer. However, since silicon expands to the extent of destroying the SEI layer during charging of the secondary battery, lithium is consumed by lithiation of the silicon particles and a gas is generated. As a result, the SEI layer gradually hardens and becomes thicker, preventing lithium ions from having access to the electrode and causing reduction in battery life through restriction of oxidation-reduction reaction of lithium.

Therefore, studies are being actively conducted to prevent breakage of the anode material during charging/discharging of the secondary battery and to prevent reduction in energy capacity through improvement in structural stability of the silicon anode material.

The background technique of embodiments of the present invention are disclosed in Korean Patent Registration No. 10-2185490 (Issue date: Dec. 2, 2020, Title: Silicon oxide composite anode material for non-aqueous electrolyte secondary battery and preparation method thereof).

SUMMARY

An aspect relates to a method of preparing a bilayer-structured silicon carbon composite anode material that has good durability and structural stability.

It is another aspect of embodiments of the present invention to provide a method of preparing a bilayer-structured silicon carbon composite anode material that can prevent destruction of the anode material and reduction in energy capacity through minimization of volume expansion due to intercalation of lithium ions during charging/discharging of a battery.

It is a further aspect of embodiments of the present invention to provide a method of preparing a bilayer-structured silicon carbon composite anode material that exhibits high capacity, high output and long lifespan characteristics and has good initial efficiency.

It is yet another aspect of embodiments of the present invention to provide a method of preparing a bilayer-structured silicon carbon composite anode material that has good productivity and economic feasibility.

It is yet another aspect of embodiments of the present invention to provide a bilayer-structured silicon carbon composite anode material prepared by the method of preparing a bilayer-structured silicon carbon composite anode material.

It is yet another aspect of embodiments of the present invention to provide a secondary battery including the bilayer-structured silicon carbon composite anode material.

One aspect of embodiments of the present invention relates to a method of preparing a bilayer-structured silicon carbon composite anode material. In one embodiment, the method of preparing the anode material includes: drying a first mixture comprising graphite balls, a nano-silicon slurry, pitch, and flake graphite to prepare a dried product; sintering the dried product to prepare a sintered product including a hard coating layer formed on an outermost surface thereof and containing amorphous hard carbon; mixing the sintered product with a carbon precursor, followed by heat treatment to form a soft coating layer on an outer circumferential surface of the sintered product; and forming a carbon nanotube layer on an outer circumferential surface of the soft coating layer.

In another embodiment, the method of preparing the anode material includes: drying a first mixture comprising graphite balls, a nano-silicon slurry, and flake graphite to prepare a dried product; mixing the dried product with pitch, followed by sintering to prepare a sintered product including a hard coating layer formed on an outermost surface thereof and containing amorphous hard carbon; mixing the sintered product with a carbon precursor, followed by heat treatment to form an intermediate product including a first soft coating layer and a second soft coating layer on an inner circumferential surface and an outer circumferential surface of the hard coating layer, respectively; and forming a carbon nanotube layer on an outer circumferential surface of the intermediate product.

In a further embodiment, the method of preparing the anode material includes: drying a first mixture comprising graphite balls and a nano-silicon slurry to prepare a dried product; sintering the dried product to prepare a sintered product including a hard coating layer formed on an outermost surface thereof and containing amorphous hard carbon; mixing the sintered product with a carbon precursor, followed by primary heat treatment to form an intermediate product including a first soft coating layer on an outer circumferential surface of the hard coating layer; and mixing the intermediate product with carbon nanotubes and a carbon precursor, followed by secondary heat treatment to form a second soft coating layer on an outer circumferential surface of the first soft coating layer.

In yet another embodiment, the method of preparing the anode material includes: drying a first mixture comprising graphite balls, a nano-silicon slurry, flake graphite, and pitch to prepare a dried product; mixing the dried product with pitch, followed by primary sintering to form a primary sintered product including a first hard coating layer formed on an outermost surface thereof and containing amorphous hard carbon; mixing the primary sintered product with pitch, followed by secondary sintering to form a secondary sintered product including a second hard coating layer on an outer circumferential surface of the first hard coating layer; and forming a carbon nanotube layer on an outer circumferential surface of the secondary sintered product.

In yet another embodiment, the method of preparing the anode material includes: drying a first mixture comprising graphite balls, a nano-silicon slurry, pitch, and flake graphite to prepare a dried product; performing primary sintering of the dried product to form a primary sintered product including a first hard coating layer formed on an outermost surface thereof and containing amorphous hard carbon; mixing the primary sintered product with a carbon precursor, followed by heat treatment to form an intermediate product including a soft coating layer on an outer circumferential surface of the first hard coating layer; mixing the intermediate product with pitch, followed by secondary sintering to form a secondary sintered product; and forming a carbon nanotube layer on an outer circumferential surface of the secondary sintered product, wherein the secondary sintered product includes a first hard coating layer containing amorphous hard carbon, an amorphous carbon layer, and a second hard coating layer containing amorphous hard carbon sequentially formed on an outermost surface thereof.

In one embodiment, the nano-silicon slurry may be prepared by dispersing silicon powder and a dispersant in a first solvent to prepare a dispersion, followed by grinding the dispersion, and the graphite balls may be prepared by preparing a graphite mixture comprising pitch and graphite, sintering the graphite mixture at 400° C. to 650° C. after compression of the graphite mixture, and grinding the sintered graphite mixture.

In one embodiment, the first solvent may include at least one selected from among water, ethanol, isopropyl alcohol, and potassium hydroxide (KOH), and the graphite mixture may further include at least one second solvent selected from among N-methyl pyrrolidone (NMP), ethanol, and water.

In one embodiment, the carbon precursor may include at least one selected from among polyimide, polyacrylonitrile, polyvinyl pyrrolidone, glucose, cellulose, hydrogenated nitrile butadiene rubber, nitrile butadiene rubber, polyvinylidene fluoride, styrene butadiene rubber, and sucrose.

In one embodiment, the first mixture may include the graphite balls, flake graphite, pitch and nano-silicon in a weight ratio of 1:2 to 8:1 to 25:5 to 70.

Another aspect of embodiments of the present invention relates to a bilayer-structured silicon carbon composite anode material prepared by the method of preparing a bilayer-structured silicon carbon composite anode material.

In one embodiment, the anode material may include: a core including a porous matrix containing nano-silicon (Si) and amorphous hard carbon, and flake graphite dispersed in the porous matrix; a hard coating layer formed on an outer circumferential surface of the core and containing amorphous hard carbon; a soft coating layer formed on an outer circumferential surface of the hard coating layer; and a carbon nanotube layer formed on an outer circumferential surface of the soft coating layer.

In one embodiment, the anode material may include 25 wt % to 80 wt % of the nano-silicon, 1 wt % to 60 wt % of the flake graphite, 5 wt % to 50 wt % of the amorphous hard carbon, 0.1 wt % to 10 wt % of the hard coating layer, 0.1 wt % to 5 wt % of the soft coating layer, and 0.01 wt % to 10 wt % of the carbon nanotube layer.

In one embodiment, the anode material may have an average diameter of 5 μm to 15 μm, the core may have a diameter of 1 μm to 15 μm, the flake graphite may have an average size of 0.2 μm to 8 μm, the soft coating layer may have a thickness of 0.05 μm to 5 μm, the hard coating layer may have a thickness of 0.05 μm to 5 μm, and the carbon nanotube layer may have a thickness of 0.01 μm to 10 μm.

In another embodiment, the anode material may include: a core including a porous matrix containing nano-silicon (Si) and amorphous hard carbon, and flake graphite dispersed in the porous matrix; a first soft coating layer formed on an outer circumferential surface of the core; a hard coating layer formed on an outer circumferential surface of the first soft coating layer and containing amorphous hard carbon; a second soft coating layer formed on an outer circumferential surface of the hard coating layer; and a carbon nanotube layer formed on an outer circumferential surface of the second soft coating layer.

In one embodiment, the anode material may include 25 wt % to 80 wt % of the nano-silicon, optionally 60 wt % or less of the flake graphite, 5 wt % to 50 wt % of the amorphous hard carbon, 0.1 wt % to 10 wt % of the hard coating layer, 0.1 wt % to 15 wt % of the first soft coating layer, 0.1 wt % to 15 wt % of the second soft coating layer, and 0.01 wt % to 10 wt % of the carbon nanotube layer.

In one embodiment, the anode material may have an average diameter of 5 μm to 15 μm, the core may have a diameter of 1 μm to 15 μm, the flake graphite may have an average size of 0.2 μm to 8 μm, the first soft coating layer may have a thickness of 0.05 μm to 5 μm, the second soft coating layer may have a thickness of 0.5 μm to 10 μm, the hard coating layer may have a thickness of 0.05 μm to 5 μm, and the carbon nanotube layer may have a thickness of 0.01 μm to 10 μm.

In another embodiment, the anode material may include: a core including a porous matrix containing nano-silicon (Si) and amorphous hard carbon; a hard coating layer formed on an outer circumferential surface of the core and containing amorphous hard carbon; a first soft coating layer formed on an outer circumferential surface of the hard coating layer and containing soft carbon; and a second soft coating layer formed on an outer circumferential surface of the first soft coating layer and containing carbon nanotubes and soft carbon.

In one embodiment, the anode material may include: 25 wt % to 80 wt % of the nano-silicon, 5 wt % to 50 wt % of the amorphous hard carbon, 0.1 wt % to 15 wt % of the hard coating layer, 0.1 wt % to 15 wt % of the first soft coating layer, and 0.1 wt % to 15 wt % of the second soft coating layer.

In one embodiment, the anode material may have an average diameter of 5 μm to 15 μm, the core may have a diameter of 1 μm to 15 μm, the hard coating layer may have a thickness of 0.05 μm to 5 μm, the first soft coating layer may have a thickness of 0.05 μm to 5 μm, and the second soft coating layer may have a thickness of 0.5 μm to 10 μm.

In another embodiment, the anode material may include: a core including a porous matrix containing nano-silicon (Si) and amorphous hard carbon, and flake graphite dispersed in the porous matrix; a first hard coating layer and a second hard coating layer sequentially formed on an outer circumferential surface of the core and each containing amorphous hard carbon; and a carbon nanotube layer formed on an outer circumferential surface of the second hard coating layer, wherein the first hard coating layer has higher hardness than the second hard coating layer.

In one embodiment, the anode material may include 25 wt % to 80 wt % of the nano-silicon, optionally 60 wt % or less of the flake graphite, 5 wt % to 50 wt % of the amorphous hard carbon, 0.1 wt % to 35 wt % of the first hard coating layer, 0.1 wt % to 35 wt % of the second hard coating layer, and 0.01 wt % to 10 wt % of the carbon nanotube layer.

In one embodiment, the anode material may have an average diameter of 5 μm to 15 μm, the core may have a diameter of 1 μm to 15 μm, the flake graphite may have an average size of 0.2 μm to 8 μm, the first hard coating layer may have a thickness of 0.05 μm to 10 μm, the second hard coating layer may have a thickness of 0.5 μm to 10 μm, and the carbon nanotube layer may have a thickness of 0.01 μm to 10 μm.

In another embodiment, the anode material may include: a core including a porous matrix containing nano-silicon (Si) and amorphous hard carbon, and flake graphite dispersed in the porous matrix; a first hard coating layer formed on an outer circumferential surface of the core and containing amorphous hard carbon; an amorphous carbon layer formed on an outer circumferential surface of the first hard coating layer; a second hard coating layer formed on an outer circumferential surface of the amorphous carbon layer and containing amorphous hard carbon; and a carbon nanotube layer formed on an outer circumferential surface of the second hard coating layer, wherein each of the first hard coating layer and the second hard coating layer has higher hardness than the amorphous carbon layer.

In one embodiment, the anode material may include 25 wt % to 80 wt % of the nano-silicon, optionally 60 wt % or less of the flake graphite, 5 wt % to 50 wt % of the amorphous hard carbon, 0.1 wt % to 35 wt % of the first hard coating layer, 0.1 wt % to 15 wt % of the amorphous carbon layer, 0.1 wt % to 35 wt % of the second hard coating layer, and 0.01 wt % to 10 wt % of the carbon nanotube layer.

In one embodiment, the anode material may have an average diameter of 5 μm to 15 μm, the core may have a diameter of 1 μm to 15 μm, the flake graphite may have an average size of 0.2 μm to 8 μm, the first hard coating layer may have a thickness of 0.05 μm to 10 μm, the amorphous carbon layer may have a thickness of 0.05 μm to 10 μm, the second hard coating layer may have a thickness of 0.5 μm to 10 μm, and the carbon nanotube layer may have a thickness of 0.01 μm to 10 μm.

A further aspect of embodiments of the present invention relates to a secondary battery including the anode material. In one embodiment, the secondary battery may include a cathode; an anode; and an electrolyte disposed between the cathode and the anode, wherein the anode includes the anode material.

In one embodiment, in performance evaluation of a full-cell secondary battery including the anode, the cathode including an active material oxide, and the electrolyte, in which the anode is formed to have a capacity (energy density per weight) of 410 mAh/g or more (with reference to a value measured at a cutoff voltage of 1.5V in evaluation of a half-cell including a lithium (Li) electrode as a cathode); the active material oxide has a structure of $LiNi_xCo_yMn_zO_2$ (x, y and z satisfying x+y+z=1, 0.50<x<0.91, 0.04<y<0.25, and 0.04<z<0.35); capacity of the cathode including the active material oxide (with reference to a value measured at a cutoff voltage of 4.2 V in evaluation of a half-cell including a lithium (Li) electrode as a cathode) and capacity of the anode including the anode material satisfy a relation: 1.04<anode capacity/cathode capacity <1.17; and the electrolyte includes 1.1 M $LiPF_6$ and 0.1 M LiBOB and contains ethyl carbonate (EC)/ethyl methyl carbonate (EMC)/fluoroethylene carbonate (FEC) in a weight ratio of 65%/30%/5% (in unit of wt %), the performance evaluation being carried out under conditions that the full-cell secondary battery is operated at a voltage of 2.50 V to 4.20 V for 600 or more charge/discharge cycles and charging/discharging is performed to have a capacity of 0.1 C for a first cycle and is performed to have a capacity of 1.0 C for subsequent 20 cycles (second to twenty-first cycles), the anode material may be maintained at 4.2 V until charge current reaches 0.05 C to complete charging in each cycle.

In one embodiment, in performance evaluation of a full-cell secondary battery including the anode, the cathode including an active material oxide, and the electrolyte, in which the anode is formed to have a capacity (energy density per weight) of 410 mAh/g or more (with reference to a value measured at a cutoff voltage of 1.5V in evaluation of a half-cell including a lithium (Li) electrode as a cathode); the active material oxide has a structure of $LiNi_xCo_yAl_2$ (x, y and z satisfying 0.71<x<0.95, 0.04<y<0.15, and 0.03<z<0.15); capacity of the cathode including the active material oxide (with reference to a value measured at a cutoff voltage of 4.2 V in evaluation of a half-cell including a lithium (Li) electrode as a cathode) and capacity of the anode including the anode material may satisfy a relation: 1.04<anode capacity/cathode capacity <1.17; and the electrolyte includes 1.1 M $LiPF_6$ and 0.1 M LiBOB and contains ethyl carbonate (EC)/ethyl methyl carbonate (EMC)/fluoroethylene carbonate (FEC) in a weight ratio of 65%/30%/5% (in unit of wt %), the performance evaluation being carried out under conditions that the full-cell secondary battery is operated at a voltage of 2.50 V to 4.20 V for 600 or more charge/discharge cycles and charging/discharging is performed to have a capacity of 0.1 C for a first cycle and is performed to have a capacity of 1.0 C for subsequent 20 cycles (second to twenty-first cycle), the anode material may be maintained at 4.2 V until charge current reaches 0.05 C to complete charging in each cycle.

The anode material according to embodiments of the present invention exhibits good durability and good structural stability, minimizes volume expansion due to intercalation of lithium ions during charging/discharging of a battery, damage to the anode material and deterioration in energy capacity, has good properties in terms of high capacity, high energy density, high output, long lifespan, initial efficiency, productivity, and economic feasibility.

BRIEF DESCRIPTION

Some of the embodiments will be described in detail, with reference to the following figures, wherein like designations denote like members, wherein.

DETAILED DESCRIPTION

Figure 1:
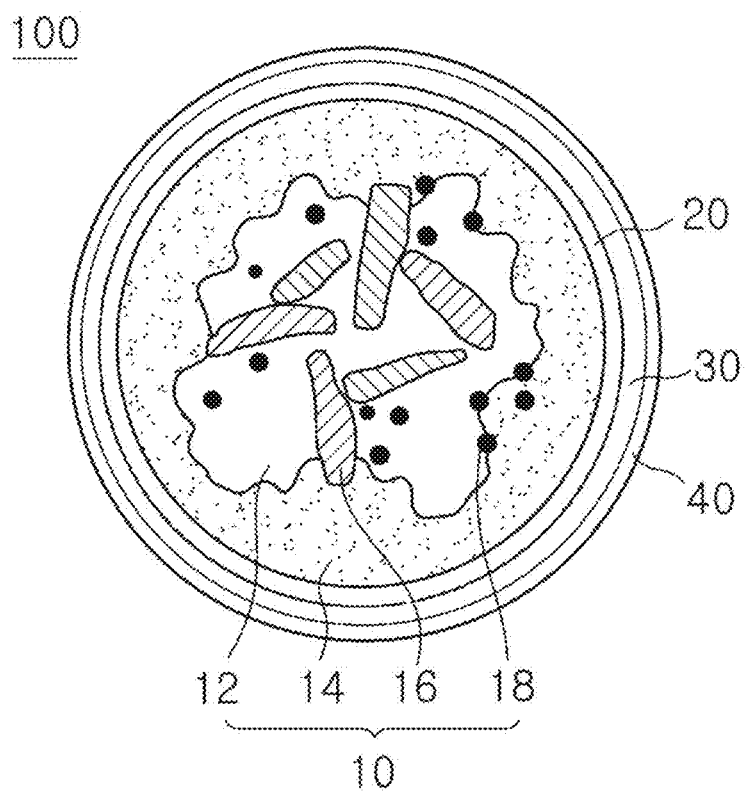
FIG. 1 is a view of a bilayer-structured silicon carbon composite anode material according to one embodiment of the present invention.

Hereinafter, embodiments of the present invention will be described in detail with reference to the accompanying drawings to allow those skilled in the art to easily practice embodiments of the present invention.

In the drawings, portions irrelevant to the description will be omitted for clarity and like components will be denoted by like reference numerals throughout the specification. Although lengths, thicknesses or widths of various components may be exaggerated for understanding in the drawings, embodiments of the present invention are not limited thereto.

In addition, the terms as used herein are defined by taking functions of embodiments of the invention into account and can be changed according to the custom or intention of users or operators. Therefore, definition of the terms should be made according to the overall disclosure set forth herein.

Method of Preparing Bilayer-Structured Silicon Carbon Composite Anode Material

One aspect of embodiments of the present invention relates to a method of preparing a bilayer-structured silicon carbon composite anode material.

First Embodiment

In one embodiment, the method of preparing the anode material includes: drying a first mixture comprising graphite balls, a nano-silicon slurry, pitch, and flake graphite to prepare a dried product (S11); sintering the dried product to prepare a sintered product including a hard coating layer formed on an outermost surface thereof and containing amorphous hard carbon (S12); mixing the sintered product with a carbon precursor, followed by heat treatment to form a soft coating layer on an outer circumferential surface of the sintered product (S13); and forming a carbon nanotube layer on an outer circumferential surface of the soft coating layer (S14).

Hereinafter, each step of the anode material preparation method will be described in detail.

(S11) Dried Product Preparation Step

In this step, a first mixture comprising graphite balls, a nano-silicon slurry, pitch, and flake graphite is prepared and dried to prepare a dried product.

In one embodiment, the flake graphite may include natural graphite and/or synthetic graphite.

In one embodiment, the nano-silicon slurry may be prepared by dispersing silicon powder and a dispersant in a first solvent to prepare a dispersion, followed by grinding the dispersion.

In one embodiment, the silicon powder may have a spherical, polyhedral or elliptical shape. For example, the silicon powder may a spherical shape. For example, the silicon powder may have an average particle diameter (D50) of 2 μm to 5 μm. Under these conditions, the nano-silicon slurry has excellent dispersibility and can be easily prepared.

In one embodiment, the first solvent may include at least one selected from among water, ethanol, isopropyl alcohol, and potassium hydroxide (KOH). The first solvent can secure good miscibility and dispersibility of the nano-silicon slurry.

In one embodiment, the first solvent may include ethanol and water (pure water) in a weight ratio of 1:0.5 to 1:1.5. Within this range, the first solvent can secure good miscibility and dispersibility while allowing easy preparation of the nano-silicon slurry.

The dispersant may include at least one selected from among poly(vinyl pyrrolidone), nitrile butadiene rubber, hydrogenated nitrile butadiene rubber, stearic acid, palmitic acid, oleic acid and lauric acid. The dispersant can secure good dispersion of the silicon powder while allowing easy preparation of the nano-silicon. For example, the dispersant may include stearic acid. For example, the dispersant may be a mixture of stearic acid and N-methyl pyrrolidone (NMP).

In one embodiment, the nano-silicon slurry may include 100 parts by weight of the silicon powder, 5 to 1,500 parts by weight of the first solvent, and 0.1 to 10 parts by weight of the dispersant. Under this condition, the nano-silicon slurry can exhibit good miscibility and dispersion and can be easily prepared. For example, the nano-silicon slurry may include 100 parts by weight of the silicon powder, 800 to 1,000 parts by weight of the first solvent, and 0.5 to 1.5 parts by weight of the dispersant.

For example, the nano-silicon slurry may be prepared by adding the dispersant to the first solvent in amounts as above, mixing the dispersant with the first solvent, and mixing the silicon powder with the mixture to prepare a dispersion, followed by grinding the dispersion.

In one embodiment, grinding may be performed by milling. In one embodiment, milling may be performed using a bead-mill, a ball-mill, a high energy ball-mill, a planetary mill, a stirred ball-mill, a vibration mill, or the like.

For example, the ball-mill may be formed of a chemically inert material that does not react with the silicon powder and other organic components. For example, the ball-mill may include zirconia ($ZrO_2$). In one embodiment, the ball mill may have an average particle diameter of 0.1 mm to 1 mm. Under this condition, the nano-silicon can be easily prepared.

In another embodiment, the nano-silicon slurry may be prepared by dispersing the silicon powder and the dispersant in the first solvent to prepare a dispersion; and adding a carbon component to the dispersion, followed by grinding the dispersion.

The nano-silicon slurry may include 100 parts by weight of the silicon powder, 5 to 1,500 parts by weight of the first solvent, and 0.1 to 20 parts by weight of the dispersant. Under these conditions, the nano-silicon slurry can be easily prepared by securing good grinding efficiency of the silicon powder, and can suppress re-agglomeration of the ground silicon powder, thereby improving grinding efficiency.

For example, the nano-silicon slurry may include isopropyl alcohol and ethanol in a weight ratio of 1:3 to 1:6 as the first solvent. Within this range, the nano-silicon slurry can secure good dispersion and grinding efficiency of the silicon powder.

The dispersant may include at least one selected from among polyvinyl pyrrolidone, nitrile butadiene rubber, hydrogenated nitrile butadiene rubber, stearic acid, palmitic acid, oleic acid, and lauric acid. With the dispersant, the nano-silicon can be easily prepared due to excellent dispersibility of the silicon powder. For example, the dispersant may include stearic acid. For example, the dispersant may be a mixture of stearic acid and N-methyl pyrrolidone (NMP).

In one embodiment, the carbon component may include at least one selected from among carbon fibers, nano-carbon fibers, flake graphite, and multilayer graphene. The carbon component can increase a grinding speed of the silicon powder while securing good grinding efficiency to allow easy preparation of the nano-silicon.

For example, the carbon component may be present in an amount of 0.01 to 10 parts by weight relative to 100 parts by weight of the silicon powder. Under this condition, the carbon component can increase the grinding speed of the silicon powder while securing good grinding efficiency to allow easy preparation of the nano-silicon, and can suppress re-agglomeration of the ground silicon powder, thereby improving grinding efficiency.

More specifically, in preparation of the nano-silicon slurry, a first solvent containing ethanol and isopropyl alcohol in a weight ratio of 1:4 is prepared and a mixture of 98 wt % of stearic acid and 2 wt % of N-methyl pyrrolidone (NMP) is prepared as the dispersant. Then, the nano-silicon slurry is prepared by mixing 100 parts by weight of the silicon powder, 5 to 1,500 parts by weight of the first solvent, 0.1 to 20 parts by weight of the dispersant, and 0.01 to 10 parts by weight of the carbon component (carbon fibers), followed by ball-mill grinding of the mixture.

For example, ball-mill grinding may be performed at a low rpm condition of a wet milling machine (1,200 rpm, for 10 L chamber) for 4 hours and at a high rpm condition thereof (1,650 rpm) for 14 hours. Under these conditions, nano-silicon having an average particle diameter (D50) of 98 nm may be prepared by wet grinding using 0.1 mm zirconia ($ZrO_2$). In one embodiment, nano-silicon contained in the nano-silicon slurry may have an average particle diameter of 1 nm to 250 nm. In another embodiment, the nano-silicon may have an average particle diameter of 90 nm to 110 nm.

In one embodiment, the graphite balls may be prepared by preparing a graphite mixture comprising pitch and graphite, sintering the graphite mixture at 400° C. to 650° C. after compression of the graphite mixture, and grinding the sintered graphite mixture. The prepared graphite balls allow easy formation of a core including a porous matrix containing nano-silicon and amorphous hard carbon while securing good capacity characteristics, durability and structural stability of the anode material. For example, the density of the graphite mixture can be increased to 1.2 g/cc or more by compression of the graphite mixture for sintering. For example, the graphite balls may be prepared by preparing a graphite mixture comprising 100 parts by weight of pitch and 5 to 1,000 parts by weight of graphite having a particle size of 1 μm to 6 μm, such as synthetic graphite or natural graphite, sintering the graphite mixture at 400° C. to 650° C. after compression of the graphite mixture at 5 atm to 50 atm, and grinding the graphite mixture. Under these conditions, the graphite balls can exhibit good miscibility and dispersibility, and can be easily prepared.

For example, the graphite balls may be used in the form of a graphite ball mixture solution. For example, the graphite mixture may further include a second solvent. In one embodiment, the second solvent may include at least one selected from among N-methyl pyrrolidone (NMP), ethanol, and water. The second solvent can improve miscibility and dispersibility. For example, the second solvent may include all of N-methyl pyrrolidone (NMP), ethanol and water.

More specifically, the graphite balls may be prepared by dissolving pitch in N-methyl pyrrolidone, sequentially adding ethanol and water (pure water) to the pitch to prepare a binder solution; and adding flake graphite to the binder solution, followed by stirring the binder solution.

In one embodiment, the pitch may include at least one selected from among pyrolysis fuel oil pitch and coal tar pitch. The pitch allows coating of amorphous carbon on an inner surface of the nano-silicon surrounding the graphite balls upon sintering of the anode material including the graphite balls and the nano-silicon at a high temperature of 800° C. or more while securing binder characteristics between the nano-silicon particles or between the graphite balls and the nano-silicon particles.

For example, the graphite balls may be prepared by mixing a binder solution containing pitch and a second solvent with graphite to prepare a graphite mixture; sintering the graphite mixture after compression of the graphite mixture; and grinding the sintered graphite mixture.

In one embodiment, the graphite mixture may include 500 to 2,500 parts by weight of the second solvent relative to 100 parts by weight of the pitch. Within this range, the graphite mixture can exhibit good miscibility and good dispersibility. For example, the second solvent may be present in an amount of 800 to 1,300 parts by weight.

For example, the second solvent may include N-methyl pyrrolidone, ethanol and water in a weight ratio of 1:1 to 3:1 to 5. With this ratio, the second solvent can secure good miscibility and dispersibility, and allows easy preparation of the graphite balls. For example, the second solvent may include N-methyl pyrrolidone, ethanol and water in a weight ratio of 1:1 to 2:1.5 to 3.

In one embodiment, the graphite may be the same as described above. In one embodiment, the graphite balls may include at least one selected from among natural graphite, synthetic graphite, porous carbon, silicon, and entangled round carbon nanotubes.

For example, the graphite balls may be prepared by adding 30 to 200 parts by weight of the flake graphite to 100 parts by weight of the pitch, followed by mixing (stirring) the flake graphite with the pitch. Under this condition, the graphite balls can be easily formed while securing good structural stability, high capacity/high output characteristics. For example, the flake graphite may be present in an amount of 50 to 150 parts by weight relative to 100 parts by weight of the pitch.

The graphite balls may be formed in a spherical or elliptical shape by mixing the flake graphite with the pitch. In one embodiment, the graphite balls may have an average particle size of 0.3 μm to 20 μm. Under this condition, the anode material can be easily formed. For example, the graphite balls may have a porous spherical shape. The graphite balls are not disintegrated in the mixture solution due to binder characteristics of the pitch.

The first mixture includes the graphite balls, flake graphite, pitch, nano-silicon, and a solvent. Here, the solvent may include at least one selected from among ethanol, isopropyl alcohol, and water.

The first mixture may include the graphite balls, the flake graphite, the pitch and the nano-silicon in a weight ratio of 1:2 to 8:1 to 25:5 to 70. Within this range, the first mixture can exhibit good miscibility and dispersibility while allowing easy preparation of the anode material. For example, the first mixture may include the graphite balls, the flake graphite, the pitch and the nano-silicon in a weight ratio of 1:4 to 6:5 to 10:10 to 15.

In one embodiment, the first mixture may include 1 to 5 parts by weight of the pitch relative to 100 parts by weight of the nano-silicon. Within this range, the first mixture can exhibit good miscibility and good dispersibility while allowing easy preparation of the anode material.

The particle size of the anode material can be easily adjusted by drying the first mixture. For example, drying may be performed using a spray dryer or the like. For example, spray drying may be carried out using a spray dryer provided with a single-fluid nozzle, a two-fluid nozzle, or a four-fluid nozzle.

In one embodiment, the dried product may have a spherical, polyhedral or elliptical shape. For example, the dried product may have a spherical shape.

In one embodiment, the dried product may have an average particle diameter (or size) of 0.1 μm to 15 μm. Under this condition, the dried product can exhibit good miscibility and formability.

In one embodiment, as prepared by spray-drying the first mixture using a single-fluid nozzle at an air flow rate of 650 sccm to 850 sccm, with the spray dryer set to have an outlet temperature of 70° C. to 130° C., the dried product may have an average particle diameter of 7 μm to 14 μm. In another embodiment, as prepared by spray drying the first mixture using a four-fluid nozzle, the dried product may have an average particle diameter of 0.1 μm to 8 μm.

In one embodiment, the pitch may include at least one selected from among pyrolysis fuel oil pitch, polyimide pitch, polyacrylonitrile (PAN) pitch, and coal tar pitch. The pitch can secure good binder properties and high-capacity characteristics.

The flake graphite may be used to secure conductivity, high output and high-capacity characteristics of the anode material. The flake graphite may include natural graphite and/or synthetic graphite. The flake graphite may be prepared by delamination or grinding of spherical graphite, without being limited thereto. In one embodiment, the flake graphite may include a crystal shape in which carbon atoms are stacked in the form of multiple regular-hexagonal planes to have a thickness perpendicular to the hexagonal planes.

The flake graphite has a larger surface area than spherical graphite with the same capacity and good properties in terms of economic feasibility, electrical conductivity and high-capacity characteristics.

(S12) Sintered Product Preparation Step

In this step, the dried product is sintered to prepare a sintered product including a hard coating layer formed on an outermost surface thereof and containing amorphous hard carbon. In one embodiment, sintering may be carried out at a temperature of 600° C. to 1,250° C. In sintering, the pitch of the dried product is melted in a temperature range of 200° C. to 300° C., the solvent is evaporated from the pitch in a temperature range of 350° C. to 550° C., and a thermosetting material is carbonized in a temperature range of 600° C. to 1,250° C. By sintering under this condition, a core including the flake graphite dispersed in the porous matrix containing the nano-silicon and the amorphous hard carbon may be formed to have the hard coating layer formed on the outermost surface of the core and containing amorphous hard carbon.

(S13) Soft Coating Layer Formation Step

In this step, the sintered product is mixed with a carbon precursor and is subjected to heat treatment to form a soft coating layer on an outer circumferential surface of the sintered product. In one embodiment, a mixture including 100 parts by weight of the sintered product and 0.1 parts by weight to 30 parts by weight of the carbon precursor may be subjected to heat treatment. Within this range, the sintered product has good miscibility and allows easy formation of the soft coating layer.

In one embodiment, the carbon precursor may include at least one selected from among polyimide, polyacrylonitrile, polyvinyl pyrrolidone, glucose, cellulose, hydrogenated nitrile butadiene rubber (HNBR), nitrile butadiene rubber (NBR), polyvinylidene fluoride (PVDF), styrene butadiene rubber (SBR), and sucrose. The carbon precursor serves to allow easy formation of the soft coating layer.

For example, the carbon precursor may further include a solvent. The solvent may include at least one selected from among water, an alcohol-based solvent, an amide-based solvent, an ester-based solvent, and a hydrocarbon-based solvent. The solvent serves to secure good workability.

The alcohol-based solvent may include at least one selected from among methanol, ethanol, isopropanol, and butanol.

The amide-based solvent may include at least one selected from N-methyl-2-pyrrolidone (NMP), dimethyl acetamide (DMAC), and dimethyl formamide (DMF).

The hydrocarbon-based solvent may include toluene and/or xylene.

In one embodiment, heat treatment may be performed at 80° C. to 300° C. By heat treatment under this condition, the soft coating layer containing amorphous soft carbon can be easily formed.

(S14) Carbon Nanotube Layer Formation Step

In this step, a carbon nanotube layer is formed on an outer circumferential surface of the soft coating layer. The carbon nanotube layer may be formed by depositing a solution containing carbon nanotubes on the outer circumferential surface of the soft coating layer, followed by drying the solution.

In one embodiment, the carbon nanotube solution may contain carbon nanotubes, carboxymethyl cellulose, and a solvent. The solvent may include water and/or an alcohol-based solvent. For example, the carbon nanotube solution may include 0.1 wt % to 5 wt % of carbon nanotubes, 0.01 wt % to 3 wt % of carboxymethyl cellulose, and the balance of the solvent. The carbon nanotube layer may be formed by depositing the carbon nanotube solution onto the outer circumferential surface of the soft coating layer, followed by drying the carbon nanotube solution.

In one embodiment, the carbon nanotube layer may be present in an amount of 0.01 parts by weight to 50 parts by weight relative to 100 parts by weight of the sintered product subjected to heat treatment but is not limited thereto. Under these conditions, the carbon nanotube layer can exhibit good durability and electrical conductivity.

In one embodiment, the method may further include forming an organic coating layer on an outer circumferential surface of the carbon nanotube layer after formation of the carbon nanotube layer.

In one embodiment, the organic coating layer may be formed to improve thermal stability and lifespan of the anode material.

In one embodiment, the organic coating layer may include at least one selected from among a polyolefin compound, polyolefin wax, and an acrylic compound. The polyolefin compound may include polyethylene and/or polypropylene.

In one embodiment, the method may further include pulverizing and classifying the anode material using a screen and a sieve.

The prepared anode material includes a core including a porous matrix containing nano-silicon (Si) and amorphous hard carbon, and flake graphite dispersed in the porous matrix; a hard coating layer formed on the outer circumferential surface of the core and containing amorphous hard carbon; a soft coating layer formed on the outer circumferential surface of the hard coating layer; and a carbon nanotube layer formed on the outer circumferential surface of the soft coating layer.

In one embodiment, the anode material may include 25 wt % to 80 wt % of the nano-silicon, 1 wt % to 60 wt % of the flake graphite, 5 wt % to 50 wt % of the amorphous hard carbon, 0.1 wt % to 10 wt % of the hard coating layer, 0.1 wt % to 5 wt % of the soft coating layer, and 0.01 wt % to 10 wt % of the carbon nanotube layer.

In another embodiment, the anode material may include 25 wt % to 80 wt % of the nano-silicon, 1 wt % to 60 wt % of the flake graphite, 5 wt % to 50 wt % of the amorphous hard carbon, 0.2 wt % to 10 wt % of the hard coating layer, 0.1 wt % to 5 wt % of the soft coating layer, and 0.01 wt % to 10 wt % of the carbon nanotube layer.

Second Embodiment

In another embodiment, the method of preparing the anode material includes: drying a first mixture comprising graphite balls, a nano-silicon slurry, and flake graphite to prepare a dried product (S21); mixing the dried product with pitch, followed by sintering to prepare a sintered product including a hard coating layer formed on an outermost surface thereof and containing amorphous hard carbon (S22); mixing the sintered product with a carbon precursor, followed by heat treatment to form an intermediate product including a first soft coating layer and a second soft coating layer on an inner circumferential surface and an outer circumferential surface of the hard coating layer, respectively (S23); and forming a carbon nanotube layer on an outer circumferential surface of the intermediate product (S24).

Hereinafter, each step of the anode material preparation method will be described in detail.

(S21) Dried Product Preparation Step

In this step, a first mixture comprising graphite balls, a nano-silicon slurry, and pitch is dried to prepare a dried product.

In one embodiment, the flake graphite may include natural graphite and/or synthetic graphite.

In one embodiment, the nano-silicon slurry may be prepared by dispersing silicon powder and a dispersant in a first solvent to prepare a dispersion, followed by grinding the dispersion.

For example, the graphite balls may be prepared by mixing a binder solution containing pitch and a second solvent with graphite to prepare a graphite solution, sintering the graphite mixture after compression of the graphite mixture, and grinding the sintered graphite mixture.

The prepared graphite balls allow easy formation of a core including a porous matrix containing nano-silicon and amorphous hard carbon while securing good capacity characteristics, durability and structural stability of the anode material.

The graphite balls, the nano-silicon slurry and the flake graphite may be the same as those described above.

The first mixture may include the graphite balls, the flake graphite, the nano-silicon, and the solvent. Here, the solvent may include at least one selected from among ethanol, isopropyl alcohol, and water.

The first mixture may include the graphite balls, the flake graphite and the nano-silicon in a weight ratio of 1:2 to 8:5 to 70 in terms of solid content. Within this range, the first mixture can exhibit good miscibility and dispersibility while allowing easy preparation of the anode material. For example, the first mixture may include the graphite balls, the flake graphite and the nano-silicon in a weight ratio of 1:4 to 6:10 to 15.

The particle size of the anode material can be easily adjusted by drying the first mixture. For example, drying may be performed using a spray dryer or the like. For example, spray drying may be carried out using a spray dryer provided with a single-fluid nozzle, a two-fluid nozzle, or a four-fluid nozzle.

In one embodiment, the dried product may have a spherical, polyhedral or elliptical shape. For example, the dried product may have a spherical shape.

In one embodiment, the dried product may have an average particle diameter (or size) of 0.1 μm to 15 μm. Under this condition, the dried product can exhibit good miscibility and formability.

In one embodiment, as prepared by spray-drying the first mixture using a single-fluid nozzle at an air flow rate of 650 sccm to 850 sccm, with the spray dryer set to have an outlet temperature of 70° C. to 130° C., the dried product may have an average particle diameter of 7 μm to 14 μm. In another embodiment, as prepared by spray drying the first mixture using a four-fluid nozzle, the dried product may have an average particle diameter of 0.1 μm to 8 μm.

The flake graphite may be used to secure conductivity, high output and high-capacity characteristics of the anode material. The flake graphite may include natural graphite and/or synthetic graphite. The flake graphite may be prepared by delamination or grinding of spherical graphite, without being limited thereto. In one embodiment, the flake graphite may include a crystal shape in which carbon atoms are stacked in the form of multiple regular-hexagonal planes to have a thickness in a direction perpendicular to the hexagonal planes. The flake graphite has a larger surface area than spherical graphite with the same capacity and good properties in terms of economic feasibility, electrical conductivity and high-capacity characteristics.

(S22) Sintered Product Preparation Step

In this step, the dried product is mixed with pitch and sintered to prepare a sintered product including a hard coating layer formed on an outermost surface thereof and containing amorphous hard carbon.

In one embodiment, the pitch may include at least one selected from among pyrolysis fuel oil pitch, polyimide pitch, polyacrylonitrile (PAN) pitch, and coal tar pitch. The pitch can secure good binder properties and high-capacity characteristics.

The sintered product may be formed by sintering a mixture comprising 100 parts by weight of the dried product and 0.5 parts by weight to 30 parts by weight of the pitch. Under this condition, the sintered product can exhibit good durability and structural stability.

In one embodiment, sintering may be carried out at a temperature of 600° C. to 1,250° C. In sintering, the pitch of the dried product is melted in a temperature range of 200° C. to 300° C., the solvent is evaporated from the pitch in a temperature range of 350° C. to 550° C., and a thermosetting material is carbonized in a temperature range of 600° C. to 1,250° C. By sintering under this condition, a core including the flake graphite dispersed in the porous matrix containing the nano-silicon and the amorphous hard carbon may be formed to have the hard coating layer formed on the outermost surface of the core and containing amorphous hard carbon.

(S23) Intermediate Product Formation Step

In this step, the sintered product is mixed with a carbon precursor and subjected to heat treatment to form an intermediate product including a first soft coating layer and a second soft coating layer on an inner circumferential surface and an outer circumferential surface of the hard coating layer, respectively.

In one embodiment, a mixture comprising 100 parts by weight of the sintered product and 0.1 parts by weight to 30 parts by weight of the carbon precursor may be subjected to heat treatment. Within this range, the mixture exhibits good miscibility while allowing easy formation of the first soft coating layer and the second soft coating layer on the inner circumferential surface and the outer circumferential surface of the hard coating layer, respectively.

In one embodiment, the carbon precursor may include at least one selected from among polyimide, polyacrylonitrile, polyvinyl pyrrolidone, glucose, cellulose, hydrogenated nitrile butadiene rubber, nitrile butadiene rubber, polyvinylidene fluoride, styrene butadiene rubber, and sucrose. The carbon precursor serves to allow easy formation of the soft coating layer.

For example, the carbon precursor may further include a solvent. The solvent may include at least one selected from among water, an alcohol-based solvent, an amide-based solvent, an ester-based solvent, and a hydrocarbon-based solvent. The solvent serves to secure good workability.

The alcohol-based solvent may include at least one selected from among methanol, ethanol, isopropanol, and butanol.

The amide-based solvent may include at least one selected from N-methyl-2-pyrrolidone (NMP), dimethyl acetamide (DMAC), and dimethyl formamide (DMF).

The hydrocarbon-based solvent may include toluene and/or xylene.

In one embodiment, heat treatment may be performed at 80° C. to 300° C. By heat treatment under this condition, the first soft coating layer and the second coating layer each containing soft carbon may be formed on the inner circumferential surface and the outer circumferential surface of the hard coating layer, respectively.

In one embodiment, in formation of the soft coating layer, the soft coating layer may be formed on the interior of the porous matrix of the core and the graphite balls may be placed inside the soft coating layer. For example, by heat treatment, the intermediate product may include a first soft coating layer formed on the outermost surface of the sintered product, a hard coating layer formed on the outer circumferential surface of the first soft coating layer and containing amorphous hard carbon, and a second soft coating layer formed on the outer circumferential surface of the hard coating layer.

(S24) Carbon Nanotube Layer Formation Step

In this step, a carbon nanotube layer is formed on an outer circumferential surface of the intermediate product (or on an outer circumferential surface of the second soft coating layer). For example, the carbon nanotube layer may be formed by depositing a solution containing carbon nanotubes on the outer circumferential surface of the second soft coating layer, followed by drying the solution.

In one embodiment, the carbon nanotube solution may contain carbon nanotubes, carboxymethyl cellulose, and a solvent. The solvent may include water and/or an alcohol-based solvent. For example, the carbon nanotube solution may include 0.1 wt % to 5 wt % of carbon nanotubes, 0.01 wt % to 3 wt % of carboxymethyl cellulose, and the balance of the solvent. The carbon nanotube layer may be formed by depositing the carbon nanotube solution onto the outer circumferential surface of the soft coating layer, followed by drying the carbon nanotube solution.

In one embodiment, the carbon nanotube layer may be present in an amount of 0.01 parts by weight to 50 parts by weight relative to 100 parts by weight of the sintered product subjected to heat treatment. Under these conditions, the carbon nanotube layer can exhibit good durability and electrical conductivity.

In one embodiment, the method may further include forming an organic coating layer on an outer circumferential surface of the carbon nanotube layer after formation of the carbon nanotube layer.

In one embodiment, the organic coating layer may be formed to improve thermal stability and lifespan of the anode material.

In one embodiment, the organic coating layer may include at least one selected from among a polyolefin compound, polyolefin wax, and an acrylic compound. The polyolefin compound may include polyethylene and/or polypropylene.

In one embodiment, the method may further include pulverizing and classifying the anode material using a screen and a sieve.

The prepared anode material includes a core including a porous matrix containing nano-silicon (Si) and amorphous hard carbon, and flake graphite dispersed in the porous matrix; a first soft coating layer formed on the outer circumferential surface of the core; a hard coating layer formed on the outer circumferential surface of the first soft coating layer and containing amorphous hard carbon; a second soft coating layer formed on the outer circumferential surface of the hard coating layer; and a carbon nanotube layer formed on the outer circumferential surface of the second soft coating layer.

In one embodiment, the anode material may include 25 wt % to 80 wt % of the nano-silicon, optionally 60 wt % or less of the flake graphite, 5 wt % to 50 wt % of the amorphous hard carbon, 0.1 wt % to 10 wt % of the hard coating layer, 0.1 wt % to 15 wt % of the first soft coating layer, 0.1 wt % to 15 wt % of the second soft coating layer, and 0.01 wt % to 10 wt % of the carbon nanotube layer.

In another embodiment, the anode material may include 25 wt % to 80 wt % of the nano-silicon, greater than 0 wt % to 0 wt % or less of the flake graphite, 5 wt % to 50 wt % of the amorphous hard carbon, 0.6 wt % to 10 wt % of the hard coating layer, 0.2 wt % to 3.33 wt % of the first soft coating layer, 0.1 wt % to 5 wt % of the second soft coating layer, and 0.01 wt % to 10 wt % of the carbon nanotube layer.

Third Embodiment

In a further embodiment, the method of preparing the anode material includes: drying a first mixture comprising graphite balls and a nano-silicon slurry to prepare a dried product (S31); sintering the dried product to prepare a sintered product including a hard coating layer formed on the outermost surface thereof and containing amorphous hard carbon (S32); mixing the sintered product with a carbon precursor, followed by primary heat treatment to form an intermediate product including a first soft coating layer on an outer circumferential surface of the hard coating layer (S33); and mixing the intermediate product with carbon nanotubes and a carbon precursor, followed by secondary heat treatment to form a second soft coating layer on an outer circumferential surface of the first soft coating layer (S34).

Hereinafter, each step of the anode material preparation method will be described in detail.

(S31) Dried Product Preparation Step

In this step, a first mixture comprising graphite balls and a nano-silicon slurry is dried to prepare a dried product. The graphite balls and the nano-silicon slurry are the same as those described above.

In one embodiment, the nano-silicon slurry may be prepared by dispersing silicon powder and a dispersant in a first solvent to prepare a dispersion, followed by grinding the dispersion.

For example, the graphite balls may be prepared by mixing a binder solution containing pitch and a second solvent with graphite to prepare a graphite solution, sintering the graphite mixture after compression of the graphite mixture, and grinding the sintered graphite mixture.

The prepared graphite balls allow easy formation of a core including a porous matrix containing nano-silicon and amorphous hard carbon while securing good capacity characteristics, durability and structural stability of the anode material.

The graphite balls and the nano-silicon slurry may be the same as those described above.

The first mixture may include the graphite balls, the nano-silicon, and the solvent. Here, the solvent may include at least one selected from among ethanol, isopropyl alcohol, and water.

The first mixture may include the graphite balls and the nano-silicon in a weight ratio of 1:0.5 to 1:70 in terms of solid content. Within this range, the first mixture can exhibit good miscibility and dispersibility while allowing easy preparation of the anode material. For example, the first mixture may include the graphite balls and the nano-silicon in a weight ratio of 1:0.5 to 1:5.

The particle size of the anode material can be easily adjusted by drying the first mixture. For example, drying may be performed using a spray dryer or the like. For example, spray drying may be carried out using a spray dryer provided with a single-fluid nozzle, a two-fluid nozzle, or a four-fluid nozzle.

In one embodiment, the dried product may have a spherical, polyhedral or elliptical shape. For example, the dried product may have a spherical shape.

In one embodiment, the dried product may have an average particle diameter (or size) of 0.1 μm to 15 μm. Under this condition, the dried product can exhibit good miscibility and formability.

In one embodiment, as prepared by spray-drying the first mixture using a single-fluid nozzle at an air flow rate of 650 sccm to 850 sccm, with the spray dryer set to have an outlet temperature of 70° C. to 130° C., the dried product may have an average particle diameter of 7 μm to 14 μm. In another embodiment, as prepared by spray drying the first mixture using a four-fluid nozzle, the dried product may have an average particle diameter of 0.1 μm to 8 μm.

The flake graphite may be used to secure conductivity, high output and high-capacity characteristics of the anode material. The flake graphite may include natural graphite and/or synthetic graphite. The flake graphite may be prepared by delamination or grinding of spherical graphite, without being limited thereto.

In one embodiment, the flake graphite may have a crystalline structure in which carbon atoms are stacked in the form of multiple regular-hexagonal planes to have a thickness in a direction perpendicular to the hexagonal planes. The flake graphite has a larger surface area than spherical graphite with the same capacity and good properties in terms of economic feasibility, electrical conductivity and high-capacity characteristics.

(S32) Sintered Product Preparation Step

In this step, the dried product is sintered to prepare a sintered product including a hard coating layer formed on the outermost surface thereof and containing amorphous hard carbon.

In one embodiment, sintering may be carried out at a temperature of 600° C. to 1,250° C. By sintering under this condition, a core including the flake graphite dispersed in the porous matrix containing the nano-silicon and the amorphous hard carbon may be formed to have the hard coating layer formed on the outermost surface of the core and containing amorphous hard carbon.

(S33) First Soft Coating Layer Formation Step

In this step, the sintered product is mixed with a carbon precursor and is subjected to primary heat treatment to form an intermediate product including a first soft coating layer on an outer circumferential surface of the hard coating layer.

In one embodiment, a mixture comprising 100 parts by weight of the sintered product and 0.1 parts by weight to 30 parts by weight of the carbon precursor may be subjected to heat treatment. Within this range, the mixture exhibits good miscibility while allowing easy formation of the first soft coating layer.

In one embodiment, the carbon precursor may include at least one selected from among polyimide, polyacrylonitrile, polyvinyl pyrrolidone, glucose, cellulose, hydrogenated nitrile butadiene rubber, nitrile butadiene rubber, polyvinylidene fluoride, styrene butadiene rubber, and sucrose. The carbon precursor serves to allow easy formation of the first soft coating layer.

For example, the carbon precursor may further include a solvent. The solvent may include at least one selected from among water, an alcohol-based solvent, an amide-based solvent, an ester-based solvent, and a hydrocarbon-based solvent. The solvent serves to secure good workability.

The alcohol-based solvent may include at least one selected from among methanol, ethanol, isopropanol, and butanol.

The amide-based solvent may include at least one selected from N-methyl-2-pyrrolidone (NMP), dimethyl acetamide (DMAC), and dimethyl formamide (DMF).

The hydrocarbon-based solvent may include toluene and/or xylene.

In one embodiment, heat treatment may be performed at 80° C. to 300° C. By heat treatment under this condition, the first soft coating layer containing soft carbon may be formed on the outer circumferential surface of the hard coating layer.

(S34) Second Soft Coating Layer Formation Step

In this step, the intermediate product is mixed with carbon nanotubes and a carbon precursor and subjected to secondary heat treatment to form a second soft coating layer on an outer circumferential surface of the first soft coating layer.

For example, the carbon nanotube layer may be formed by depositing a carbon nanotube solution on an outer circumferential surface of the second soft coating layer, followed by drying the carbon nanotube solution.

In one embodiment, the carbon nanotubes may be mixed in the form of the carbon nanotube solution. In one embodiment, the carbon nanotube solution may contain carbon nanotubes, carboxymethyl cellulose, and a solvent. The solvent may include water and/or an alcohol-based solvent. For example, the carbon nanotube solution may include 0.1 wt % to 5 wt % of carbon nanotubes, 0.01 wt % to 3 wt % of carboxymethyl cellulose, and the balance of the solvent. The second soft coating layer containing the carbon nanotubes on the surface of the first soft coating layer may be easily formed by depositing the carbon nanotube solution on the outer circumferential surface of the first soft coating layer, followed by drying the carbon nanotube solution.

In one embodiment, the second soft coating layer may include 0.01 parts by weight to 50 parts by weight of the carbon nanotubes and 0.1 to 30 parts by weight of the carbon precursor relative to 100 parts by weight of the intermediate product. Under these conditions, the second soft coating layer can be easily formed and can exhibit good durability and electrical conductivity.

In one embodiment, the carbon precursor may include at least one selected from among polyimide, polyacrylonitrile, polyvinyl pyrrolidone, glucose, cellulose, hydrogenated nitrile butadiene rubber, nitrile butadiene rubber, polyvinylidene fluoride, styrene butadiene rubber, and sucrose. The carbon precursor serves to allow easy formation of the second soft coating layer.

For example, the carbon precursor may further include a solvent. The solvent may include at least one selected from among water, an alcohol-based solvent, an amide-based solvent, an ester-based solvent, and a hydrocarbon-based solvent. The solvent serves to secure good workability.

The alcohol-based solvent may include at least one selected from among methanol, ethanol, isopropanol, and butanol.

The amide-based solvent may include at least one selected from N-methyl-2-pyrrolidone (NMP), dimethyl acetamide (DMAC), and dimethyl formamide (DMF).

The hydrocarbon-based solvent may include toluene and/or xylene.

In one embodiment, heat treatment may be performed at 80° C. to 300° C. By heat treatment under this condition, the second soft coating layer containing amorphous soft carbon and carbon nanotubes may be formed on the outer circumferential surface of the hard coating layer.

In one embodiment, the method may further include forming an organic coating layer on an outer circumferential surface of the second soft coating layer after formation of the second soft coating layer.

In one embodiment, the organic coating layer may be formed to improve thermal stability and lifespan of the anode material.

In one embodiment, the organic coating layer may include at least one selected from among a polyolefin compound, polyolefin wax, and an acrylic compound. The polyolefin compounds may include polyethylene and/or polypropylene.

In one embodiment, the method may further include pulverizing and classifying the anode material using a screen and a sieve.

The anode material includes: a core including a porous matrix containing nano-silicon (Si) and amorphous hard carbon; a hard coating layer formed on the outer circumferential surface of the core and containing amorphous hard carbon; a first soft coating layer formed on the outer circumferential surface of the hard coating layer and containing soft carbon; and a second soft coating layer formed on the outer circumferential surface of the first soft coating layer and containing carbon nanotubes and soft carbon.

In one embodiment, the anode material may include 25 wt % to 80 wt % of the nano-silicon, 5 wt % to 50 wt % of the amorphous hard carbon, 0.1 wt % to 15 wt % of the hard coating layer, 0.1 wt % to 15 wt % of the first soft coating layer, and 0.1 wt % to 15 wt % of the second soft coating layer.

In another embodiment, the anode material may include 25 wt % to 80 wt % of the nano-silicon, 5 wt % to 50 wt % of the amorphous hard carbon, 1 wt % to 15 wt % of the hard coating layer, 0.5 wt % to 7.5 wt % of the first soft coating layer, and 0.15 wt % to 15 wt % of the second soft coating layer.

Fourth Embodiment

In yet another embodiment, the method of preparing the anode material includes: drying a first mixture comprising graphite balls, a nano-silicon slurry, flake graphite, and pitch to prepare a dried product (S41); mixing the dried product with pitch, followed by primary sintering to form a primary sintered product including a first hard coating layer formed on the outermost surface thereof and containing amorphous hard carbon (S42); mixing the primary sintered product with pitch, followed by secondary sintering to form a secondary sintered product including a second hard coating layer on an outer circumferential surface of the first hard coating layer (S43); and forming a carbon nanotube layer on an outer circumferential surface of the secondary sintered product (S44).

Hereinafter, each step of the anode material preparation method will be described in detail.

(S41) Dried Product Preparation Step

In this step, a dried product is prepared by drying a first mixture comprising graphite balls, a nano-silicon slurry, flake graphite, and pitch. The graphite balls, the nano-silicon slurry, the flake graphite and the pitch may be the same as described above.

In one embodiment, the nano-silicon slurry may be prepared by dispersing silicon powder and a dispersant in a first solvent to prepare a dispersion, followed by grinding the dispersion.

For example, the graphite balls may be prepared by mixing a binder solution containing pitch and a second solvent with graphite to prepare a graphite solution, sintering the graphite mixture after compression of the graphite mixture, and grinding the sintered graphite mixture.

The prepared graphite balls allow easy formation of a core including a porous matrix containing nano-silicon and amorphous hard carbon while securing good capacity characteristics, durability and structural stability of the anode material.

The graphite balls, the flake graphite, the pitch and the nano-silicon slurry may be the same as those described above.

The first mixture includes the graphite balls, the flake graphite, the pitch, the nano-silicon, and a solvent. Here, the solvent may include at least one selected from among ethanol, isopropyl alcohol, and water.

In one embodiment, the first mixture may include the graphite balls, the flake graphite, the pitch and the nano-silicon in a weight ratio of 1:2 to 8:1 to 25:5 to 70 in terms of solid content. Within this range, the first mixture can exhibit good miscibility and dispersibility while allowing easy preparation of the anode material. For example, the first mixture may include the graphite balls, the flake graphite, the pitch and the nano-silicon in a weight ratio of 1:4 to 6:5 to 10:10 to 15.

In one embodiment, the first mixture may include 5 parts by weight to 35 parts by weight of the pitch relative to 100 parts by weight of the nano-silicon. Under this condition, the first mixture exhibits good miscibility and dispersibility while allowing easy formation of the anode material.

The particle size of the anode material can be easily adjusted by drying the first mixture. For example, drying may be performed using a spray dryer or the like. For example, spray drying may be carried out using a spray dryer provided with a single-fluid nozzle, a two-fluid nozzle, or a four-fluid nozzle.

In one embodiment, the dried product may have a spherical, polyhedral or elliptical shape. For example, the dried product may have a spherical shape.

In one embodiment, the dried product may have an average particle diameter (or size) of 0.1 μm to 15 μm. Under this condition, the dried product can exhibit good miscibility and formability.

In one embodiment, as prepared by spray-drying the first mixture using a single-fluid nozzle at an air flow rate of 650 sccm to 850 sccm, with the spray dryer set to have an outlet temperature of 70° C. to 130° C., the dried product may have an average particle diameter of 7 μm to 14 μm. In another embodiment, as prepared by spray drying the first mixture using a four-fluid nozzle, the dried product may have an average particle diameter of 0.1 μm to 8 μm.

The flake graphite may be used to secure conductivity, high output and high-capacity characteristics of the anode material. The flake graphite may include natural graphite and/or synthetic graphite. The flake graphite may be prepared by delamination or grinding of spherical graphite, without being limited thereto.

In one embodiment, the flake graphite may include a crystal shape in which carbon atoms are stacked in the form of multiple regular-hexagonal planes to have a thickness in a direction perpendicular to the hexagonal planes. The flake graphite has a larger surface area than spherical graphite with the same capacity and good properties in terms of economic feasibility, electrical conductivity and high-capacity characteristics.

(S42) Primary Sintered Product Preparation Step

In this step, the dried product is mixed with pitch and subjected to primary sintering to form a primary sintered product including a first hard coating layer formed on the outermost surface thereof and containing amorphous hard carbon. In one embodiment, a mixture including 100 parts by weight of the dried product and 1 to 30 parts by weight of the pitch may be subjected to the primary sintering. Under this condition, the first hard coating layer can be easily formed.

In one embodiment, the pitch may include at least one selected from among pyrolysis fuel oil pitch, polyimide pitch, polyacrylonitrile (PAN) pitch, and coal tar pitch. The pitch can secure good binder properties and high-capacity characteristics.

In one embodiment, primary sintering may be carried out at a temperature of 600° C. to 1,250° C. In sintering, the pitch of the dried product is melted in a temperature range of 200° C. to 300° C., the solvent is evaporated from the pitch in a temperature range of 350° C. to 550° C., and a thermosetting material is carbonized in a temperature range of 600° C. to 1,250° C. By sintering under this condition, a core including flake graphite dispersed in a porous matrix containing nano-silicon and first amorphous hard carbon may be formed to have the first hard coating layer formed on the outermost surface of the core and containing amorphous hard carbon.

(S43) Secondary Sintered Product Preparation Step

In this step, the primary sintered product is mixed with pitch and subjected to secondary sintering to form a secondary sintered product including a second hard coating layer on an outer circumferential surface of the first hard coating layer.

In one embodiment, the pitch may include at least one selected from among pyrolysis fuel oil pitch, polyimide pitch, polyacrylonitrile (PAN) pitch, and coal tar pitch. The pitch can secure good binder properties and high-capacity characteristics.

In one embodiment, a mixture including 100 parts by weight of the primary sintered product and 1 to 30 parts by weight of the pitch may be subjected to secondary sintering. Under this condition, the second hard coating layer can be easily formed.

In one embodiment, secondary sintering may be carried out at a temperature of 600° C. to 1,250° C. In sintering, the pitch of the dried product is melted in a temperature range of 200° C. to 300° C., the solvent is evaporated from the pitch in a temperature range of 350° C. to 550° C., and a thermosetting material is carbonized in a temperature range of 600° C. to 1,250° C. By sintering under this condition, a secondary sintered product including a first hard coating layer containing amorphous hard carbon and a second hard coating layer containing amorphous hard carbon sequentially formed on the outermost surface of a core, which includes the flake graphite dispersed in the porous matrix containing nano-silicon and first amorphous hard carbon, is formed.

(S44) Carbon Nanotube Layer Formation Step

In this step, a carbon nanotube layer is formed on an outer circumferential surface of the secondary sintered product (or on an outer circumferential surface of the second hard coating layer). For example, the carbon nanotube layer may be formed by depositing a solution containing carbon nanotubes on the outer circumferential surface of the second hard coating layer, followed by drying the solution.

In one embodiment, the carbon nanotube solution may contain carbon nanotubes, carboxymethyl cellulose, and a solvent. The solvent may include water and/or an alcohol-based solvent. For example, the carbon nanotube solution may include 0.1 wt % to 5 wt % of carbon nanotubes, 0.01 wt % to 3 wt % of carboxymethyl cellulose, and the balance of the solvent. The carbon nanotube layer may be formed by depositing the carbon nanotube solution onto the outer circumferential surface of the second hard coating layer, followed by drying the carbon nanotube solution.

In one embodiment, the carbon nanotube layer may be present in an amount of 0.01 parts by weight to 50 parts by weight relative to 100 parts by weight of the secondary sintered product. Under these conditions, the carbon nanotube layer can exhibit good durability and electrical conductivity.

In one embodiment, the method may further include forming an organic coating layer on an outer circumferential surface of the carbon nanotube layer after formation of the carbon nanotube layer.

In one embodiment, the organic coating layer may be formed to improve thermal stability and lifespan of the anode material.

In one embodiment, the organic coating layer may include at least one selected from among a polyolefin compound, polyolefin wax, and an acrylic compound. The polyolefin compound may include polyethylene and/or polypropylene.

In one embodiment, the method may further include pulverizing and classifying the anode material using a screen and a sieve.

In one embodiment, the anode material includes: a core including a porous matrix containing nano-silicon (Si) and amorphous hard carbon, and flake graphite dispersed in the porous matrix; a first hard coating layer and a second hard coating layer sequentially formed on the outer circumferential surface of the core and each containing amorphous hard carbon; and a carbon nanotube layer formed on the outer circumferential surface of the second hard coating layer, wherein the first hard coating layer has higher hardness than the second hard coating layer.

In one embodiment, the anode material may include 25 wt % to 80 wt % of the nano-silicon, optionally 60 wt % or less of the flake graphite, 5 wt % to 50 wt % of the amorphous hard carbon, 0.1 wt % to 35 wt % of the first hard coating layer, 0.1 wt % to 35 wt % of the second hard coating layer, and 0.01 wt % to 10 wt % of the carbon nanotube layer.

In another embodiment, the anode material may include 25 wt % to 80 wt % of the nano-silicon, greater than 0 wt % to 60 wt % or less of the flake graphite, 5 wt % to 50 wt % of the amorphous hard carbon, 0.15 wt % to 35 wt % of the first hard coating layer, 0.1 wt % to 15 wt % of the second hard coating layer, and 0.01 wt % to 10 wt % of the carbon nanotube layer.

Fifth Embodiment

In yet another embodiment, the method of preparing the anode material includes: drying a first mixture comprising graphite balls, a nano-silicon slurry, pitch, and flake graphite to prepare a dried product (S51); performing primary sintering of the dried product to form a primary sintered product including a first hard coating layer formed on the outermost surface thereof and containing amorphous hard carbon (S52); mixing the primary sintered product with a carbon precursor, followed by heat treatment to form an intermediate product including a soft coating layer on an outer circumferential surface of the first hard coating layer (S53); mixing the intermediate product with pitch, followed by secondary sintering to form a secondary sintered product (S54); and forming a carbon nanotube layer on an outer circumferential surface of the secondary sintered product (S54). The secondary sintered product includes a first hard coating layer containing amorphous hard carbon, an amorphous carbon layer, and a second hard coating layer containing amorphous hard carbon sequentially formed on the outermost surface thereof.

Hereinafter, each step of the anode material preparation method will be described in detail.

(S51) Dried Product Preparation Step

In this step, a dried product is prepared by drying a first mixture comprising graphite balls, a nano-silicon slurry, pitch, and flake graphite. The graphite balls, the nano-silicon slurry, the flake graphite and the pitch may be the same as described above.

In one embodiment, the nano-silicon slurry may be prepared by dispersing silicon powder and a dispersant in a first solvent to prepare a dispersion, followed by grinding the dispersion.

For example, the graphite balls may be prepared by mixing a binder solution containing pitch and a second solvent with graphite to prepare a graphite solution, sintering the graphite mixture after compression of the graphite mixture, and grinding the sintered graphite mixture.

The prepared graphite balls allow easy formation of a core including a porous matrix containing nano-silicon and amorphous hard carbon while securing good capacity characteristics, durability and structural stability of the anode material.

The graphite balls, the flake graphite, the pitch and the nano-silicon slurry may be the same as those described above.

The first mixture includes the graphite balls, the flake graphite, the pitch, the nano-silicon, and a solvent. Here, the solvent may include at least one selected from among ethanol, isopropyl alcohol, and water.

In one embodiment, the first mixture may include the graphite balls, the flake graphite, the pitch and the nano-silicon in a weight ratio of 1:2 to 8:1 to 25:5 to 70 in terms of solid content. Within this range, the first mixture can exhibit good miscibility and dispersibility while allowing easy preparation of the anode material. For example, the first mixture may include the graphite balls, the flake graphite, the pitch and the nano-silicon in a weight ratio of 1:4 to 6:5 to 10:10 to 15.

In one embodiment, the pitch may include at least one selected from among pyrolysis fuel oil pitch, polyimide pitch, polyacrylonitrile (PAN) pitch, and coal tar pitch. The pitch can secure good binder properties and high-capacity characteristics.

The particle size of the anode material can be easily adjusted by drying the first mixture. For example, drying may be performed using a spray dryer or the like. For example, spray drying may be carried out using a spray dryer provided with a single-fluid nozzle, a two-fluid nozzle, or a four-fluid nozzle.

In one embodiment, the dried product may have a spherical, polyhedral or elliptical shape. For example, the dried product may have a spherical shape.

In one embodiment, the dried product may have an average particle diameter (or size) of 0.1 μm to 15 μm. Under this condition, the dried product can exhibit good miscibility and formability.

In one embodiment, as prepared by spray-drying the first mixture using a single-fluid nozzle at an air flow rate of 650 sccm to 850 sccm, with the spray dryer set to have an outlet temperature of 70° C. to 130° C., the dried product may have an average particle diameter of 7 μm to 14 μm. In another embodiment, as prepared by spray drying the first mixture using a four-fluid nozzle, the dried product may have an average particle diameter of 0.1 μm to 8 μm.

The particle size of the anode material can be easily adjusted by drying the first mixture. For example, drying may be performed using a spray dryer or the like. For example, spray drying may be carried out using a spray dryer provided with a single-fluid nozzle, a two-fluid nozzle, or a four-fluid nozzle.

The flake graphite may be used to secure conductivity, high output and high-capacity characteristics of the anode material. The flake graphite may include natural graphite and/or synthetic graphite. The flake graphite may be prepared by delamination or grinding of spherical graphite, without being limited thereto. In one embodiment, the flake graphite may include a crystal shape in which carbon atoms are stacked in the form of multiple regular-hexagonal planes to have a thickness in a direction perpendicular to the hexagonal planes. The flake graphite has a larger surface area than spherical graphite with the same capacity and good properties in terms of economic feasibility, electrical conductivity and high-capacity characteristics.

(S52) Primary Sintered Product Preparation Step

In this step, the dried product is subjected to primary sintering to form a primary sintered product including a first hard coating layer formed on the outermost surface thereof and containing amorphous hard carbon.

In one embodiment, primary sintering may be carried out at a temperature of 600° C. to 1,250° C. In sintering, the pitch of the dried product is melted in a temperature range of 200° C. to 300° C., the solvent is evaporated from the pitch in a temperature range of 350° C. to 550° C., and a thermosetting material is carbonized in a temperature range of 600° C. to 1,250° C. By sintering under this condition, a core including flake graphite dispersed in a porous matrix containing nano-silicon and amorphous hard carbon may be formed to have the first hard coating layer formed on the outermost surface of the core and containing amorphous hard carbon.

(S53) Intermediate Product Preparation Step

In this step, the primary sintered product is mixed with a carbon precursor and is subjected to heat treatment to form a soft coating layer on an outer circumferential surface of the first hard coating layer.

In one embodiment, a mixture including 100 parts by weight of the primary sintered product and 0.1 parts by weight to 30 parts by weight of the carbon precursor may be subjected to heat treatment. Within this range, the primary sintered product has good miscibility and allows easy formation of the soft coating layer on an outer circumferential surface of the first hard coating layer.

In one embodiment, the carbon precursor may include at least one selected from among polyimide, polyacrylonitrile, polyvinyl pyrrolidone, glucose, cellulose, hydrogenated nitrile butadiene rubber, nitrile butadiene rubber, polyvinylidene fluoride, styrene butadiene rubber, and sucrose. The carbon precursor serves to allow easy formation of the soft coating layer.

For example, the carbon precursor may further include a solvent. The solvent may include at least one selected from among water, an alcohol-based solvent, an amide-based solvent, an ester-based solvent, and a hydrocarbon-based solvent. The solvent serves to secure good workability.

The alcohol-based solvent may include at least one selected from among methanol, ethanol, isopropanol, and butanol.

The amide-based solvent may include at least one selected from N-methyl-2-pyrrolidone (NMP), dimethyl acetamide (DMAC), and dimethyl formamide (DMF).

The hydrocarbon-based solvent may include toluene and/or xylene.

In one embodiment, heat treatment may be performed at 80° C. to 300° C. By heat treatment under this condition, the soft coating layer can be easily formed on the outer circumferential surface of the first hard coating layer.

(S54) Secondary Sintered Product Preparation Step

In this step, the intermediate product is mixed with pitch and subjected to secondary sintering to form a secondary sintered product.

In one embodiment, the pitch may include at least one selected from among pyrolysis fuel oil pitch, polyimide pitch, polyacrylonitrile (PAN) pitch, and coal tar pitch. The pitch can secure good binder properties and high-capacity characteristics.

In one embodiment, a mixture including 100 parts by weight of intermediate product and 0.1 to 30 parts by weight of the pitch may be subjected to heat treatment. Under this condition, the mixture can exhibit good miscibility.

In one embodiment, secondary sintering may be carried out at a temperature of 600° C. to 1,250° C. In sintering, the pitch of the dried product is melted in a temperature range of 200° C. to 300° C., the solvent is evaporated from the pitch in a temperature range of 350° C. to 550° C., and a thermosetting material is carbonized in a temperature range of 600° C. to 1,250° C. By sintering under this condition, a secondary sintered product including a first hard coating layer containing amorphous hard carbon, an amorphous carbon layer, and a second hard coating layer containing amorphous hard carbon sequentially formed on the outermost surface of the core is formed.

(S55) Carbon Nanotube Layer Formation Step

In this step, a carbon nanotube layer is formed on an outer circumferential surface of the secondary sintered product. For example, the carbon nanotube layer may be formed by depositing a solution containing carbon nanotubes on the outer circumferential surface of the secondary sintered product (or on an outer circumferential surface of the second hard coating layer), followed by drying the solution.

In one embodiment, the carbon nanotube solution may contain carbon nanotubes, carboxymethyl cellulose, and a solvent. The solvent may include water and/or an alcohol-based solvent. For example, the carbon nanotube solution may include 0.1 wt % to 5 wt % of carbon nanotubes, 0.01 wt % to 3 wt % of carboxymethyl cellulose, and the balance of the solvent. The carbon nanotube layer may be formed by depositing the carbon nanotube solution onto the outer circumferential surface of the second hard coating layer, followed by drying the carbon nanotube solution.

In one embodiment, the carbon nanotube layer may be present in an amount of 0.01 parts by weight to 50 parts by weight relative to 100 parts by weight of the secondary sintered product. Under these conditions, the carbon nanotube layer can exhibit good durability and electrical conductivity.

In one embodiment, the method may further include forming an organic coating layer on an outer circumferential surface of the carbon nanotube layer after formation of the carbon nanotube layer.

In one embodiment, the organic coating layer may be formed to improve thermal stability and lifespan of the anode material.

In one embodiment, the organic coating layer may include at least one selected from among a polyolefin compound, polyolefin wax, and an acrylic compound. The polyolefin compound may include polyethylene and/or polypropylene.

In one embodiment, the method may further include pulverizing and classifying the anode material using a screen and a sieve.

In one embodiment, the anode material includes a core including a porous matrix containing nano-silicon (Si) and amorphous hard carbon, and flake graphite dispersed in the porous matrix; a first hard coating layer formed on the outer circumferential surface of the core and containing amorphous hard carbon; an amorphous carbon layer formed on the outer circumferential surface of the first hard coating layer; a second hard coating layer formed on the outer circumferential surface of the amorphous carbon layer and containing amorphous hard carbon; and a carbon nanotube layer formed on the outer circumferential surface of the second hard coating layer, wherein each of the first hard coating layer and the second hard coating layer has higher hardness than the amorphous carbon layer.

In one embodiment, the anode material may include 25 wt % to 80 wt % of the nano-silicon, optionally 60 wt % or less of the flake graphite, 5 wt % to 50 wt % of the amorphous hard carbon, 0.1 wt % to 35 wt % of the first hard coating layer, 0.1 to 15 wt % of the amorphous carbon layer, 0.1 wt % to 35 wt % of the second hard coating layer, and 0.01 wt % to 10 wt % of the carbon nanotube layer.

In another embodiment, the anode material may include 25 wt % to 80 wt % of the nano-silicon, greater than 0 wt % to 60 wt % or less of the flake graphite, 5 wt % to 50 wt % of the amorphous hard carbon, 0.3 wt % to 20 wt % of the first hard coating layer, 0.2 to 5 wt % of the amorphous carbon layer, 0.1 wt % to 15 wt % of the second hard coating layer, and 0.01 wt % to 10 wt % of the carbon nanotube layer.

Bilayer-Structured Silicon Carbon Composite Anode Material

Another aspect of embodiments of the present invention relates to a bilayer-structured silicon carbon composite anode material prepared by the method of preparing a bilayer-structured silicon carbon composite anode material.

First Embodiment

FIG. 1 is a view of a bilayer-structured silicon carbon composite anode material according to one embodiment of the present invention. Referring to FIG. 1, an anode material 100 includes a core 10 including a porous matrix containing nano-silicon (Si) 12 and amorphous hard carbon 14, and flake graphite 16 dispersed in the porous matrix; a hard coating layer 20 formed on an outer circumferential surface of the core 10 and containing amorphous hard carbon 14; a soft coating layer 30 formed on an outer circumferential surface of the hard coating layer 20; and a carbon nanotube layer 40 formed on an outer circumferential surface of the soft coating layer 30.

In one embodiment, the anode material may include 25 wt % to 80 wt % of the nano-silicon, 1 wt % to 60 wt % of the flake graphite, 5 wt % to 50 wt % of the amorphous hard carbon, 0.1 wt % to 10 wt % of the hard coating layer, 0.1 wt % to 5 wt % of the soft coating layer, and 0.01 wt % to 10 wt % of the carbon nanotube layer.

In one embodiment, the anode material may have an average diameter of 0.5 µm to 50 µm, the core may have a diameter of 0.5 µm to 15 µm, the flake graphite may have an average size of 0.2 µm to 8 µm, the soft coating layer may have a thickness of 0.05 µm to 5 µm, the hard coating layer may have a thickness of 0.05 µm to 5 µm, and the carbon nanotube layer may have a thickness of 0.01 µm to 10 µm.

In one embodiment, the anode material 100 may have a spherical shape or an elliptical shape. For example, the anode material 100 may have a spherical shape.

In one embodiment, the anode material 100 may have an average diameter of 0.5 µm to 50 µm. With this range of average diameter, the anode material can have good properties in terms of structural stability and high capacity/high output characteristics and can minimize volume expansion during charging/discharging to secure long lifespan. For example, the anode material 100 may have an average diameter of 5 μm to 15 μm.

In one embodiment, the anode material may be porous to have a surface porosity of 20% by volume (vol %) to 60 vol %. Under this condition, the anode material can have good properties in terms of electrolyte embedment, structural stability, and high capacity/high output characteristics.

In one embodiment, the anode material may have a particle density of 1.2 g/cm$^3$ to 2.0 g/cm$^3$. In another embodiment, the anode material may have a particle density of 0.8 g/cm$^3$ to 1.2 g/cm$^3$. Under this condition, the anode material can be lightweight and have good structural stability.

In one embodiment, the anode material may have an average pore size of 0.5 μm to 2 μm. In another embodiment, the anode material may have an average pore size of 0.01 μm to 0.1 μm. Under this condition, the anode material can have good structural stability and good high capacity/high output characteristics. In one embodiment, the anode material may have an average particle diameter (D50) of 5 μm to 7 μm. In another embodiment, the anode material may have an average particle diameter (D50) of 8 μm to 11 μm. In one embodiment, the anode material may have a capacity (energy density per weight) of 450 mAh/g to 1,800 mAh/g. Under this condition, the anode material can have good high capacity/high output characteristics.

In one embodiment, the anode material may have a tap density of 0.65 g/cm$^3$ to 1.3 g/cm$^3$. In one embodiment, the anode material may have a specific surface area BET of 3.5 μm$^2$/g to 15 μm$^2$/g. Under this condition, the anode material can have good structural stability and good high capacity/high output characteristics.

Core

The core 10 includes a porous matrix containing nano-silicon (Si) 12 and amorphous hard carbon 14, and flake graphite 16 dispersed in the porous matrix. Referring to FIG. 1, the amorphous hard carbon may be formed to surround the entire surface of the core 10. Under this condition, the core can have good structural stability to prevent cracking and destruction while minimizing deterioration in capacity to secure long lifespan.

In one embodiment, the core may have an average diameter (or maximum length) of 1 μm to 30 μm. Under this condition, the core can secure good high capacity/high output characteristics and structural stability of the adhesive material. For example, the core may have an average diameter (or maximum length) of 1 μm to 15 μm.

The core may have a spherical shape or an elliptical shape. For example, the core may have a spherical shape.

In one embodiment, the amorphous hard carbon may include hard carbon prepared by sintering graphite balls and/or hard carbon prepared by sintering pitch.

In one embodiment, the amorphous hard carbon may be present in an amount of 5 wt % to 50 wt % based on the total weight of the anode material. Within this range of the amorphous hard carbon, the porous matrix can have good durability and structural stability while securing good high capacity/high output characteristics. For example, the amorphous hard carbon may be present in an amount of 5 wt % to 35 wt %. In another embodiment, the amorphous hard carbon may be present in an amount of 10 wt % to 35 wt %. For example, the amorphous hard carbon may be present in an amount of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 38, 39, 40, 41, 42, 43, 44, 45, 46, 47, 48, 49 or 50 wt %.

The nano-silicon serves to secure good high capacity/high output characteristics. In one embodiment, the nano-silicon may have an average diameter of 1.5 μm or less. For example, the nano-silicon may have a smaller diameter than the core. Within this range, the nano-silicon can exhibit good miscibility and dispersibility and can provide good durability and structural stability to the porous matrix while securing good high capacity/high output characteristics. For example, the nano-silicon may have an average diameter of 60 nm to 100 nm. In another embodiment, the nano-silicon may have an average diameter of 40 nm to 120 nm.

In one embodiment, the nano-silicon may have a spherical, polyhedral or elliptical shape. For example, the nano-silicon may have a spherical shape.

In one embodiment, the nano-silicon may be present in an amount of 25 wt % to 80 wt % based on the total weight of the anode material. Within this range, the nano-silicon can have good miscibility and durability while securing good high capacity/high output characteristics.

For example, the nano-silicon may be present in an amount of 25 wt % to 55 wt % based on the total weight of the anode material. In another embodiment, the nano-silicon may be present in an amount of 45 wt % to 80 wt %. Under this condition, the anode material can have good high capacity/high output characteristics. For example, the nano-silicon may be present in an amount of 25, 26, 27, 28, 29, 30, 31, 32, 33, 34, 35, 36, 36, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 wt %.

The flake graphite serves to secure good conductivity and high output/high-capacity characteristics of the anode material. The flake graphite may include natural graphite and/or synthetic graphite. The flake graphite may be prepared by delamination or grinding of spherical graphite, without being limited thereto. In one embodiment, the flake graphite may have a crystalline structure in which carbon atoms are stacked in the form of multiple regular-hexagonal planes to have a thickness in a direction perpendicular to the hexagonal planes. The flake graphite has a larger surface area than spherical graphite with the same capacity and good properties in terms of economic feasibility, electrical conductivity and high-capacity characteristics.

In one embodiment, the flake graphite may be present in an amount of 1 wt % to 60 wt % based on the total weight of the anode material. Within this range, the flake graphite can have good miscibility and durability while securing good electrical conductivity and high capacity/high output characteristics of the anode material. For example, the flake graphite may be present in an amount of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 38, 39, 40, 41, 42, 43, 44, 45, 46, 47, 48, 49, 50, 51, 52, 53, 54, 55, 56, 57, 58, 59 or 60 wt %.

In one embodiment, the flake graphite may have an average size of 0.2 μm to 8 μm. Here, "size" may mean the "maximum length" of the flake graphite. With this range of average size, the flake graphite can have good miscibility and dispersibility while securing good electrical conductivity and high capacity/high output characteristics of the anode material. For example, the flake graphite may have an average size of 0.2 μm to 2 μm.

Referring to FIG. 1, the anode material 100 may further include conductive powder 18 dispersed in the porous matrix. In one embodiment, the conductive powder may include at least one selected from among carbon black, acetylene black, Ketjen black, and furnace black. For example, the conductive powder may include carbon black.

In one embodiment, the conductive powder may have an average particle diameter of 5 nm to 10 µm. Under this condition, the conductive powder can have good miscibility and dispersibility.

In one embodiment, the conductive powder may be present in an amount of greater than 0 to 25 wt % based on the total weight of the anode material. Within this range, the conductive powder can have good miscibility and dispersibility while securing good conductivity and high capacity/high output characteristics of the anode material. For example, the conductive powder may be present in an amount of 5 wt % to 25 wt %. For example, the conductive powder may be present in an amount of 0.1, 0.5, 1, 2, 3, 4, 5, 6, 7, 8, 9, 10, 11, 12, 13, 14, 15, 16, 17, 18, 19, 20, 21, 22, 23, 24 or 25 wt %.

In one embodiment, in the anode material further including the conductive powder, the conductive powder may be further added to the nano-silicon slurry in the dried product preparation step. In another embodiment, the conductive powder may be further added to the pitch for mixing the pitch for sintering. In a further embodiment, the conductive powder may be coated on the outer circumferential surface of the sintered product after sintering.

Hard Coating Layer

The hard coating layer 20 contains amorphous hard carbon and is formed on the outer circumferential surface of the core. The hard coating layer may have a thickness of 0.05 µm to 5 µm. Within this range, the hard coating layer can have good durability and structural stability.

In one embodiment, the amorphous hard carbon may include hard carbon prepared by sintering graphite balls and/or hard carbon prepared by sintering pitch.

In one embodiment, the hard coating layer may be present in an amount of 0.1 wt % to 10 wt % based on the total weight of the anode material. Within this range, the hard coating layer can have good durability and structural stability. For example, the hard coating layer may be present in an amount of 5 wt % to 10 wt % based on the total weight of the anode material. In another embodiment, the hard coating layer may be present in an amount of 10 wt % to 35 wt % based on the total weight of the anode material. For example, the hard coating layer may be present in an amount of 0.1, 0.2, 0.3, 0.4, 0.5, 0.6, 0.7, 0.8, 0.9, 1, 2, 3, 4, 5, 6, 7, 8, 9 or 10 wt %.

Soft Coating Layer

The soft coating layer 30 is formed on an outer circumferential surface 20 of the hard coating layer. The soft coating layer contains amorphous soft carbon and may be formed by heat treatment of a carbon precursor. In one embodiment, the core (or hard coating layer) has higher hardness than the soft coating layer. Under this condition, the soft coating layer can secure good high capacity/high output characteristics and structural stability while securing long lifespan through minimization of volume expansion during charging/discharging.

Figure 2A:
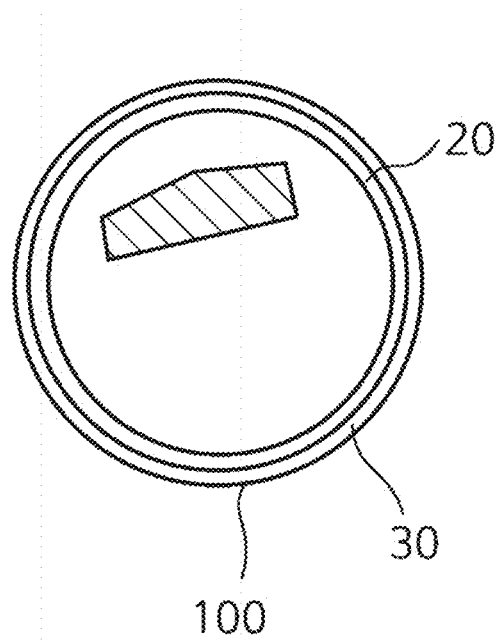
FIG. 2A is a view of an anode material according to one embodiment of the present invention.
Figure 2B:
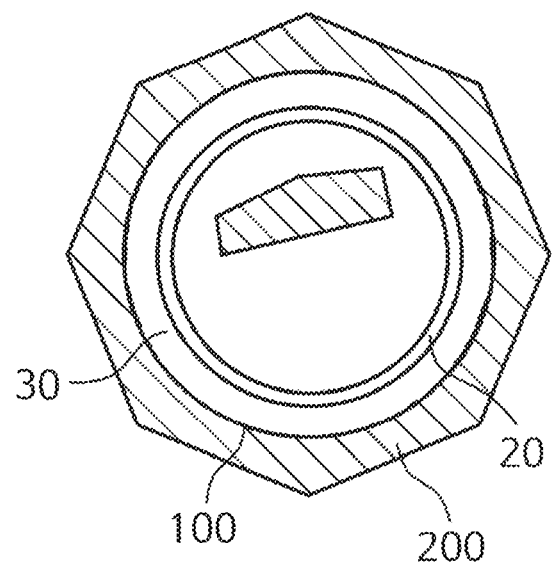
FIG. 2B is a view illustrating a volume change due to intercalation/deintercalation of lithium ions of the anode material.

FIG. 2A is a view of an anode material according to one embodiment of the present invention and FIG. 2B is a view illustrating a volume change due to intercalation/deintercalation of lithium ions of the anode material. On the other hand, the main reason for capacity loss of silicon-based anode materials is fracture due to a large volume change that occurs during intercalation/deintercalation of lithium ions.

Referring to FIG. 2, upon intercalation of lithium ions into the anode material 100, the volume of the soft coating layer 30 placed at an outer side of the anode material increases, whereas the hard coating layer 20 placed at an interior side of the anode material and containing fewer lithium ions undergoes less volume expansion. Such a strain gradient in the anode material can generate stress varying throughout the anode material. As a result, with the structure of the soft coating layer exhibiting soft characteristics and the coating layer exhibiting hard characteristics, the anode material according to embodiments of the present invention can minimize volume expansion upon intercalation of lithium ions through generation of the stress gradient, can have good structural stability to prevent breakage and fracture, has a stable SEI layer 200 formed on the outer circumferential surface thereof, and can exhibit long lifespan through minimization of deterioration in capacity.

In one embodiment, the soft coating layer 30 may have a thickness of 0.05 µm to 5 µm. Within this thickness range, the soft coating layer can prevent breakage and fracture of the anode material upon intercalation/deintercalation of lithium ions and can minimize deterioration in capacity to secure long lifespan of the anode material. For example, the soft coating layer may have a thickness of 0.1 µm to 1.5 µm.

In one embodiment, the soft coating layer may be present in an amount of 0.1 wt % to 5 wt % based on the total weight of the anode material. Within this range, the soft coating layer can prevent breakage and fracture of the anode material upon intercalation/deintercalation of lithium ions and can minimize deterioration in capacity to secure long lifespan of the anode material. For example, the soft coating layer may be present in an amount of 0.1 wt % to 3.0 wt % based on the total weight of the anode material. For example, the soft coating layer may be present in an amount of 0.5 wt % to 2 wt %. For example, the soft coating layer may be present in an amount of 0.1, 0.2, 0.3, 0.4, 0.5, 0.6, 0.7, 0.8, 0.9, 1, 2, 3, 4 or 5 wt %. In one embodiment, the soft coating layer and the hard coating layer may be present in a weight ratio of 1:2 to 1:8. Within this range, the anode material can secure good durability and structural stability of the anode material while preventing breakage and fracture due to volume expansion upon intercalation/deintercalation of lithium ions.

In one embodiment, the hard coating layer may have higher hardness than the soft coating layer. Under this condition, the anode material can minimize volume expansion upon intercalation of lithium ions, can have good structural stability to prevent breakage and fracture of the anode material, and can minimize deterioration in capacity to secure long lifespan of the anode material.

Carbon Nanotube Layer

The carbon nanotube layer 40 is formed on the outer circumferential surface of the soft coating layer 30. The carbon nanotube layer serves to improve electrical conductivity of the anode material while securing good high capacity/high output characteristics thereof.

For example, the anode material 100 may include the carbon nanotube layer formed on the outermost surface of the soft coating layer 30 and containing carbon nanotubes. The carbon nanotube layer may refer to a layer formed by spaces of the carbon nanotubes. For example, the carbon nanotube layer may be formed in a structure in which the carbon nanotubes are inserted into pores formed on the core and the outermost surface of the soft coating layer or in some regions thereof, or in which the carbon nanotubes are irregularly dispersed on the outer circumferential surface of powder. In another embodiment, the carbon nanotube layer

40 may be formed in the form of the carbon nanotubes secured to each other by a binder or the like or by van der Waals force.

The carbon nanotubes may include at least one type selected from among single-walled carbon nanotubes, double-walled carbon nanotubes, multi-walled carbon nanotubes and bundle type carbon nanotubes.

In one embodiment, the carbon nanotube layer may be present in an amount of 0.01 wt % to 10 wt % based on the total weight of the anode material. Within this range, the carbon nanotube layer can secure good structural stability, electrical conductivity, and high capacity/high output characteristics of the anode material. For example, the carbon nanotube layer may be present in an amount of 0.05 wt % to 5 wt %. For example, the carbon nanotube layer may be present in an amount of 0.01, 0.05, 0.1, 0.2, 0.3, 0.4, 0.5, 0.6, 0.7, 0.8, 0.9, 1, 2, 3, 4, 5, 6, 7, 8, 9 or 10 wt %.

For example, the carbon nanotube layer may have a thickness of 0.01 µm to 10 µm. Under this condition, the carbon nanotube layer can secure good structural stability and electrical conductivity of the anode material. For example, the carbon nanotube layer may have a thickness of 1 µm to 10 µm.

For example, the carbon nanotubes may have a length of 0.01 µm to 50 µm. Under this condition, the carbon nanotube layer can secure good structural stability and electrical conductivity of the anode material. For example, the carbon nanotubes may have a length of 0.5 µm to 50 µm.

Second Embodiment

An anode material according to another embodiment of the present invention includes: a core including a porous matrix containing nano-silicon (Si) and amorphous hard carbon, and flake graphite dispersed in the porous matrix; a first soft coating layer formed on an outer circumferential surface of the core; a hard coating layer formed on an outer circumferential surface of the first soft coating layer and containing amorphous hard carbon; a second soft coating layer formed on an outer circumferential surface of the hard coating layer; and a carbon nanotube layer formed on an outer circumferential surface of the second soft coating layer.

In one embodiment, the anode material may include 25 wt % to 80 wt % of the nano-silicon, optionally 60 wt % or less of the flake graphite, 5 wt % to 50 wt % of the amorphous hard carbon, 0.1 wt % to 10 wt % of the hard coating layer, 0.1 wt % to 15 wt % of the first soft coating layer, 0.1 wt % to 15 wt % of the second soft coating layer, and 0.01 wt % to 10 wt % of the carbon nanotube layer.

In one embodiment, the anode material may have an average diameter of 5 µm to 15 µm, the core may have a diameter of 1 µm to 15 µm, the flake graphite may have an average size of 0.2 µm to 8 µm, the first soft coating layer may have a thickness of 0.05 to 5 µm, the second soft coating layer may have a thickness of 0.5 µm to 10 µm, the hard coating layer may have a thickness of 0.05 to 5 µm, and the carbon nanotube layer may have a thickness of 0.01 µm to 10 µm.

For example, the carbon nanotubes may have a length of 1 µm to 50 µm. Under this condition, the anode material can exhibit good structural stability and electrical conductivity. For example, the carbon nanotubes may have a length of 5 µm to 50 µm.

In one embodiment, the anode material may have a particle density of 1.2 g/cm$^3$ to 2.0 g/cm$^3$. In another embodiment, the anode material may have a particle density of 0.8 g/cm$^3$ to 1.2 g/cm$^3$. Under this condition, the anode material can be lightweight and have good structural stability.

In one embodiment, the anode material may have a surface porosity of 20 vol % to 50 vol %. Under this condition, the anode material can have good structural stability and high capacity/high output characteristics. In one embodiment, the anode material may have an average pore size of 0.5 µm to 2 µm. In another embodiment, the anode material may have an average pore size of 0.01 µm to 0.1 µm. Under this condition, the anode material can have good structural stability and high capacity/high output characteristics.

In one embodiment, the nano-silicon may be present in an amount of 25 wt % to 55 wt % based on the total weight of the anode material. In another embodiment, the nano-silicon may be present in an amount of 45 wt % to 80 wt %. Under this condition, the nano-silicon can secure good high capacity/high output characteristics of the anode material.

In one embodiment, the anode material may have an average particle diameter (D50) of 5 µm to 7 µm. In another embodiment, the anode material may have an average particle diameter (D50) of 8 µm to 11 µm. In one embodiment, the anode material may have a capacity (energy density per weight) of 650 mAh/g to 1,600 mAh/g. Under this condition, the anode material can have good high capacity/high output characteristics.

In one embodiment, the anode material may have a tap density of 0.65 µm$^2$/g to 1.3 g/cm$^3$. In one embodiment, the anode material may have a specific surface area of 1.5 µm$^2$/g to 6 µm$^2$/g. Under this condition, the anode material can have good structural stability and high capacity/high output characteristics.

Core

The core includes a porous matrix containing nano-silicon (Si) and amorphous hard carbon, and flake graphite dispersed in the porous matrix. The amorphous hard carbon may be formed to surround the entire surface of the core 10. Under this condition, the core can have good structural stability to prevent cracking and destruction while minimizing deterioration in capacity to secure long lifespan.

In one embodiment, the core may have an average diameter (or maximum length) of 1 µm to 30 µm. Under this condition, the core can secure good high capacity/high output characteristics and structural stability of the adhesive material. For example, the core may have an average diameter of 1 µm to 15 µm.

For example, the porous matrix may have a porous structure in which nano-silicon is coupled to the amorphous hard carbon. In one embodiment, the porous matrix may have a porosity of 5% to 80%. Under this condition, the porous matrix can exhibit good electrolyte impregnation while securing good high capacity/high output characteristics and structural stability of the anode material.

The core may have a spherical shape or an elliptical shape. For example, the core may have a spherical shape.

In one embodiment, the amorphous hard carbon may include hard carbon prepared by sintering graphite balls and/or hard carbon prepared by sintering pitch.

In one embodiment, the amorphous hard carbon of the core may be present in an amount of 5 wt % to 50 wt % based on the total weight of the anode material. Within this range of the amorphous hard carbon, the porous matrix can have good durability and structural stability while securing good high capacity/high output characteristics. For example, the amorphous hard carbon may be present in an amount of 5 wt % to 35 wt %. In another embodiment, the amorphous hard carbon may be present in an amount of 10 wt % to 35 wt %. For example, the amorphous hard carbon may be present in an amount of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 38, 39, 40, 41, 42, 43, 44, 45, 46, 47, 48, 49 or 50 wt %.

The nano-silicon serves to secure good high capacity/high output characteristics. In one embodiment, the nano-silicon may have an average diameter of 1.5 µm or less. For example, the nano-silicon may have a smaller diameter than the core. Within this range, the nano-silicon can exhibit good miscibility and dispersibility and can provide good durability and structural stability to the porous matrix while securing good high capacity/high output characteristics. For example, the nano-silicon may have an average diameter of 60 nm to 100 nm. In another embodiment, the nano-silicon may have an average diameter of 40 nm to 120 nm.

In one embodiment, the nano-silicon may have a spherical, polyhedral or elliptical shape. For example, the nano-silicon may have a spherical shape.

In one embodiment, the nano-silicon may be present in an amount of 25 wt % to 80 wt % based on the total weight of the anode material. Within this range, the nano-silicon can have good miscibility and durability while securing good high capacity/high output characteristics. For example, the nano-silicon may be present in an amount of 25 wt % to 55 wt %. In another embodiment, the nano-silicon may be present in an amount of 45 wt % to 80 wt %.

For example, the nano-silicon may be present in an amount of 25, 26, 27, 28, 29, 30, 31, 32, 33, 34, 35, 36, 36, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 wt %.

The flake graphite serves to secure good conductivity and high output/high-capacity characteristics of the anode material. The flake graphite may include natural graphite and/or synthetic graphite. The flake graphite may be prepared by delamination or grinding of spherical graphite, without being limited thereto.

In one embodiment, the flake graphite may have a crystalline structure in which carbon atoms are stacked in the form of multiple regular-hexagonal planes to have a thickness in a direction perpendicular to the hexagonal planes. The flake graphite has a larger surface area than spherical graphite with the same capacity and good properties in terms of economic feasibility, electrical conductivity and high-capacity characteristics.

In one embodiment, the flake graphite may be optionally present in an amount of 60 wt % or less based on the total weight of the anode material. Within this range, the flake graphite can have good miscibility and durability while securing good electrical conductivity and high capacity/high output characteristics of the anode material.

For example, the flake graphite may be present in an amount of 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 38, 39, 40, 41, 42, 43, 44, 45, 46, 47, 48, 49, 50, 51, 52, 53, 54, 55, 56, 57, 58, 59 or 60 wt %.

In one embodiment, the flake graphite may have an average size of 0.2 µm to 8 µm. Here, "size" may mean the "maximum length" of the flake graphite. With this range of average size, the flake graphite can have good miscibility and dispersibility while securing good electrical conductivity and high capacity/high output characteristics of the anode material. For example, the flake graphite may have an average size of 0.2 µm to 2 µm.

The anode material may further include conductive powder dispersed in the porous matrix. In one embodiment, the conductive powder may include at least one selected from among carbon black, acetylene black, Ketjen black, and furnace black. For example, the conductive powder may include carbon black.

In one embodiment, the conductive powder may have an average particle diameter of 5 nm to 10 µm. Under this condition, the conductive powder can have good miscibility and dispersibility.

In one embodiment, the conductive powder may be present in an amount of greater than 0 to 25 wt % based on the total weight of the anode material. Within this range, the conductive powder can have good miscibility and dispersibility while securing good conductivity and high capacity/high output characteristics of the anode material. For example, the conductive powder may be present in an amount of 5 wt % to 25 wt %. For example, the conductive powder may be present in an amount of 0.1, 0.5, 1, 2, 3, 4, 5, 6, 7, 8, 9, 10, 11, 12, 13, 14, 15, 16, 17, 18, 19, 20, 21, 22, 23, 24 or 25 wt %.

First Soft Coating Layer

The first soft coating layer is formed on the outer circumferential surface of the core. The first soft coating layer contains amorphous soft carbon and may be formed by heat treatment of a carbon precursor. Under this condition, the first soft coating layer can secure good high capacity/high output characteristics and structural stability while securing long lifespan through minimization of volume expansion during charging/discharging.

In one embodiment, the first soft coating layer may have a thickness of 0.05 µm to 5 µm. Within this thickness range, the first soft coating layer can prevent breakage and fracture of the anode material upon intercalation/deintercalation of lithium ions and can minimize deterioration in capacity to secure long lifespan of the anode material. For example, the first soft coating layer may have a thickness of 0.1 µm to 1.5 µm.

In one embodiment, the first soft coating layer may be present in an amount of 0.1 wt % to 15 wt % based on the total weight of the anode material. Within this range, the first soft coating layer can prevent breakage and fracture of the anode material upon intercalation/deintercalation of lithium ions and can minimize deterioration in capacity to secure long lifespan of the anode material. For example, the first soft coating layer may be present in an amount of 0.5 wt % to 5 wt %. For example, the first soft coating layer may be present in an amount of 0.1, 0.2, 0.3, 0.4, 0.5, 0.6, 0.7, 0.8, 0.9, 1, 2, 3, 3.33, 4, 5, 6, 7, 8, 9, 10, 11, 12, 13, 14 or 15 wt %.

Hard Coating Layer

The hard coating layer contains amorphous hard carbon and is formed on the outer circumferential surface of the first soft coating layer. In one embodiment, the hard coating layer may have a thickness of 0.01 µm to 10 µm. Within this range, the hard coating layer can have good durability and structural stability. For example, the hard coating layer may have a thickness of 0.05 µm to 5 µm.

In one embodiment, the hard coating layer may be present in an amount of 0.1 wt % to 10 wt % based on the total weight of the anode material. Within this range, the hard coating layer can have good structural stability while securing good high capacity/high output characteristics. For example, the hard coating layer may be present in an amount of 5 wt % to 10 wt %. In another embodiment, the hard coating layer may be present in an amount of 5 wt % to 10 wt %. For example, the hard coating layer may be present in an amount of 0.1, 0.2, 0.3, 0.4, 0.5, 0.6, 0.7, 0.8, 0.9, 1, 2, 3, 4, 5, 6, 7, 8, 9 or 10 wt %.

Second Soft Coating Layer

The second soft coating layer is formed on the outer circumferential surface of the hard coating layer. The second soft coating layer contains amorphous soft carbon and may be formed by heat treatment of a carbon precursor. In one embodiment, the second soft coating layer may have a thickness of 0.1 μm to 5 μm. Within this thickness range, the second soft coating layer can prevent breakage and fracture of the anode material upon intercalation/deintercalation of lithium ions and can minimize deterioration in capacity to secure long lifespan of the anode material.

In one embodiment, the second soft coating layer may be present in an amount of 0.5 wt % to 15 wt % based on the total weight of the anode material. Within this range, the second soft coating layer can prevent breakage and fracture of the anode material upon intercalation/deintercalation of lithium ions and can minimize deterioration in capacity to secure long lifespan of the anode material. For example, the second soft coating layer may be present in an amount of 0.5 wt % to 2 wt %. For example, the second soft coating layer may be present in an amount of 0.1, 0.2, 0.3, 0.4, 0.5, 0.6, 0.7, 0.8, 0.9, 1, 2, 3, 4, 5, 6, 7, 8, 9, 10, 11, 12, 13, 14 or 15 wt %.

In one embodiment, the second soft coating layer may have a thickness of 0.5 μm to 10 μm. Within this thickness range, the second soft coating layer can prevent breakage and fracture of the anode material upon intercalation/deintercalation of lithium ions and can minimize deterioration in capacity to secure long lifespan of the anode material. For example, the second soft coating layer may have a thickness of 0.5 μm to 5 μm.

In one embodiment, the first soft coating layer and the second soft coating layer may be present in a total amount of 0.5 wt % to 5.0 wt % based on the total weight of the anode material. Under this condition, the anode material can exhibit good structural stability and high capacity/high output characteristics.

In one embodiment, the first soft coating layer, the second soft coating layer and the hard coating layer may be present in a weight ratio of 1:0.5 to 3:3 to 8. At this weight ratio of the coating layers, the anode material can exhibit good structural stability and can effectively prevent breakage and fracture of the anode material due to volume expansion upon intercalation/deintercalation of lithium ions.

In one embodiment, the hard coating layer may have higher hardness than the first soft coating layer and the second soft coating layer, respectively. Under this condition, the anode material can minimize volume expansion upon intercalation of lithium ions, can have good structural stability to prevent breakage and fracture of the anode material, and can minimize deterioration in capacity to secure long lifespan of the anode material.

Carbon Nanotube Layer

The carbon nanotube layer is formed on the outer circumferential surface of the second soft coating layer. The carbon nanotube layer serves to improve electrical conductivity of the anode material while securing good high capacity/high output characteristics thereof.

For example, the anode material may include the carbon nanotube layer formed on the outermost surface of the second soft coating layer and containing carbon nanotubes. The carbon nanotube layer may refer to a layer formed by spaces of the carbon nanotubes. For example, the carbon nanotube layer may be formed in a structure in which the carbon nanotubes are inserted into pores formed on the core and the outermost surface of the second soft coating layer or in some regions thereof, or in which the carbon nanotubes are irregularly dispersed on the outer circumferential surface of powder. In another embodiment, the carbon nanotube layer may be formed in the form of the carbon nanotubes secured to each other by a binder or the like or by van der Waals force.

The carbon nanotubes may include at least one type selected from among single-walled carbon nanotubes, double-walled carbon nanotubes, multi-walled carbon nanotubes and bundle type carbon nanotubes.

For example, the carbon nanotube layer may have a thickness of 0.01 μm to 10 μm. Under this condition, the carbon nanotube layer can secure good structural stability and electrical conductivity of the anode material. For example, the carbon nanotube layer may have a thickness of 1 μm to 10 μm.

For example, the carbon nanotubes may have a length of 0.01 μm to 50 μm. Under this condition, the carbon nanotube layer can secure good structural stability and electrical conductivity of the anode material. For example, the carbon nanotubes may have a length of 0.5 μm to 50 μm.

In one embodiment, the carbon nanotube layer may be present in an amount of 0.01 wt % to 10 wt % based on the total weight of the anode material. Within this range, the carbon nanotube layer can secure good structural stability, electrical conductivity, and high capacity/high output characteristics of the anode material. For example, the carbon nanotube layer may be present in an amount of 0.05 wt % to 5 wt %. For example, the carbon nanotube layer may be present in an amount of 0.01, 0.05, 0.1, 0.2, 0.3, 0.4, 0.5, 0.6, 0.7, 0.8, 0.9, 1, 2, 3, 4, 5, 6, 7, 8, 9 or 10 wt %.

Third Embodiment

An anode material according to a further embodiment of the present invention includes: a core including a porous matrix containing nano-silicon (Si) and amorphous hard carbon; a hard coating layer formed on an outer circumferential surface of the core and containing amorphous hard carbon; a first soft coating layer formed on an outer circumferential surface of the hard coating layer and containing soft carbon; and a second soft coating layer formed on an outer circumferential surface of the first soft coating layer and containing carbon nanotubes and soft carbon.

In one embodiment, the anode material may include 25 wt % to 80 wt % of the nano-silicon, 5 wt % to 50 wt % of the amorphous hard carbon, 0.1 wt % to 15 wt % of the hard coating layer, 0.1 wt % to 15 wt % of the first soft coating layer, and 0.1 wt % to 15 wt % of the second soft coating layer.

In one embodiment, the anode material may have an average diameter of 5 μm to 15 μm, the core may have a diameter of 1 μm to 15 μm, the hard coating layer may have a thickness of 0.05 to 5 μm, the first soft coating layer may have a thickness of 0.05 to 5 μm, and the second soft coating layer may have a thickness of 0.5 μm to 10 μm.

In one embodiment, the anode material may have a particle density of 1.2 $g/cm^3$ to 2.0 $g/cm^3$. In another embodiment, the anode material may have a particle density of 0.8 $g/cm^3$ to 1.2 $g/cm^3$. Under this condition, the anode material can be lightweight and exhibit good structural stability.

In one embodiment, the anode material may be porous to have a surface porosity of 20 vol % to 45 vol %. Under this condition, the anode material can have good structural stability and high capacity/high output characteristics.

In one embodiment, the anode material may have an average pore size of 0.5 μm to 2 μm. In another embodiment, the anode material may have an average pore size of 0.01 μm to 0.1 μm. Under this condition, the anode material can have good structural stability and high capacity/high output characteristics.

In one embodiment, the anode material may have an average particle diameter (D50) of 5 μm to 7 μm. In another embodiment, the anode material may have an average particle diameter (D50) of 8 μm to 11 μm In one embodiment, the anode material may have a capacity (energy density per weight) of 800 mAh/g to 2,000 mAh/g. Under this condition, the anode material can have good high capacity/high output characteristics.

In one embodiment, the anode material may have a tap density of 0.65 μm²/g to 1.3 g/cm³. In one embodiment, the anode material may have a specific surface area of 0.8 μm²/g to 2.5 μm²/g. Under this condition, the anode material can have good structural stability and high capacity/high output characteristics.

Core

The core includes a porous matrix containing nano-silicon (Si) and amorphous hard carbon. The amorphous hard carbon may be formed to surround the entire surface of the core. Under this condition, the core can have good structural stability to prevent cracking and destruction while minimizing deterioration in capacity to secure good long lifespan.

In one embodiment, the core may have an average diameter (or maximum length) of 1 μm to 30 μm. Under this condition, the core can secure good high capacity/high output characteristics and structural stability of the adhesive material. For example, the core may have an average diameter of 1 μm to 15 μm.

For example, the porous matrix may have a porous structure in which nano-silicon is coupled to the amorphous hard carbon. In one embodiment, the porous matrix may have a porosity of 5% to 80%. Under this condition, the porous matrix can exhibit good electrolyte impregnation while securing good high capacity/high output characteristics and structural stability of the anode material.

The core may have a spherical shape or an elliptical shape. For example, the core may have a spherical shape.

In one embodiment, the amorphous hard carbon may include hard carbon prepared by sintering graphite balls and/or hard carbon prepared by sintering pitch.

In one embodiment, the amorphous hard carbon of the core may be present in an amount of 5 wt % to 50 wt % based on the total weight of the anode material. Within this range of the amorphous hard carbon, the porous matrix can have good durability and structural stability while securing good high capacity/high output characteristics. For example, the amorphous hard carbon may be present in an amount of 5 wt % to 35 wt %. In another embodiment, the amorphous hard carbon may be present in an amount of 10 wt % to 35 wt %. For example, the amorphous hard carbon may be present in an amount of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 38, 39, 40, 41, 42, 43, 44, 45, 46, 47, 48, 49 or 50 wt %.

The nano-silicon serves to secure good high capacity/high output characteristics. In one embodiment, the nano-silicon may have an average diameter of 1.5 μm or less. For example, the nano-silicon may have a smaller diameter than the core. Within this range, the nano-silicon can exhibit good miscibility and dispersibility and can provide good durability and structural stability to the porous matrix while securing good high capacity/high output characteristics. For example, the nano-silicon may have an average diameter of 60 nm to 100 nm. In another embodiment, the nano-silicon may have an average diameter of 40 nm to 120 nm.

In one embodiment, the nano-silicon may have a spherical, polyhedral, elliptical or amorphous shape. For example, the nano-silicon may have a spherical shape.

In one embodiment, the nano-silicon may be present in an amount of 25 wt % to 80 wt % based on the total weight of the anode material. Within this range, the nano-silicon can have good miscibility and durability while securing good high capacity/high output characteristics. For example, the nano-silicon may be present in an amount of 25 wt % to 55 wt %. In another embodiment, the nano-silicon may be present in an amount of 45 wt % to 80 wt %. For example, the nano-silicon may be present in an amount of 25, 26, 27, 28, 29, 30, 31, 32, 33, 34, 35, 36, 36, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 wt %.

In one embodiment, the anode material may further include flake graphite. The flake graphite may be dispersed on at least one of the core, the hard coating layer, the first soft coating layer, and the second soft coating layer.

The flake graphite serves to secure good conductivity and high output/high-capacity characteristics of the anode material. The flake graphite may include natural graphite and/or synthetic graphite. The flake graphite may be prepared by delamination or grinding of spherical graphite, without being limited thereto.

In one embodiment, the flake graphite may have a crystalline structure in which carbon atoms are stacked in the form of multiple regular-hexagonal planes to have a thickness in a direction perpendicular to the hexagonal planes. The flake graphite has a larger surface area than spherical graphite with the same capacity and good properties in terms of economic feasibility, electrical conductivity and high-capacity characteristics.

In one embodiment, the flake graphite may be optionally present in an amount of 60 wt % or less based on the total weight of the anode material. Within this range, the flake graphite can have good miscibility and durability while securing good electrical conductivity and high capacity/high output characteristics of the anode material. For example, the flake graphite may be present in an amount of 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 38, 39, 40, 41, 42, 43, 44, 45, 46, 47, 48, 49, 50, 51, 52, 53, 54, 55, 56, 57, 58, 59 or 60 wt %.

In one embodiment, the flake graphite may have an average size of 0.2 μm to 8 μm. Here, "size" may mean the "maximum length" of the flake graphite. With this range of average size, the flake graphite can have good miscibility and dispersibility while securing good electrical conductivity and high capacity/high output characteristics of the anode material. For example, the flake graphite may have an average size of 0.2 μm to 2 μm.

The anode material may further include conductive powder dispersed in the porous matrix. In one embodiment, the conductive powder may include at least one selected from among carbon black, acetylene black, Ketjen black, and furnace black. For example, the conductive powder may include carbon black.

In one embodiment, the conductive powder may have an average particle diameter of 5 nm to 10 μm. Under this condition, the conductive powder can have good miscibility and dispersibility.

In one embodiment, the conductive powder may be present in an amount of greater than 0 to 25 wt % based on the total weight of the anode material. Within this range, the conductive powder can have good miscibility and dispersibility while securing good conductivity and high capacity/high output characteristics of the anode material. For example, the conductive powder may be present in an amount of 5 wt % to 25 wt %. For example, the conductive powder may be present in an amount of 0.1, 0.5, 1, 2, 3, 4, 5, 6, 7, 8, 9, 10, 11, 12, 13, 14, 15, 16, 17, 18, 19, 20, 21, 22, 23, 24 or 25 wt %.

Hard Coating Layer

The hard coating layer is formed on the outermost surface of the core. In one embodiment, the hard coating layer may have a thickness of 0.01 μm to 10 μm. Within this range, the hard coating layer can have good durability and structural stability. For example, the hard coating layer may have a thickness of 0.05 μm to 5 μm.

In one embodiment, the hard coating layer may be present in an amount of 0.1 wt % to 15 wt % based on the total weight of the anode material. Within this range, the hard coating layer can have good structural stability while securing good high capacity/high output characteristics. For example, the hard coating layer may be present in an amount of 5 wt % to 10 wt %. In another embodiment, the hard coating layer may be present in an amount of 10 wt % to 20 wt %. For example, the hard coating layer may be present in an amount of 0.1, 0.2, 0.3, 0.4, 0.5, 0.6, 0.7, 0.8, 0.9, 1, 2, 3, 4, 5, 6, 7, 8, 9, 10, 11, 12, 13, 14 or 15 wt %.

First Soft Coating Layer

The first soft coating layer is formed on the outer circumferential surface of the hard coating layer. The second soft coating layer contains amorphous soft carbon and may be formed by heat treatment of a carbon precursor. Under this condition, the first soft coating layer can secure good high capacity/high output characteristics and structural stability while securing long lifespan through minimization of volume expansion during charging/discharging.

In one embodiment, the first soft coating layer may have a thickness of 0.01 μm to 5 μm. Within this thickness range, the first soft coating layer can prevent breakage and fracture of the anode material upon intercalation/deintercalation of lithium ions and can minimize deterioration in capacity to secure long lifespan of the anode material. For example, the first soft coating layer may have a thickness of 0.05 μm to 5 μm.

In one embodiment, the first soft coating layer may be present in an amount of 0.1 wt % to 15 wt % based on the total weight of the anode material. Within this range, the first soft coating layer can prevent breakage and fracture of the anode material upon intercalation/deintercalation of lithium ions and can minimize deterioration in capacity to secure long lifespan of the anode material. For example, the first soft coating layer may be present in an amount of 0.5 wt % to 5.0 wt % based on the total weight of the anode material. For example, the first soft coating layer may be present in an amount of 0.1, 0.2, 0.3, 0.4, 0.5, 0.6, 0.7, 0.8, 0.9, 1, 2, 3, 4, 5, 6, 7, 7.5, 8, 9, 10, 11, 12, 13, 14 or 15 wt %.

Second Soft Coating Layer

The second soft coating layer is formed on the outer circumferential surface of the first soft coating layer. The second soft coating layer contains amorphous soft carbon and carbon nanotubes and may be formed by heat treatment of the carbon nanotubes and a carbon precursor. Under this condition, the second soft coating layer can secure good properties in terms of electrical conductivity, high capacity/high output characteristics and structural stability while securing long lifespan through minimization of volume expansion during charging/discharging.

In one embodiment, the second soft coating layer may have a thickness of 0.1 μm to 10 μm. Within this thickness range, the second soft coating layer can prevent breakage and fracture of the anode material upon intercalation/deintercalation of lithium ions and can minimize deterioration in capacity to secure long lifespan of the anode material. For example, the second soft coating layer may have a thickness of 0.5 μm to 10 μm.

In one embodiment, the second soft coating layer may be present in an amount of 0.1 wt % to 15 wt % based on the total weight of the anode material. Within this range, the second soft coating layer can secure good electrical conductivity and can prevent breakage and fracture of the anode material upon intercalation/deintercalation of lithium ions while securing long lifespan through minimization of deterioration in capacity. For example, the second soft coating layer may be present in an amount of 0.1 wt % to 3 wt %. For example, the second soft coating layer may be present in an amount of 0.1, 0.15, 0.2, 0.3, 0.4, 0.5, 0.6, 0.7, 0.8, 0.9, 1, 2, 3, 4, 5, 6, 7, 8, 9, 10, 11, 12, 13, 14 or 15 wt %.

The second soft coating layer may be formed in a structure in which the carbon nanotubes are inserted into pores formed on the core and the outermost surface of the second soft coating layer or in some regions thereof, or in which the carbon nanotubes are irregularly dispersed on the outer circumferential surface of powder. In another embodiment, the carbon nanotube layer may be formed in the form of the carbon nanotubes secured to each other by a binder or the like or by van der Waals force.

The carbon nanotubes may include at least one type selected from among single-walled carbon nanotubes, double-walled carbon nanotubes, multi-walled carbon nanotubes and bundle type carbon nanotubes.

For example, the carbon nanotubes may have a length of 0.01 μm to 50 μm. the carbon nanotube layer can secure good structural stability and electrical conductivity of the anode material. For example, the carbon nanotubes may have a length of 5 μm to 50 μm.

In one embodiment, the first soft coating layer, the second soft coating layer and the hard coating layer may be present in a weight ratio of 1:0.3 to 2:2 to 10. At this weight ratio of the coating layers, the anode material can exhibit good properties in terms of electrical conductivity, durability and structural stability, and can effectively prevent breakage and fracture of the anode material due to volume expansion upon intercalation/deintercalation of lithium ions.

In one embodiment, the hard coating layer may have higher hardness than the first soft coating layer and the second soft coating layer, respectively. Under this condition, the anode material can minimize volume expansion upon intercalation of lithium ions, can have good structural stability to prevent breakage and fracture of the anode material, and can minimize deterioration in capacity to secure long lifespan of the anode material.

Fourth Embodiment

An anode material according to yet another embodiment of the invention includes: a core including a porous matrix containing nano-silicon (Si) and amorphous hard carbon, and flake graphite dispersed in the porous matrix; a first hard coating layer and a second hard coating layer sequentially formed on an outer circumferential surface of the core and each containing amorphous hard carbon; and a carbon nanotube layer formed on an outer circumferential surface of the second hard coating layer.

In one embodiment, the anode material may include 25 wt % to 80 wt % of the nano-silicon, optionally 60 wt % or less of the flake graphite, 5 wt % to 50 wt % of the amorphous hard carbon, 0.1 wt % to 35 wt % of the first hard coating layer, 0.1 wt % to 35 wt % of the second hard coating layer, and 0.01 wt % to 10 wt % of the carbon nanotube layer.

In one embodiment, the anode material may have an average diameter of 5 μm to 15 μm, the core may have a diameter of 1 μm to 15 μm, the flake graphite may have an average size of 0.2 μm to 8 μm, the first hard coating layer may have a thickness of 0.05 μm to 10 μm, the second hard coating layer may have a thickness of 0.5 μm to 10 μm, and the carbon nanotube layer may have a thickness of 0.01 μm to 10 μm.

In one embodiment, the anode material may have a particle density of 1.2 $g/cm^3$ to 2.0 $g/cm^3$. In another embodiment, the anode material may have a particle density of 0.8 $g/cm^3$ to 1.2 $g/cm^3$. Under this condition, the anode material can be lightweight and exhibit good structural stability.

In one embodiment, the anode material may be porous to have a surface porosity of 30 vol % to 55 vol %. Under this condition, the anode material can have good structural stability and high capacity/high output characteristics.

In one embodiment, the anode material may have an average pore size of 0.5 μm to 2 μm. In another embodiment, the anode material may have an average pore size of 0.01 μm to 0.1 μm. Under this condition, the anode material can exhibit good structural stability and high capacity/high output characteristics.

In one embodiment, the nano-silicon may be present in an amount of 25 wt % to 55 wt % based on the total weight of the anode material. In another embodiment, the nano-silicon may be present in an amount of 45 wt % to 80 wt %. Under this condition, the nano-silicon can secure good high capacity/high output characteristics of the anode material.

In one embodiment, the anode material may have an average particle diameter (D50) of 5 μm to 7 μm. In another embodiment, the anode material may have an average particle diameter (D50) of 8 μm to 11 μm. In one embodiment, the anode material may have a capacity (energy density per weight) of 1,000 mAh/g to 1,550 mAh/g. Under this condition, the anode material can have good high capacity/high output characteristics.

In one embodiment, the anode material may have a tap density of 0.55 $μm^2/g$ to 1.3 $g/cm^3$. In one embodiment, the anode material may have a specific surface area of 1.5 $μm^2/g$ to 10 $μm^2/g$. Under this condition, the anode material can have good structural stability and high capacity/high output characteristics.

Core

The core includes a porous matrix containing nano-silicon (Si) and amorphous hard carbon, and flake graphite dispersed in the porous matrix. The amorphous hard carbon may be formed to surround the entire surface of the core. Under this condition, the core can have good structural stability to prevent cracking and destruction while minimizing deterioration in capacity to secure long lifespan.

In one embodiment, the core may have an average diameter (or maximum length) of 1 μm to 30 μm. Under this condition, the core can secure good high capacity/high output characteristics and structural stability of the adhesive material. For example, the core may have an average diameter of 1 μm to 15 μm.

For example, the porous matrix may have a porous structure in which nano-silicon is coupled to the amorphous hard carbon. In one embodiment, the porous matrix may have a porosity of 5% to 80%. Under this condition, the porous matrix can exhibit good electrolyte impregnation while securing good high capacity/high output characteristics and structural stability of the anode material.

The core may have a spherical shape or an elliptical shape. For example, the core may have a spherical shape.

In one embodiment, the amorphous hard carbon may include hard carbon prepared by sintering graphite balls and/or hard carbon prepared by sintering pitch.

In one embodiment, the amorphous hard carbon of the core may be present in an amount of 5 wt % to 50 wt % based on the total weight of the anode material. Within this range of the amorphous hard carbon, the porous matrix can have good durability and structural stability while securing good high capacity/high output characteristics. For example, the amorphous hard carbon may be present in an amount of 5 wt % to 35 wt %. In another embodiment, the amorphous hard carbon may be present in an amount of 10 wt % to 35 wt %. For example, the amorphous hard carbon may be present in an amount of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 38, 39, 40, 41, 42, 43, 44, 45, 46, 47, 48, 49 or 50 wt %.

The nano-silicon serves to secure good high capacity/high output characteristics. In one embodiment, the nano-silicon may have an average diameter of 1.5 μm or less. For example, the nano-silicon may have a smaller diameter than the core. Within this range, the nano-silicon can exhibit good miscibility and dispersibility and can provide good durability and structural stability to the porous matrix while securing good high capacity/high output characteristics. For example, the nano-silicon may have an average diameter of 60 nm to 100 nm. In another embodiment, the nano-silicon may have an average diameter of 40 nm to 120 nm.

In one embodiment, the nano-silicon may have a spherical, polyhedral, elliptical or amorphous shape. For example, the nano-silicon may have a spherical shape.

In one embodiment, the nano-silicon may be present in an amount of 25 wt % to 80 wt % based on the total weight of the anode material. Within this range, the nano-silicon can have good miscibility and durability while securing good high capacity/high output characteristics. For example, the nano-silicon may be present in an amount of 25 wt % to 55 wt %. In another embodiment, the nano-silicon may be present in an amount of 45 wt % to 80 wt %. For example, the nano-silicon may be present in an amount of 25, 26, 27, 28, 29, 30, 31, 32, 33, 34, 35, 36, 36, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 wt %.

The flake graphite serves to secure good conductivity and high output/high-capacity characteristics of the anode material. The flake graphite may include natural graphite and/or synthetic graphite. The flake graphite may be prepared by delamination or grinding of spherical graphite, without being limited thereto. In one embodiment, the flake graphite may have a crystalline structure in which carbon atoms are stacked in the form of multiple regular-hexagonal planes to have a thickness in a direction perpendicular to the hexagonal planes. The flake graphite has a larger surface area than spherical graphite with the same capacity and good properties in terms of economic feasibility, electrical conductivity and high-capacity characteristics.

In one embodiment, the flake graphite may be optionally present in an amount of 60 wt % or less based on the total weight of the anode material. Within this range, the flake graphite can have good miscibility and durability while securing good electrical conductivity and high capacity/high output characteristics of the anode material.

For example, the flake graphite may be present in an amount of 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 38, 39, 40, 41, 42, 43, 44, 45, 46, 47, 48, 49, 50, 51, 52, 53, 54, 55, 56, 57, 58, 59 or 60 wt %.

In one embodiment, the flake graphite may have an average size of 0.2 µm to 8 µm. Here, "size" may mean the "maximum length" of the flake graphite. With this range of average size, the flake graphite can have good miscibility and dispersibility while securing good electrical conductivity and high capacity/high output characteristics of the anode material. For example, the flake graphite may have an average size of 0.2 µm to 2 µm.

The anode material may further include conductive powder dispersed in the porous matrix. In one embodiment, the conductive powder may include at least one selected from among carbon black, acetylene black, Ketjen black, and furnace black. For example, the conductive powder may include carbon black. In one embodiment, the conductive powder may have an average particle diameter of 5 nm to 10 µm. Under this condition, the conductive powder can have good miscibility and dispersibility.

In one embodiment, the conductive powder may be present in an amount of greater than 0 to 25 wt % based on the total weight of the anode material. Within this range, the conductive powder can have good miscibility and dispersibility while securing good conductivity and high capacity/high output characteristics of the anode material. For example, the conductive powder may be present in an amount of 5 wt % to 25 wt %. For example, the conductive powder may be present in an amount of 0.1, 0.5, 1, 2, 3, 4, 5, 6, 7, 8, 9, 10, 11, 12, 13, 14, 15, 16, 17, 18, 19, 20, 21, 22, 23, 24 or 25 wt %.

First Hard Coating Layer

The first hard coating layer contains amorphous hard carbon and is formed on the outer circumferential surface of the core. In one embodiment, the first hard coating layer may have a thickness of 0.01 µm to 10 µm. Within this thickness range, the first hard coating layer can exhibit good durability and structural stability. For example, the first hard coating layer may have a thickness of 0.05 µm to 10 µm.

In one embodiment, the first hard coating layer may be present in an amount of 0.1 wt % to 35 wt % based on the total weight of the anode material. Under this condition, the first hard coating layer can exhibit good structural stability and high capacity/high output characteristics. For example, the first hard coating layer may be present in an amount of 10 wt % to 35 wt %. For example, the first hard coating layer may be present in an amount of 5 wt % to 25 wt %. For example, the first hard coating layer may be present in an amount of 0.1, 0.15, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34 or 35 wt %.

Second Hard Coating Layer

The second hard coating layer contains amorphous hard carbon and is formed on the outer circumferential surface of the first hard coating layer. In one embodiment, the second hard coating layer may have a thickness of 0.01 µm to 10 µm. Within this thickness range, the second hard coating layer can exhibit good durability and structural stability. For example, the second hard coating layer may have a thickness of 0.5 µm to 10 µm.

In one embodiment, the second hard coating layer may be present in an amount of 0.1 wt % to 35 wt % based on the total weight of the anode material. Under this condition, the second hard coating layer can have good structural stability and high capacity/high output characteristics. For example, the second hard coating layer may be present in an amount of 3 wt % to 15 wt %. For example, the first hard coating layer may be present in an amount of 0.1, 0.15, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34 or 35 wt %.

In one embodiment, the first hard coating layer may have higher hardness than the second hard coating layer. Under this condition, the first hard coating layer can minimize volume expansion upon intercalation of lithium ions, can have good structural stability to prevent breakage and fracture of the anode material, and can minimize deterioration in capacity to secure long lifespan of the anode material.

In one embodiment, the second hard coating layer and the first hard coating layer may be present in a weight ratio of 1:1.5 to 1:4. Within this range, the anode material can secure good properties in terms of electrical conductivity, durability, and structural stability while preventing breakage and fracture due to volume expansion upon intercalation/deintercalation of lithium ions.

Carbon Nanotube Layer

The carbon nanotube layer is formed on the outer circumferential surface of the second hard coating layer. The carbon nanotube layer serves to improve electrical conductivity of the anode material while securing good high capacity/high output characteristics thereof.

For example, the anode material may include the carbon nanotube layer formed on the outermost surface of the second hard coating layer and containing carbon nanotubes. The carbon nanotube layer may refer to a layer formed by spaces of the carbon nanotubes. For example, the carbon nanotube layer may be formed in a structure in which the carbon nanotubes are inserted into pores formed on the core and the outermost surface of the soft coating layer or in some regions thereof, or in which the carbon nanotubes are irregularly dispersed on the outer circumferential surface of powder. In another embodiment, the carbon nanotube layer may be formed in the form of the carbon nanotubes secured to each other by a binder or the like or by van der Waals force.

The carbon nanotubes may include at least one type selected from among single-walled carbon nanotubes, double-walled carbon nanotubes, multi-walled carbon nanotubes and bundle type carbon nanotubes.

In one embodiment, the carbon nanotube layer may be present in an amount of 0.01 wt % to 10 wt % based on the total weight of the anode material. Within this range, the carbon nanotube layer can secure good structural stability, electrical conductivity, and high capacity/high output characteristics of the anode material. For example, the carbon nanotube layer may be present in an amount of 0.05 wt % to 5 wt %. For example, the carbon nanotube layer may be present in an amount of 0.01, 0.05, 0.2, 0.3, 0.4, 0.5, 0.6, 0.7, 0.8, 0.9, 1, 2, 3, 4, 5, 6, 7, 8, 9 or 10 wt %.

The carbon nanotube layer may have a thickness of 0.01 µm to 10 µm. Under this condition, the carbon nanotube layer can secure good structural stability and electrical conductivity of the anode material. For example, the carbon nanotube layer may have a thickness of 1 µm to 10 µm.

For example, the carbon nanotubes may have a length of 0.01 µm to 50 µm. Under this condition, the carbon nanotube layer can secure good structural stability and electrical conductivity of the anode material. For example, the carbon nanotubes may have a length of 0.5 µm to 50 µm.

Fifth Embodiment

An anode material according to yet another embodiment of the present invention includes: a core including a porous matrix containing nano-silicon (Si) and amorphous hard carbon, and flake graphite dispersed in the porous matrix; a first hard coating layer formed in at least some region of an outermost surface of the core and containing amorphous hard carbon; an amorphous carbon layer formed on an outer circumferential surface of the first hard coating layer; a second hard coating layer formed on an outer circumferential surface of the amorphous carbon layer and containing amorphous hard carbon; and a carbon nanotube layer formed on an outer circumferential surface of the second hard coating layer.

The anode material may include 25 wt % to 80 wt % of the nano-silicon, optionally 60 wt % or less of the flake graphite, 5 wt % to 50 wt % of the amorphous hard carbon, 0.1 wt % to 35 wt % of the first hard coating layer, 0.1 wt % to 35 wt % of the second hard coating layer, and 0.01 wt % to 10 wt % of the carbon nanotube layer.

The anode material may have an average diameter of 5 µm to 15 µm, the first hard coating layer may have a thickness of 0.05 µm to 10 µm, the second hard coating layer may have a thickness of 0.5 µm to 10 µm, the core may have a diameter of 1 µm to 15 µm, the flake graphite may have an average size of 0.2 µm to 8 µm, and the carbon nanotube layer may have a thickness of 0.01 µm to 10 µm.

In one embodiment, the anode material may have a particle density of 1.2 g/cm$^3$ to 2.0 g/cm$^3$. In another embodiment, the anode material may have a particle density of 0.8 g/cm$^3$ to 1.2 g/cm$^3$. Under this condition, the anode material can be lightweight and exhibit good structural stability.

In one embodiment, the anode material may be porous to have a surface porosity of 25 vol % to 50 vol %. Under this condition, the anode material can have good structural stability and high capacity/high output characteristics.

In one embodiment, the anode material may have an average pore size of 0.5 µm to 2 µm. In another embodiment, the anode material may have an average pore size of 0.01 µm to 0.1 µm. Under this condition, the anode material can exhibit good structural stability and high capacity/high output characteristics.

In one embodiment, the nano-silicon may be present in an amount of 25 wt % to 55 wt % based on the total weight of the anode material. In another embodiment, the nano-silicon may be present in an amount of 45 wt % to 80 wt %. Under this condition, the nano-silicon can secure good high capacity/high output characteristics of the anode material.

In one embodiment, the anode material may have an average particle diameter (D50) of 5 µm to 7 µm. In another embodiment, the anode material may have an average particle diameter (D50) of 8 µm to 11 µm. In one embodiment, the anode material may have a capacity (energy density per weight) of 800 mAh/g to 1,550 mAh/g. Under this condition, the anode material can have good high capacity/high output characteristics.

In one embodiment, the anode material may have a tap density of 0.55 µm$^2$/g to 1.3 g/cm$^3$. In one embodiment, the anode material may have a specific surface area of 0.6 µm$^2$/g to 3.0 µm$^2$/g. Under this condition, the anode material can have good structural stability and high capacity/high output characteristics.

Core

The core includes a porous matrix containing nano-silicon (Si) and amorphous hard carbon, and flake graphite dispersed in the porous matrix. The amorphous hard carbon may be formed to surround the entire surface of the core. Under this condition, the core can have good structural stability to prevent cracking and destruction while minimizing deterioration in capacity to secure long lifespan.

In one embodiment, the core may have an average diameter (or maximum length) of 1 µm to 30 µm. Under this condition, the core can secure good high capacity/high output characteristics and structural stability of the adhesive material. For example, the core may have an average diameter of 1 µm to 15 µm.

For example, the porous matrix may have a porous structure in which nano-silicon is coupled to the amorphous hard carbon. In one embodiment, the porous matrix may have a porosity of 5% to 80%. Under this condition, the porous matrix can exhibit good electrolyte impregnation while securing good high capacity/high output characteristics and structural stability of the anode material.

The core may have a spherical shape or an elliptical shape. For example, the core may have a spherical shape.

In one embodiment, the amorphous hard carbon may include hard carbon prepared by sintering graphite balls and/or hard carbon prepared by sintering pitch.

In one embodiment, the amorphous hard carbon of the core may be present in an amount of 5 wt % to 50 wt % based on the total weight of the anode material. Within this range of the amorphous hard carbon, the porous matrix can have good durability and structural stability while securing good high capacity/high output characteristics. For example, the amorphous hard carbon may be present in an amount of 5 wt % to 35 wt %. In another embodiment, the amorphous hard carbon may be present in an amount of 10 wt % to 35 wt %. For example, the amorphous hard carbon may be present in an amount of 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 38, 39, 40, 41, 42, 43, 44, 45, 46, 47, 48, 49 or 50 wt %.

The nano-silicon serves to secure good high capacity/high output characteristics. In one embodiment, the nano-silicon may have an average diameter of 1.5 µm or less. For example, the nano-silicon may have a smaller diameter than the core. Within this range, the nano-silicon can exhibit good miscibility and dispersibility and can provide good durability and structural stability to the porous matrix while securing good high capacity/high output characteristics. For example, the nano-silicon may have an average diameter of 60 nm to 100 nm. In another embodiment, the nano-silicon may have an average diameter of 40 nm to 120 nm.

In one embodiment, the nano-silicon may have a spherical, polyhedral, elliptical or amorphous shape. For example, the nano-silicon may have a spherical shape.

In one embodiment, the nano-silicon may be present in an amount of 25 wt % to 80 wt % based on the total weight of the anode material. Within this range, the nano-silicon can have good miscibility and durability while securing good high capacity/high output characteristics. For example, the nano-silicon may be present in an amount of 25 wt % to 55 wt %. In another embodiment, the nano-silicon may be present in an amount of 45 wt % to 80 wt %. For example, the nano-silicon may be present in an amount of 25, 26, 27, 28, 29, 30, 31, 32, 33, 34, 35, 36, 36, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79 or 80 wt %.

The flake graphite serves to secure good conductivity and high output/high-capacity characteristics of the anode material. The flake graphite may include natural graphite and/or synthetic graphite. The flake graphite may be prepared by delamination or grinding of spherical graphite, without being limited thereto. In one embodiment, the flake graphite may have a crystalline structure in which carbon atoms are stacked in the form of multiple regular-hexagonal planes to have a thickness in a direction perpendicular to the hexagonal planes. The flake graphite has a larger surface area than spherical graphite with the same capacity and good properties in terms of economic feasibility, electrical conductivity and high-capacity characteristics.

In one embodiment, the flake graphite may be optionally present in an amount of 60 wt % or less based on the total weight of the anode material. Within this range, the flake graphite can have good miscibility and durability while securing good electrical conductivity and high capacity/high output characteristics of the anode material. For example, the flake graphite may be present in an amount of 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 36, 38, 39, 40, 41, 42, 43, 44, 45, 46, 47, 48, 49, 50, 51, 52, 53, 54, 55, 56, 57, 58, 59 or 60 wt %.

In one embodiment, the flake graphite may have an average size of 0.2 μm to 8 μm. Here, "size" may mean the "maximum length" of the flake graphite. With this range of average size, the flake graphite can have good miscibility and dispersibility while securing good electrical conductivity and high capacity/high output characteristics of the anode material. For example, the flake graphite may have an average size of 0.2 μm to 2 μm.

The anode material may further include conductive powder dispersed in the porous matrix. In one embodiment, the conductive powder may include at least one selected from among carbon black, acetylene black, Ketjen black, and furnace black. For example, the conductive powder may include carbon black.

In one embodiment, the conductive powder may have an average particle diameter of 5 nm to 10 μm. Under this condition, the conductive powder can have good miscibility and dispersibility.

In one embodiment, the conductive powder may be present in an amount of greater than 0 to 25 wt % based on the total weight of the anode material. Within this range, the conductive powder can have good miscibility and dispersibility while securing good conductivity and high capacity/high output characteristics of the anode material. For example, the conductive powder may be present in an amount of 5 wt % to 25 wt %. For example, the conductive powder may be present in an amount of 0.1, 0.5, 1, 2, 3, 4, 5, 6, 7, 8, 9, 10, 11, 12, 13, 14, 15, 16, 17, 18, 19, 20, 21, 22, 23, 24 or 25 wt %.

First Hard Coating Layer

The first hard coating layer contains amorphous hard carbon and is formed on an outer circumferential surface of the core. In one embodiment, the first hard coating layer may have a thickness of 0.05 μm to 10 μm. Within this thickness range, the first hard coating layer can exhibit good durability and structural stability.

In one embodiment, the first hard coating layer may be present in an amount of 0.1 wt % to 35 wt % based on the total weight of the anode material. Under this condition, the first hard coating layer can exhibit good structural stability and high capacity/high output characteristics. In another embodiment, the first hard coating layer may be present in an amount of 5 wt % to 25 wt %. For example, the first hard coating layer may be present in an amount of 0.1, 0.15, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34 or 35 wt %.

Amorphous Carbon Layer

The amorphous carbon layer may be formed in the course of sintering a carbon precursor after heat treatment of the carbon precursor. The amorphous carbon layer may contain amorphous carbon. For example, the amorphous carbon layer may contain amorphous hard carbon.

In one embodiment, the amorphous carbon layer may have a thickness of 0.01 μm to 10 μm. Within this thickness range, the amorphous carbon layer can exhibit good durability and structural stability.

In one embodiment, the amorphous carbon layer may be present in an amount of 0.1 wt % to 15 wt % based on the total weight of the anode material. Under this condition, the amorphous carbon layer can exhibit good structural stability and high capacity/high output characteristics. For example, the amorphous carbon layer may be present in an amount of 0.5 wt % to 5 wt %. For example, the amorphous carbon layer may be present in an amount of 0.1, 0.15, 0.2, 0.3, 0.4, 0.5, 0.6, 0.7, 0.8, 0.9, 1, 2, 3, 4, 5, 6, 7, 8, 9, 10, 11, 12, 13, 14 or 15 wt %.

Second Hard Coating Layer

The second hard coating layer contains amorphous hard carbon and is formed on the outer circumferential surface of the amorphous carbon layer. In one embodiment, the second hard coating layer may have a thickness of 0.01 μm to 10 μm. Within this thickness range, the second hard coating layer can exhibit good durability and structural stability. For example, the second hard coating layer may have a thickness of 0.5 μm to 10 μm.

In one embodiment, the second hard coating layer may be present in an amount of 0.1 wt % to 35 wt % based on the total weight of the anode material. Under this condition, the second hard coating layer can have good structural stability and high capacity/high output characteristics. For example, the second hard coating layer may be present in an amount of 3 wt % to 15 wt %. For example, the second hard coating layer may be present in an amount of 0.1, 0.15, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34 or 35 wt %.

In one embodiment, the amorphous carbon layer and the second hard coating layer may be present in a total amount of 3 wt % to 15 wt % based on the total weight of the anode material. Under this condition, the anode material can exhibit good structural stability and high capacity/high output characteristics.

In one embodiment, each of the first hard coating layer and the second hard coating layer may have higher hardness than the amorphous carbon layer. Under this condition, the first hard coating layer and the second hard coating layer can minimize volume expansion during charging/discharging, can have good structural stability to prevent breakage and fracture of the anode material upon intercalation of lithium ions, and can minimize deterioration in capacity to secure long lifespan of the anode material.

In one embodiment, the amorphous carbon layer, the second hard coating layer and the first hard coating layer may be present in a weight ratio of 1:0.5 to 3:1.5 to 4. Within this range, the anode material can secure good properties in terms of electrical conductivity, durability, and structural stability while preventing breakage and fracture due to volume expansion upon intercalation/deintercalation of lithium ions.

Carbon Nanotube Layer

The carbon nanotube layer is formed on an outer circumferential surface of the second hard coating layer. The carbon nanotube layer serves to improve electrical conductivity of the anode material while securing good high capacity/high output characteristics thereof.

For example, the anode material may include the carbon nanotube layer formed on the outermost surface of the second hard coating layer and containing carbon nanotubes. The carbon nanotube layer may refer to a layer formed by spaces of the carbon nanotubes. For example, the carbon nanotube layer may be formed in a structure in which the carbon nanotubes are inserted into pores formed on the core and the outermost surface of the soft coating layer or in some regions thereof, or in which the carbon nanotubes are irregularly dispersed on the outer circumferential surface of powder. In another embodiment, the carbon nanotube layer may be formed in the form of the carbon nanotubes secured to each other by a binder or the like or by van der Waals force.

The carbon nanotubes may include at least one type selected from among single-walled carbon nanotubes, double-walled carbon nanotubes, multi-walled carbon nanotubes and bundle type carbon nanotubes.

In one embodiment, the carbon nanotube layer may be present in an amount of 0.01 wt % to 10 wt % based on the total weight of the anode material. Within this range, the carbon nanotube layer can secure good structural stability, electrical conductivity, and high capacity/high output characteristics of the anode material. For example, the carbon nanotube layer may be present in an amount of 0.05 wt % to 5 wt %. For example, the carbon nanotube layer may be present in an amount of 0.01, 0.05, 0.1, 0.2, 0.3, 0.4, 0.5, 0.6, 0.7, 0.8, 0.9, 1, 2, 3, 4, 5, 6, 7, 8, 9 or 10 wt %.

For example, the carbon nanotube layer may have a thickness of 0.01 μm to 10 μm. Under this condition, the carbon nanotube layer can secure good structural stability and electrical conductivity of the anode material. For example, the carbon nanotube layer may have a thickness of 1 μm to 10 μm.

For example, the carbon nanotubes may have a length of 0.01 μm to 50 μm. Under this condition, the carbon nanotube layer can secure good structural stability and electrical conductivity of the anode material. For example, the carbon nanotubes may have a length of 0.5 μm to 50 μm.

Secondary Battery Including Anode Material

A further aspect of embodiments of the present invention relates to a secondary battery including the bilayer-structured silicon carbon composite anode material. In one embodiment, the secondary battery may include a cathode; an anode; and an electrolyte disposed between the cathode and the anode, wherein the anode includes the anode material.

The secondary battery may include a lithium secondary battery. In one embodiment, the lithium secondary battery may include a cathode including a cathode material; an anode spaced apart from the cathode and including the anode material; an electrolyte disposed between the anode and the cathode; and a separator disposed between the anode and the cathode to prevent electrical short of the anode and the cathode.

In one embodiment, each of the cathode and the anode may be manufactured by depositing a mixture comprising an active material, a conductive material and a binder on one surface of an electrode plate (electricity collector), followed by drying and pressing the mixture.

In one embodiment, each of a cathode plate and an anode plate may include at least one selected from among copper, stainless steel, aluminum, nickel, and titanium.

In one embodiment, the cathode material may include a composite oxide of a metal and lithium. The metal may include at least one selected from among cobalt (Co), manganese (Mn), aluminum (Al), and nickel (Ni). For example, the metal may include at least one selected from among lithium-nickel oxide, lithium-nickel-cobalt oxide, lithium-nickel-cobalt-manganese oxide, and lithium-nickel-cobalt-aluminum oxide. In one embodiment, conductive material may include at least one selected from among natural graphite, artificial graphite, carbon black, acetylene black, Ketjen black, channel black, carbon fiber, metal fiber, carbon fluoride, aluminum, nickel powder, zinc oxide, potassium titanate, titanium oxide, and polyphenylene compounds.

In one embodiment, the binder may include polyvinylidene fluoride, polyvinyl alcohol, carboxymethylcellulose (CMC), starch, hydroxypropylcellulose, polyvinyl pyrrolidone, polytetrafluoroethylene, polyethylene, polypropylene, ethylene-propylene-diene monomer (EPDM), styrene rubber, and fluorine rubber.

In one embodiment, the separator may be a typical separator. For example, the separator may include at least one selected from among polyester, polyethylene, polypropylene, and polytetrafluoroethylene (PTFE). The separator may be realized in the form of non-woven fabrics or woven fabrics. The separator is a porous structure having an average pore diameter of 0.01 μm to 10 μm and a thickness of 5 μm to 500 μm.

In one embodiment, the electrolyte may include a non-aqueous organic solvent and a lithium salt. For example, the non-aqueous organic solvent may include at least one selected from among a carbonate solvent, an ester solvent, an ether solvent, and a ketone solvent. The carbonate solvent may include at least one selected from among dimethyl carbonate (DMC), diethyl carbonate (DEC), dipropyl carbonate (DPC), methyl propyl carbonate (MPC), ethyl methyl carbonate (EMC), ethyl propyl carbonate (EPC), ethylene carbonate (EC), propylene carbonate (PC), and butylene carbonate (BC).

The ester solvent may include at least one selected from among butyrolactone, decanolide, valerolactone, caprolactone, n-methyl acetate, n-ethyl acetate, and n-propyl acetate. The ether solvent may include dibutyl ether and the like. The ketone solvent may include poly(methyl vinyl ketone).

The lithium salt can act as a source of lithium ions in a battery. For example, the lithium salt may include at least one selected from among $LiPF_6$, $LiBF_4$, $LiSbF_6$, $LiAsF_6$, $LiClO_4$, $LiCF_3SO_3$, $LiN(CF_3SO_2)_2$, $LiN(C_2F_5SO_2)_2$, $LiAlO_4$, and $LiAlCl_4$, without being limited thereto.

In one embodiment, the electrolyte may include at least one selected from among vinylene carbonate, vinyl ethylene carbonate, monofluoroethylene carbonate, difluoroethylene carbonate, succinic anhydride, and 1,3-propane sultone.

In one embodiment, the lithium secondary battery may include a prismatic battery, a cylindrical battery, and a pouch-type battery.

In one embodiment, the secondary battery may have an anode capacity (energy density per weight) of 550 mAh/g or more for 600 or more charge/discharge cycles.

In one embodiment, the secondary battery may have an anode capacity (energy density per weight) of 410 mAh/g or more upon discharging of the secondary battery at a capacity of 2 C to 3 C in evaluation of anode performance of half-cells.

In one embodiment, the secondary battery may have an anode capacity of 550 mAh/g to 850 mAh/g. In another embodiment, the secondary battery may have an anode capacity of 850 mAh/g or less.

In one embodiment, the secondary battery may have an anode density of 1.1 g/cc or more and a capacity of 410 mAh/g or more for 600 or more charge/discharge cycles.

In one embodiment, the secondary battery may have an anode density of 1.1 g/cc to 1.52 g/cc for 600 or more cycles of initial charging/discharging.

In one embodiment, the secondary battery may have an anode expansion rate of 15% to 35% upon 0.01V charge using a half-cell at an anode capacity of 410 mAh/g to 450 mAh/g.

In one embodiment, the secondary battery may have an anode expansion rate of 25% to 55% upon 0.01V charge using a half-cell at an anode capacity of 450 mAh/g to 550 mAh/g.

In one embodiment, in repeated charge/discharge cycles in which charging/discharging is performed to have a capacity of 0.1 C for an initial cycle and then performed to have a capacity of 1.0 C for subsequent 20 cycles while operating the secondary battery at a voltage of 2.5 V to 4.2 V, the secondary battery may be maintained at 4.2 V until charge current reaches 0.05 C to complete charging in each cycle.

In one embodiment, in performance evaluation of a full-cell secondary battery including the anode, the cathode including an active material oxide, and the electrolyte, in which the anode is formed to have a capacity (energy density per weight) of 410 mAh/g or more (with reference to a value measured at a cutoff voltage of 1.5V in evaluation of a half-cell including a lithium (Li) electrode as a cathode); the active material oxide has a structure of $LiNi_xCo_yMn_zO_2$ (x, y and z satisfying x+y+z=1, 0.50<x<0.91, 0.04<y<0.25, and 0.04<z<0.35); capacity of the cathode including the active material oxide (with reference to a value measured at a cutoff voltage of 4.2 V in evaluation of a half-cell including a lithium (Li) electrode as a cathode) and capacity of the anode including the anode material satisfy a relation: 1.04<anode capacity/cathode capacity <1.17; and the electrolyte includes 1.1 M $LiPF_6$ and 0.1 M LiBOB and contains ethyl carbonate (EC)/ethyl methyl carbonate (EMC)/fluoro-ethylene carbonate (FEC) in a weight ratio of 65%/30%/5% (in unit of wt %)), the performance evaluation being carried out under conditions that the full-cell secondary battery is operated at a voltage of 2.50 V to 4.20 V for 600 or more charge/discharge cycles and charging/discharging is performed to have a capacity of 0.1 C for a first cycle and is performed to have a capacity of 1.0 C for subsequent 20 cycles (second to twenty-first cycles), the anode material may be maintained at 4.2 V until charge current reaches 0.05 C to complete charging in each cycle.

In one embodiment, in performance evaluation of a full-cell secondary battery including the anode, the cathode including an active material oxide, and the electrolyte, in which the anode is formed to have a capacity (energy density per weight) of 410 mAh/g or more (with reference to a value measured at a cutoff voltage of 1.5V in evaluation of a half-cell including a lithium (Li) electrode as a cathode); the active material oxide has a structure of $LiNi_xCo_yAl_zO_2$ (x, y and z satisfying 0.71<x<0.95, 0.04<y<0.15, and 0.03<z<0.15); capacity of the cathode including the active material oxide (with reference to a value measured at a cutoff voltage of 4.2 V in evaluation of a half-cell including a lithium (Li) electrode as a cathode) and capacity of the anode including the anode material may satisfy a relation: 1.04<anode capacity/cathode capacity <1.17; and the electrolyte includes 1.1 M $LiPF_6$ and 0.1 M LiBOB and contains ethyl carbonate (EC)/ethyl methyl carbonate (EMC)/fluoro-ethylene carbonate (FEC) in a weight ratio of 65%/30%/5% (in unit of wt %), the performance evaluation being carried out under conditions that the full-cell secondary battery is operated at a voltage of 2.50 V to 4.20 V for 600 or more charge/discharge cycles and charging/discharging is performed to have a capacity of 0.1 C for a first cycle and is performed to have a capacity of 1.0 C for subsequent 20 cycles (second to twenty-first cycles), the anode material may be maintained at 4.2 V until charge current reaches 0.05 C to complete charging in each cycle.

Next, embodiments of the present invention will be described in more detail with reference to examples. However, it should be understood that these examples are provided for illustration only and should not be construed in any way as limiting embodiments of the invention. Details not described herein can be technically inferred by those skilled in the art and descriptions thereof will be omitted.

EXAMPLES AND COMPARATIVE EXAMPLES

Example 1

(1) Preparation of graphite balls: A graphite mixture was prepared in powder form by dry mixing synthetic graphite (flake graphite having a particle size of 3 μm) with pitch in a weight ratio of 1:1 to 3:1. The graphite mixture was compressed under a pressure of 5 atm to 50 atm, sintered at 400° C. to 650° C., and ground to produce graphite balls having a spherical shape with an average particle diameter of 5 μm.

(2) Preparation of nano-silicon slurry: Stearic acid (14.4 g) was dissolved in a first solvent (16,200 g) prepared by mixing ethanol with pure water in a weight ratio of 1:1. After complete dissolution of stearic acid, spherical silicon powder (1,800 g) having an average particle diameter (d50) of 2 μm to 5 μm was added to and dissolved in the first solvent, followed by milling, thereby preparing a nano-silicon slurry having an average particle diameter (D50) of 98 nm.

(3) Preparation of first mixture and dried product: A first mixture was prepared by mixing the graphite balls, the nano-silicon slurry, pitch, and flake graphite (0.2 μm to 2 μm), followed by stirring. The first mixture contains the graphite balls, the flake graphite, the pitch, and the nano-silicon in a weight ratio of 1:2 to 8:1 to 15:5 to 70 in terms of solid content. Next, a dried product having a spherical shape with an average particle diameter of 9 μm to 11 μm was prepared by drying the first mixture at 120° C. using a spray dryer.

(4) Sintering and heat treatment: A sintered product was prepared by sintering the dried product at 800° C. to 1,150° C. The sintered product (core) has a hard coating layer formed on the outer circumferential surface thereof and containing amorphous hard carbon. Next, a soft coating layer was formed by mixing 100 parts by weight of the sintered product with 1 to 30 parts by weight of a carbon precursor (containing polyimide and dimethylformamide), followed by heat treatment at 80° C. to 300° C.

(5) Formation of carbon nanotube layer: A carbon nanotube solution containing 1 wt % of carbon nanotubes, 0.5 wt % of carboxymethyl cellulose and the balance of a solvent was prepared. Next, the carbon nanotube solution was deposited onto an outer circumferential surface of the soft coating layer of the sintered product and dried to form a carbon nanotube layer, followed by classification using a 325 mesh sieve, thereby preparing an anode material having an average particle diameter (d50) of 10.5 μm.

The prepared anode material was formed to have a structure including: a core including a porous matrix containing nano-silicon (Si) and amorphous carbon, and flake graphite dispersed in the porous matrix; a hard coating layer formed on the outer circumferential surface of the core; a soft coating layer formed on the outer circumferential surface of the hard coating layer; and a carbon nanotube layer formed on the outer circumferential surface of the soft coating layer.

The anode material included 25 wt % to 80 wt % of the nano-silicon, 1 wt % to 60 wt % of the flake graphite, 5 wt % to 50 wt % of the amorphous hard carbon, 0.2 wt % to 10 wt % of the hard coating layer, 0.1 wt % to 5 wt % of the soft coating layer, and 0.01 wt % to 10 wt % of the carbon nanotube layer.

Figure 3:
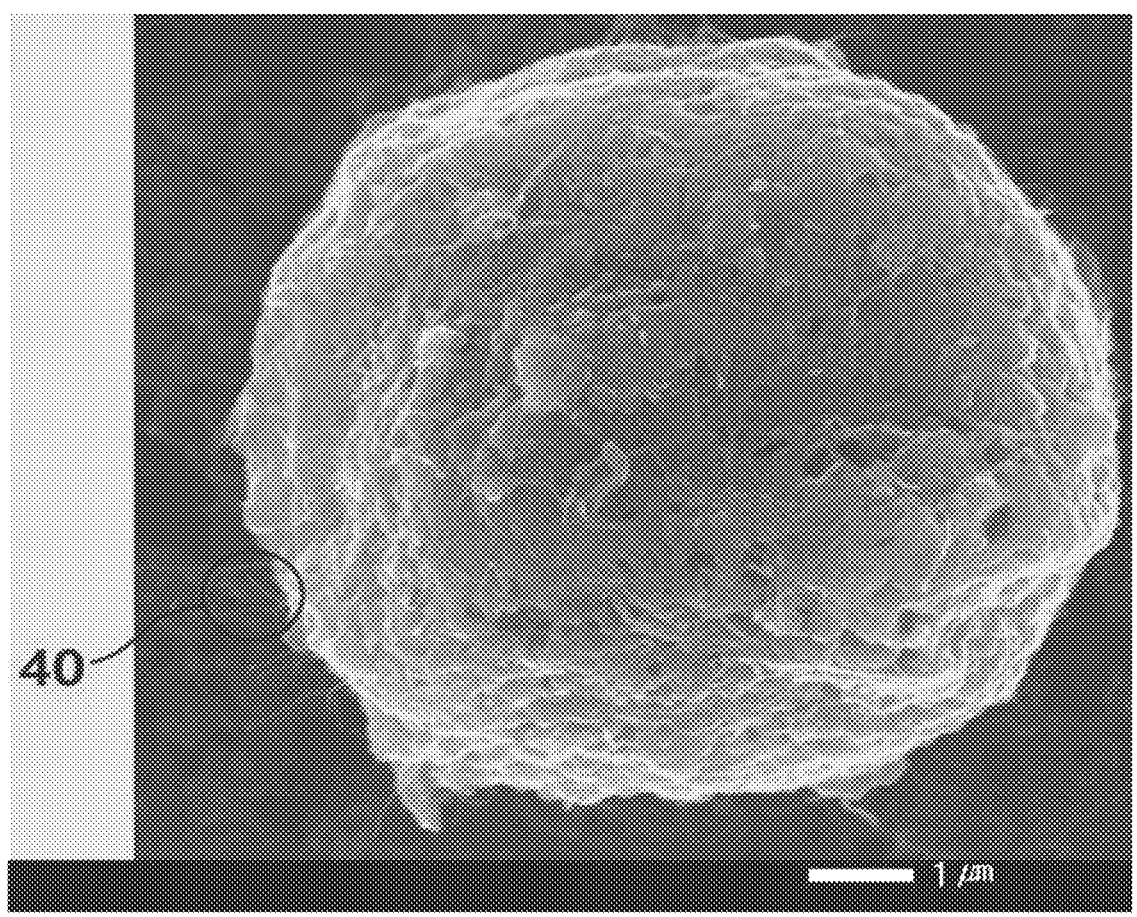
FIG. 3 is an SEM of a surface of the anode material of Example 1.

FIG. 3 is an SEM of a surface of the anode material of Example 1.

Referring to FIG. 1, the anode material of Example 1 includes: a core including porous matrix containing nano-silicon (Si) 12 and amorphous hard carbon 14, and flake graphite 16 dispersed in the porous matrix; a hard coating layer and a soft coating layer sequentially formed on the outer circumferential surface of the core; and a carbon nanotube layer formed on the outer circumferential surface of the soft coating layer. Further, referring to FIG. 3, it can be seen that carbon nanotubes 40 having an average particle size of 1 μm to 20 μm are formed on the outer circumferential surface of the shell in Example 1.

Figure 4A:
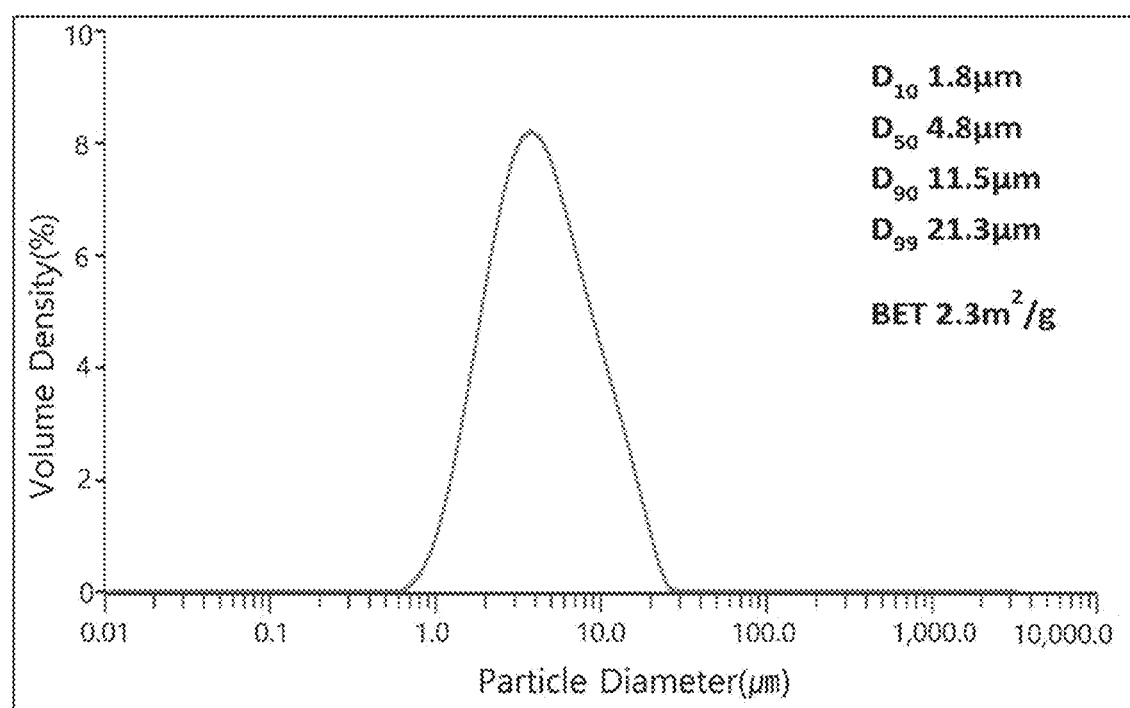
FIG. 4A is a graph depicting a particle distribution of the anode material of Example 1.
Figure 4B:
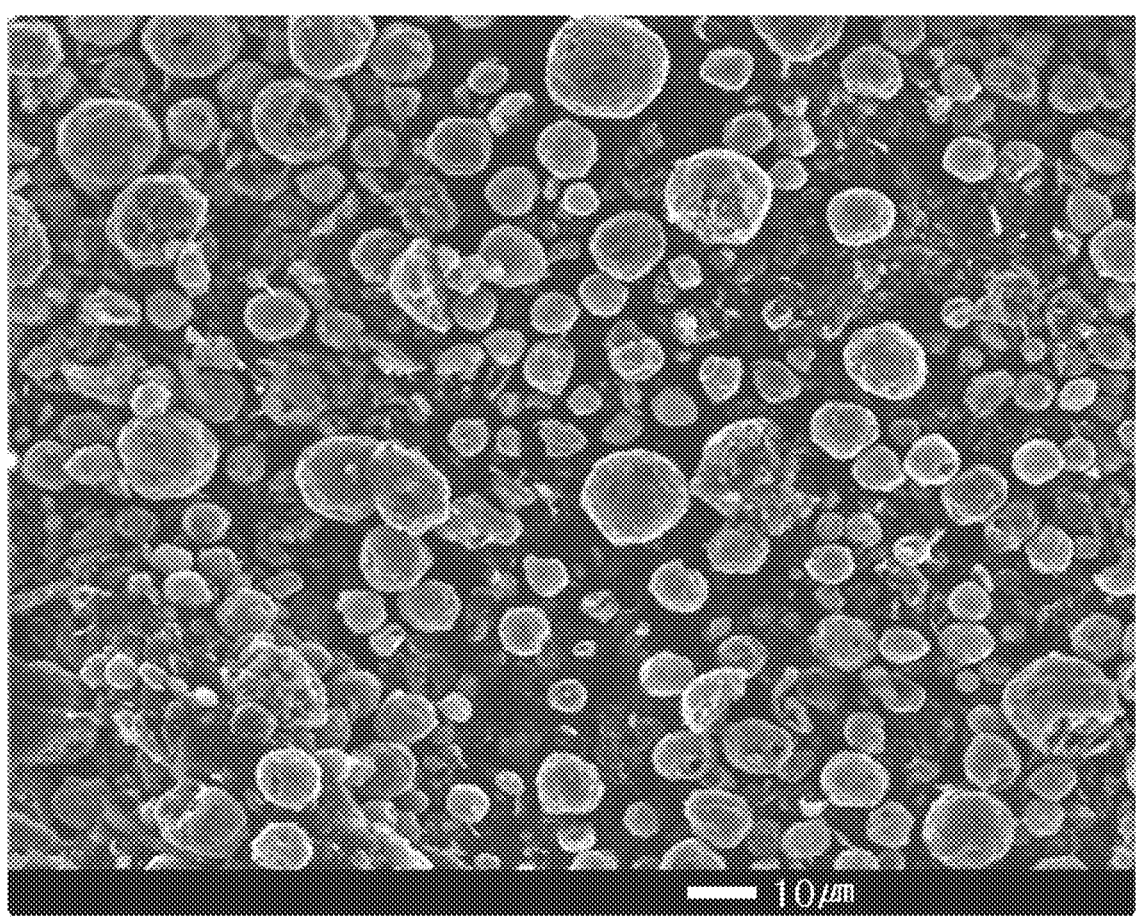
FIG. 4B is an SEM of the anode material of Example 1.

FIG. 4A is a graph depicting a particle distribution of the anode material of Example 1 and FIG. 4B is an SEM of the anode material of Example 1. Referring to FIG. 4, it can be seen that the anode material of Example 1 has a spherical shape having an average particle diameter (d50) of 10.5 μm.

Figure 5A:
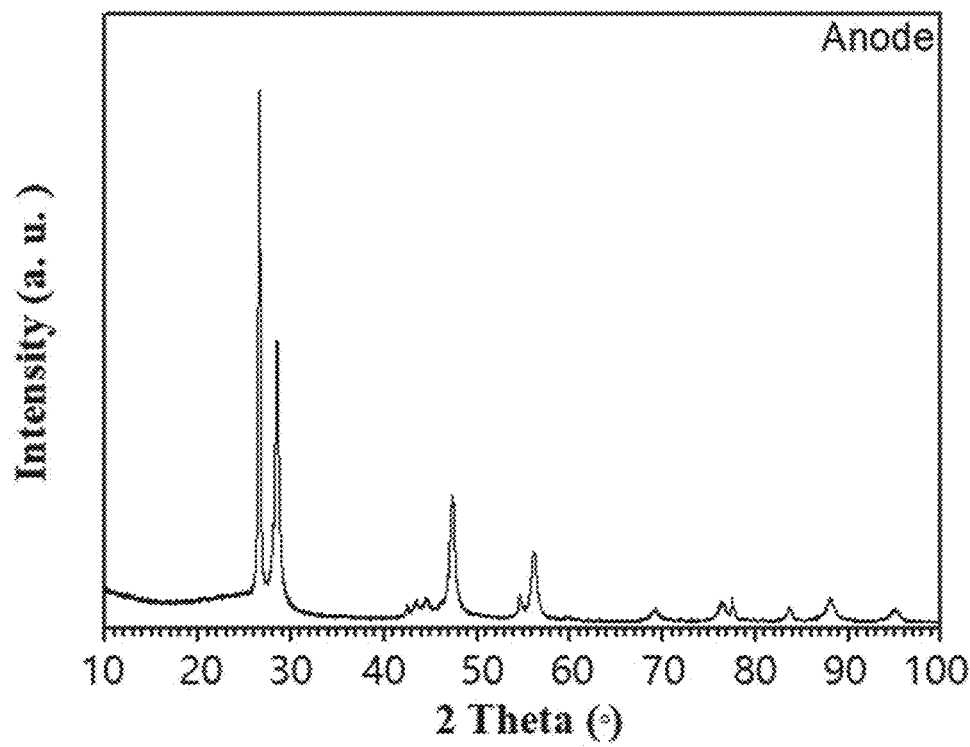
FIG. 5A is a graph depicting an X-ray diffraction result of the anode material of Example 1.
Figure 5B:
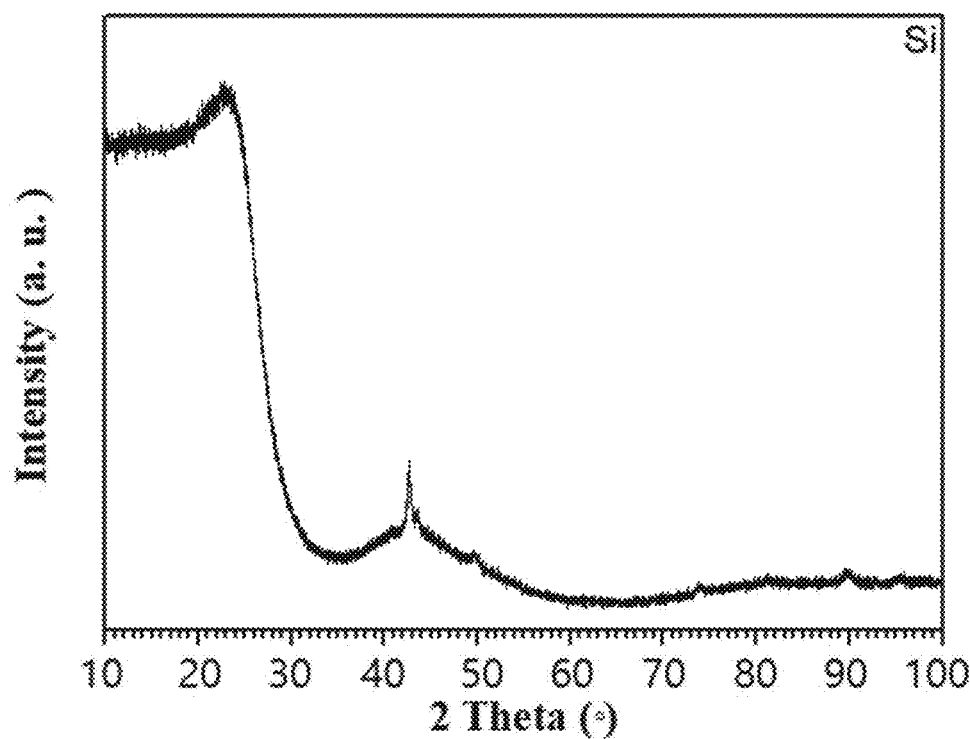
FIG. 5B is a graph depicting an X-ray diffraction result of silicon.
Figure 5C:
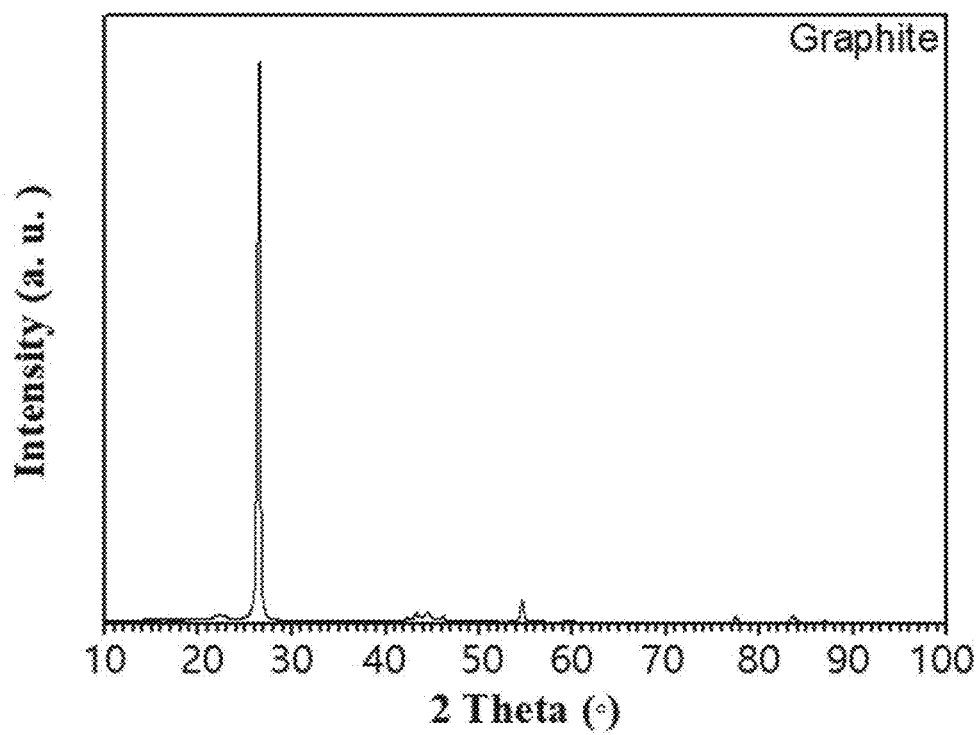
FIG. 5C is a graph depicting an X-ray diffraction result of graphite.

FIG. 5A is a graph depicting an X-ray diffraction result of the anode material of Example 1, FIG. 5B is a graph depicting an X-ray diffraction result of silicon, and FIG. 5C is a graph depicting an X-ray diffraction result of graphite. Referring to FIG. 5, it could be seen that the anode material of Example 1 had silicon peaks and graphite peaks. In calculation of the crystal grain size of silicon using the silicon peaks in the <111> direction according to the Shearer formula, the silicon crystal grains had a crystal grain size of 17.6 nm.

Example 2

(1) Preparation of first mixture and dried product: The same graphite balls, nano-silicon slurry and flake graphite as those in Example 1 were prepared. Then, a dried product was prepared in the same manner as in Example 1 by mixing and stirring the graphite balls, the flake graphite and the nano-silicon slurry to prepare a first mixture (comprising the graphite balls, the flake graphite and the nano-silicon slurry in a weight ratio of 1:2 to 8:5 to 70), followed by drying the first mixture.

(2) Sintered product, heat treatment and preparation of intermediate product: A sintered product was prepared by mixing the dried product with pitch, followed by sintering the mixture at 800° C. to 1150° C. The sintered product (core) had a hard coating layer formed on the outer circumferential surface thereof and containing amorphous hard carbon. Next, an intermediate product including a first soft coating layer and a second soft coating layer on inner and outer circumferential surfaces of the hard coating layer was formed by mixing 100 parts by weight of the sintered product with 1 to 30 parts by weight of a carbon precursor (containing polyimide and dimethylformamide), followed by heat treatment at 80° C. to 300° C.

(3) Formation of carbon nanotube layer: A carbon nanotube solution was deposited onto an outer circumferential surface of the second soft coating layer of the intermediate product and dried to form a carbon nanotube layer, followed by classification using a 325-mesh sieve, thereby preparing an anode material having an average particle diameter (d50) of 8 μm to 11 μm.

The prepared anode material was formed to have a structure including: a core including a porous matrix containing nano-silicon (Si) and amorphous hard carbon, and flake graphite dispersed in the porous matrix; a first soft coating layer formed on the outer circumferential surface of the core; a hard coating layer formed on the outer circumferential surface of the first soft coating layer and containing amorphous hard carbon; a second soft coating layer formed on the outer circumferential surface of the hard coating layer; and a carbon nanotube layer formed on the outer circumferential surface of the second soft coating layer.

The anode material included 25 wt % to 55 wt % of nano-silicon, greater than 0 to 60 wt % or less of flake graphite, 5 wt % to 50 wt % of amorphous hard carbon, 0.6 wt % to 10 wt % of the hard coating layer, 0.2 wt % to 3.33 wt % of the first soft coating layer, 0.1 wt % to 5 wt % of the second soft coating layer, and 0.01 wt % to 10 wt % of the carbon nanotube layer.

Example 3

(1) Preparation of first mixture and dried product: Graphite balls and nano-silicon slurry were prepared in the same manner as in Example 1. Next, a dried product was prepared in the same manner as in Example 1 by drying a first mixture comprising the graphite balls and the nano-silicon slurry in a weight ratio of 1:0.5 to 1:5.

(2) Sintered product and primary heat treatment: A sintered product including a hard coating layer formed on the outermost surface thereof and containing amorphous hard carbon was prepared by sintering the dried product at 800° C. to 1,150° C. Next, an intermediate product including a first soft coating layer on an outer circumferential surfaces of the hard coating layer was formed by mixing 100 parts by weight of the sintered product with 1 to 30 parts by weight of a carbon precursor (containing polyimide and dimethylformamide), followed by primary heat treatment at 80° C. to 300° C.

(3) Secondary heat treatment: A carbon nanotube solution was prepared in the same manner as in Example 1. Next, 100 parts by weight of the intermediate product was mixed with 1 to 30 parts by weight of the carbon nanotube solution and 1 to 30 parts by weight of carbon precursor (containing polyimide and dimethylformamide), followed by secondary heat treatment at 80° C. to 300° C. to form a second soft coating layer on an outer circumferential surface of the first soft coating layer, followed by classification using a 325 mesh sieve, thereby preparing an anode material having an average particle diameter (d50) of 8 μm to 11 μm.

The prepared anode material was formed to have a structure including: a core including a porous matrix containing nano-silicon (Si) and amorphous hard carbon; a hard coating layer formed on the outer circumferential surface of the core and containing amorphous hard carbon; a first soft coating layer formed on the outer circumferential surface of the hard coating layer and containing soft carbon; and a second soft coating layer formed on the outer circumferential surface of the first soft coating layer and containing carbon nanotubes and soft carbon.

The anode material included 25 wt % to 55 wt % of the nano-silicon, 5 wt % to 50 wt % of the amorphous hard carbon, 1 wt % to 15 wt % of the hard coating layer, 0.5 wt % to 7.5 wt % of the first soft coating layer, and 0.15 wt % to 15 wt % of the second soft coating layer.

Example 4

(1) Preparation of first mixture and dried product: A dried product was prepared by drying a first mixture comprising graphite balls, a nano-silicon slurry, flake graphite, and pitch in the same manner as in Example 1.

(2) Preparation of primary sintered product and secondary sintered product: A primary sintered product including a first hard coating layer formed on the outermost surface thereof and containing amorphous hard carbon was prepared by mixing 100 parts by weight of the dried product with 1 to 30 parts by weight of pitch, followed by primary sintering at 800° C. to 1,150° C. Next, a secondary sintered product including a second hard coating layer formed on the outer circumferential surface of the first hard coating layer was prepared by mixing 100 parts by weight of the primary sintered product with 1 to 30 parts by weight of pitch, followed by secondary sintering at 800° C. to 1,150° C.

(3) Formation of carbon nanotube layer: A carbon nanotube solution was deposited onto an outer circumferential surface of the second hard coating layer of the secondary sintered product and dried to form a carbon nanotube layer, followed by classification using a 325-mesh sieve, thereby preparing an anode material having an average particle diameter (d50) of 8 μm to 11 μm.

The prepared anode material was formed to have a structure including: a core including a porous matrix containing nano-silicon (Si) and amorphous hard carbon, and flake graphite dispersed in the porous matrix; a first hard coating layer and a second hard coating layer sequentially formed on the outer circumferential surface of the core and each containing amorphous hard carbon; and a carbon nanotube layer formed on the outer circumferential surface of the second hard coating layer.

The anode material included 25 wt % to 55 wt % of nano-silicon, greater than 0 to 60 wt % or less of flake graphite, 5 wt % to 50 wt % of amorphous hard carbon, 0.15 wt % to 35 wt % of the first hard coating layer, 0.1 wt % to 15 wt % of the second hard coating layer, and 0.01 wt % to 10 wt % of the carbon nanotube layer.

Example 5

(1) Preparation of first mixture and dried product: A dried product was prepared by drying a first mixture comprising graphite balls, a nano-silicon slurry, flake graphite, and pitch (in a weight ratio of 1:2 to 8:1 to 15:5 to 70) in the same manner as in Example 1.

(2) Preparation of primary sintered product and intermediate product: A primary sintered product including a first hard coating layer formed on the outermost surface thereof and containing amorphous hard carbon was prepared by primary sintering of the dried product at 800° C. to 1,150° C. Next, an intermediate product including a soft coating layer on an outer circumferential surface of the first hard coating layer was prepared by mixing 100 parts by weight of the primary sintered product with 1 to 30 parts by weight of a carbon precursor (containing polyimide and dimethylformamide), followed heat treatment of the mixture.

(3) Preparation of secondary sintered product and formation of carbon nanotube layer: A secondary sintered product was prepared by mixing 100 parts by weight of the intermediate product with 1 to 30 parts by weight of pitch, followed by secondary sintering at 800° C. to 1,150° C. The secondary sintered product includes a first hard coating layer containing amorphous hard carbon, an amorphous carbon layer, and a second hard coating layer containing amorphous hard carbon sequentially formed on the outermost surface thereof. Next, a carbon nanotube solution was deposited onto an outer circumferential surface of the second hard coating layer of the secondary sintered product and dried to form a carbon nanotube layer, followed by classification using a 325-mesh sieve, thereby preparing an anode material having an average particle diameter (d50) of 8 μm to 11 μm.

The prepared anode material was formed to have a structure including: a core including a porous matrix containing nano-silicon (Si) and amorphous hard carbon, and flake graphite dispersed in the porous matrix; a first hard coating layer formed on the outer circumferential surface of the core and containing amorphous hard carbon; an amorphous carbon layer formed on the outer circumferential surface of the first hard coating layer; a second hard coating layer formed on the outer circumferential surface of the amorphous carbon layer and containing amorphous hard carbon; and a carbon nanotube layer formed on the outer circumferential surface of the second hard coating layer.

The anode material included 25 wt % to 80 wt % of nano-silicon, greater than 0 to 60 wt % or less of flake graphite, 5 wt % to 50 wt % of amorphous hard carbon, 0.3 wt % to 20 wt % of the first hard coating layer, 0.2 wt % to 5 wt % of the amorphous carbon layer, 0.1 wt % to 15 wt % of the second hard coating layer, and 0.01 wt % to 10 wt % of the carbon nanotube layer.

Comparative Example 1

An anode material was prepared in the same manner as in Example 1 except that a carbon nanotube layer was formed on the surface of a sintered product having a hard coating layer formed on the outer circumferential surface thereof and containing amorphous hard carbon.

The prepared anode material was formed to have a structure including: a core including a porous matrix containing nano-silicon (Si) and amorphous carbon, and flake graphite dispersed in the porous matrix; a hard coating layer formed on an outer circumferential surface of the core; and a carbon nanotube layer formed on an outer circumferential surface of the hard coating layer.

The anode material included: 25 wt % to 80 wt % of nano-silicon, 1 wt % to 60 wt % of flake graphite, 5 wt % to 50 wt % of the amorphous hard carbon, 0.1 wt % to 10 wt % of the hard coating layer, and 0.01 wt % to 10 wt % of the carbon nanotube layer.

Property Evaluation (1) Measurement of density, pore characteristics, and specific surface area: The anode materials prepared in Examples and Comparative Examples were measured as to particle density, porosity, pore size, tap density and specific surface area (BET), and measurement results are shown in Table 1. The porosity and the pore size were measured using a pore distribution measurement instrument (Manufacturer: Micromeritics, Product Name: Autopore IV) and the tap density was measured based on an external appearance of the anode material, which was obtained by filling a container with the anode material prepared in each of Examples and Comparative Examples and vibrating the container, using a tap density meter.

(2) Measurement of surface resistance, volume resistance, and conductivity: Surface resistance and volume resistance of the anode materials prepared in Examples and Comparative Examples were measured using a resistance tester (Manufacturer: Mitsubishi, Product Name: LORESTA-GP), and conductivity of the anode materials prepared in Examples and Comparative Examples was measured using a conductivity measurement instrument (Manufacturer: Mitsubishi, Product Name: LORESTA-GP). Measurement results are shown in Table 1.

(3) Measurement of anode expansion ratio: An anode (capacity: 410 mAh/g to 450 mAh/g) was prepared by depositing and drying a slurry mixture (79 wt % of natural graphite, 14.8 wt % of the anode material prepared in each of Examples and Comparative Examples, 1.4 wt % of carboxymethylcellulose (CMC), 1.4 wt % of styrene-butadiene rubber (SBR) and 3.5 wt % of synthetic graphite (SFG6)) on one surface of an anode conductor plate, and a cathode was prepared using lithium. An electrolyte containing 60 wt % of ethylene carbonate (EC), 35 wt % of ethylmethyl carbonate (EMC) and 5 wt % of fluoroethylene carbonate (FEC) with 1 M lithium salt (LiPF$_6$) dissolved therein was prepared. Next, a porous separator was disposed between the cathode and the anode to form an electrode assembly, which in turn was placed inside a case. Then, the electrolyte was injected into the case, thereby preparing a coin half-cell 2032.

For each of the half-cells of Examples and Comparative Examples, an electrode plate having a current density of 2.5 mA/cm$^2$ was manufactured and the thickness of the anode was measured upon charge to 0.01 C/0.01V under CCCV conditions, followed by measurement of an expansion ratio with respect to an initial thickness of the anode. Results are shown in Table 1.

Figure 6:
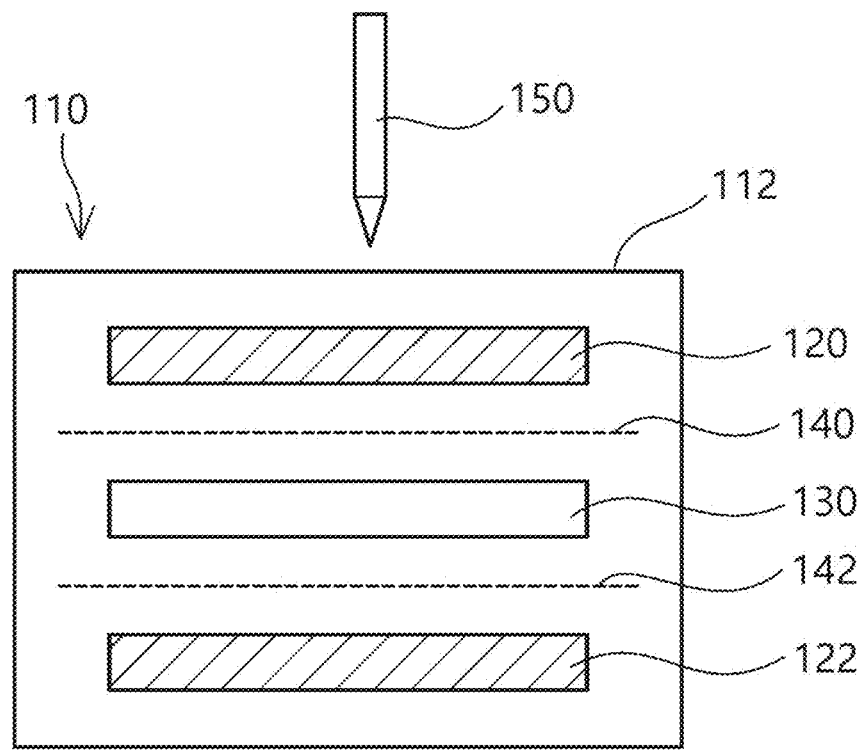
FIG. 6 is a schematic structural view of a secondary battery sample for measurement of volume change of anode materials of Examples 1 and Comparative Example 1 during charging/discharging.

Experimental Example (1): Evaluation as to Volume Change of Anode Material During Charging/Discharging Among the anode materials prepared in Examples and Comparative Examples, the anode materials of Example 1 and Comparative Example 1 were measured as to volume change during charging/discharging. FIG. 6 is a schematic structural view of a secondary battery sample 110 for measurement of volume change of anode materials of Examples 1 and Comparative Example 1 during charging/discharging.

An anode was prepared by depositing and drying the anode material of each of Example 1 and Comparative Example 1 together with a binder onto both surfaces of an anode conductor plate, and a cathode was prepared by depositing NCM622 containing nickel, cobalt and manganese in a weight ratio of 6:2:2 onto a cathode conductor plate. An electrolyte containing 60 wt % of ethylene carbonate (EC), 35 wt % of ethylmethyl carbonate (EMC) and 5 wt % of fluoroethylene carbonate (FEC) with 1 M lithium salt (LiPF$_6$) dissolved therein was prepared.

Next, as shown in FIG. 6, cathodes 120, 122 were placed at both sides of an anode 130 to be spaced apart from each other and porous separators 140, 142 were disposed between the cathodes 120, 122 and the anode 130 to form an electrode assembly, which in turn was placed inside a case 112. Then, the electrolyte (not shown in FIG. 6) was injected into the case 112, thereby preparing a secondary battery sample 110.

For each of the secondary batteries of Examples and Comparative Examples, 100 charge/discharge cycles to 1 C were performed at 45° C. An anode thickness change during charging/discharging was measured using a linear gauge probe 150 and results are shown in FIG. 7.

Figure 7:
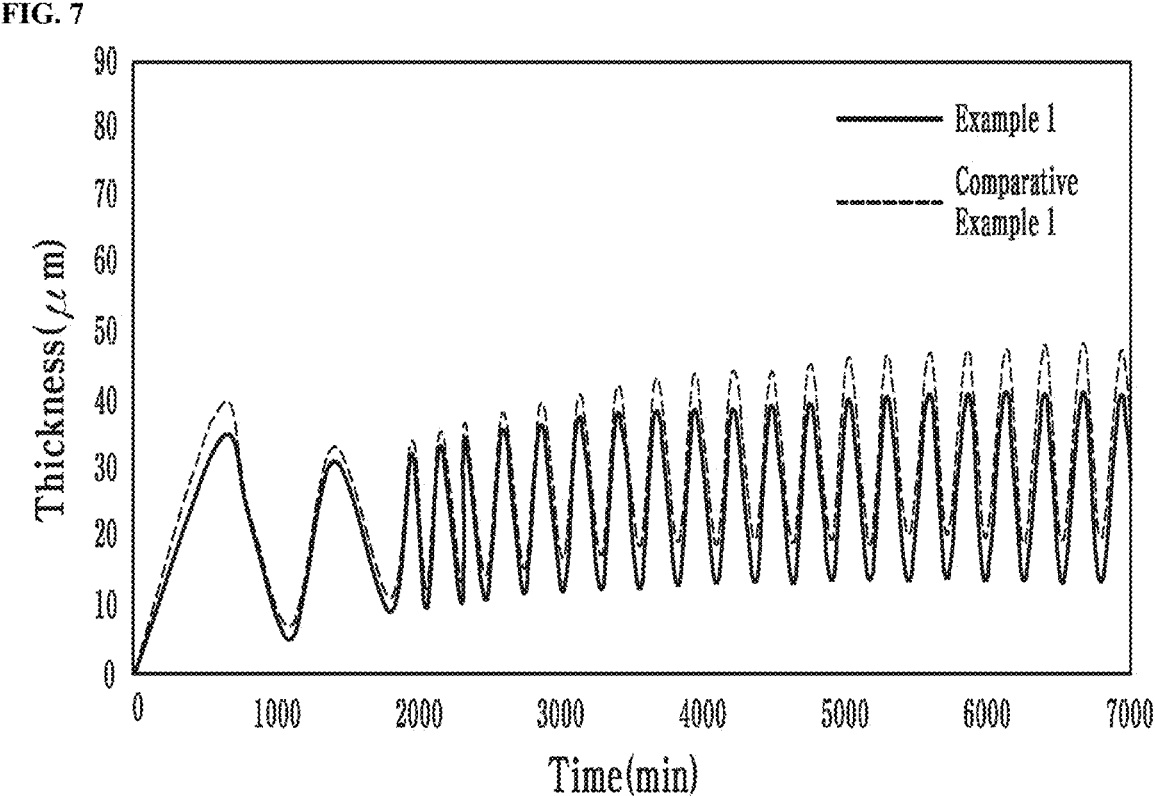
FIG. 7 is a graph depicting volume changes of the anode materials of Examples 1 and Comparative Example 1 during charging/discharging.

FIG. 7 is a graph depicting volume changes of the anode materials of Examples 1 and Comparative Example 1 during charging/discharging. Referring to FIG. 7, the anode material of Example 1 exhibited less volume change than the anode material of Comparative Example 1 during charging/discharging. As a result, it could be seen that the anode

TABLE 1

| Item | Example 1 | Example 2 | Example 3 | Example 4 | Example 5 | Comparative Example 1 |
|---|---|---|---|---|---|---|
| Particle density (g/cm$^3$) | 1.2 to 2 | 1.2 to 2 | 1.2 to 2 | 1.2 to 2 | 1.2 to 2 | 0.8 to 1 |
| Porosity (%) | 25 to 60 | 20 to 50 | 20 to 45 | 30 to 55 | 25 to 50 | 20 to 50 |
| Pore size (μm) | 0.01 to 2 | 0.01 to 2 | 0.01 to 2 | 0.01 to 2 | 0.01 to 2 | 0.01 to 2 |
| Tap density (g/cc) | 0.65 to 1.3 | 0.65 to 1.3 | 0.65 to 1.3 | 0.55 to 1.3 | 0.55 to 1.3 | 0.65 to 1.3 |
| Specific surface area (m$^2$/g) | 3.5 to 15 | 1.5 to 6.0 | 0.8 to 2.5 | 1.5 to 10 | 0.6 to 3.0 | 3.5 to 15 |
| Surface resistance (Ω/sq) | 0.041 | 0.039 | 0.048 | 0.033 | 0.042 | 0.153 |
| Volume resistance (Ω · cm) | 0.022 | 0.021 | 0.026 | 0.018 | 0.029 | 0.083 |
| Electrical conductivity (S/cm) | 45.1 | 47.3 | 38.5 | 55.3 | 43.8 | 12.1 |
| Anode expansion ratio (%) | 15 to 45 | 15 to 45 | 15 to 45 | 15 to 45 | 15 to 45 | 50 or more |

Referring to Table 1, it could be seen that the anode materials of Example 1 to 5 had better electrical conductivity, lower surface/volume resistance, and lower anode expansion ratios than Comparative Example 1.

material according to embodiments of the present invention can prevent breakage and fracture upon intercalation/deintercalation of lithium ions and could minimize deterioration in capacity to secure long lifespan.

Experimental Example (2): Preparation of Lithium Secondary Battery (Coin Type Half-Cell)

An anode (capacity: 484 mAh/g) was prepared by depositing and drying a slurry mixture (79 wt % of natural graphite, 14.8 wt % of the anode material prepared in each of Examples and Comparative Examples, 1.4 wt % of carboxymethylcellulose (CMC), 1.4 wt % of styrene-butadiene rubber (SBR) and 3.5 wt % of synthetic graphite (SFG6)) onto one surface of an anode conductor plate, and a cathode was prepared using lithium. An electrolyte containing 60 wt % of ethylene carbonate (EC), 35 wt % of ethylmethyl carbonate (EMC) and 5 wt % of fluoroethylene carbonate (FEC) with 1 M lithium salt (LiPF$_6$) dissolved therein was prepared.

Next, a porous separator was disposed between the cathode and the anode to form an electrode assembly, which in turn was placed inside a case. Then, the electrolyte was injected into the case, thereby preparing a coin half-cell 2032.

Figure 8:
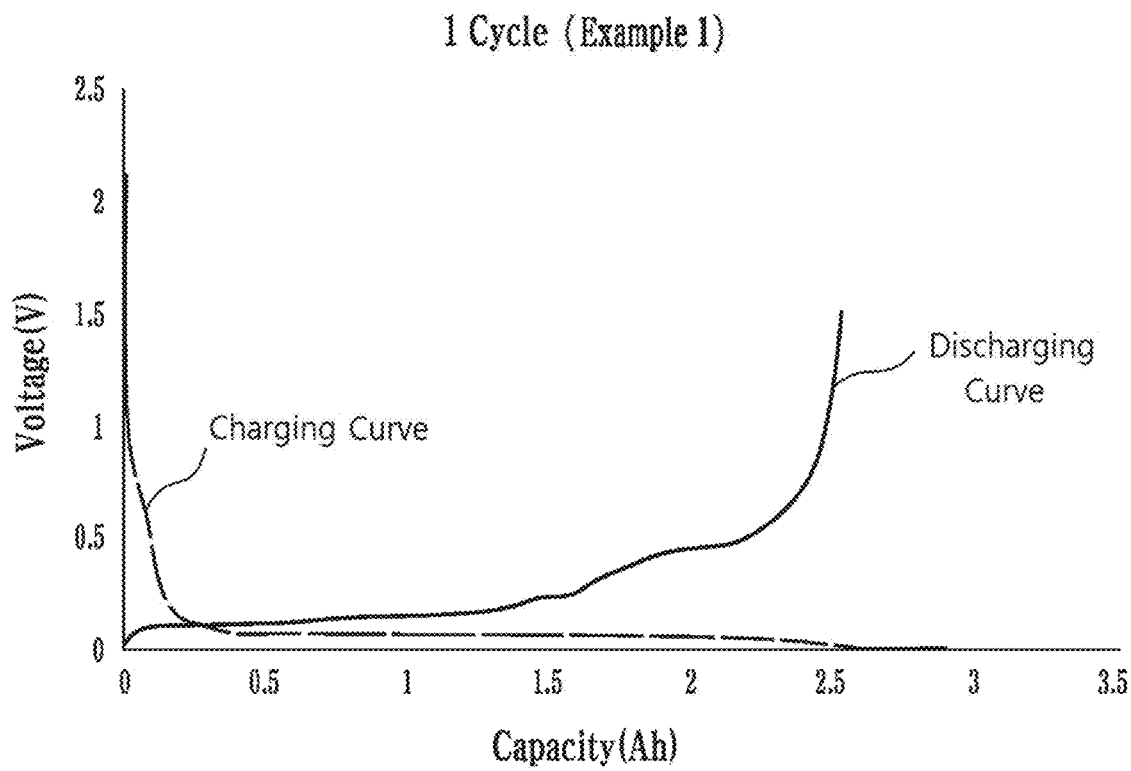
FIG. 8 is a graph for evaluation of capacity characteristics of a coin half-cell of Example 1.

Evaluation of capacity characteristics: Among the half-cells of Examples and Comparative Examples, the half-cell of Example 1 was measured as to capacity characteristics. Specifically, a charge/discharge capacity of the half-cell of Example 1 was measured in the first charge/discharge cycle under conditions of 0.1 C/0.1 C and a measurement result is shown in FIG. 8. In evaluation of capacity characteristics, an upper limit charge voltage at room temperature (25° C.) was set to 4.2V and a discharge termination voltage was set to 2.7V.

FIG. 8 is a graph for evaluation of capacity characteristics of a coin half-cell of Example 1. Referring to FIG. 8, the half-cell of Example 1 had a single-cycle (0.1 C/0.1 C) efficiency of 90.5%. As a result, it could be seen that the anode material of Example 1 had a capacity of 1,265 mAh/g and an efficiency of 87.3%.

Experimental Example (3): Preparation of Lithium Secondary Battery (Coin Full-Cell)

A cathode was prepared by depositing NCM622 containing nickel, cobalt and manganese in a weight ratio of 6:2:2 onto a cathode conductor plate, and an anode (capacity: 485 mAh/g) and an electrolyte were prepared in the same manner as in Experimental Example (1).

Next, a porous separator was disposed between the cathode and the anode to form an electrode assembly, which in turn was placed inside a case. Then, the electrolyte was injected into the case, thereby preparing a coin full-cell (coin full-cell 2032) secondary battery. Here, the secondary battery had an anode/cathode material capacity ratio (N/P ratio) of 1.08 and an anode current density of 3.1 mAh/cm$^2$ (@ 0.1 C).

Figure 9:
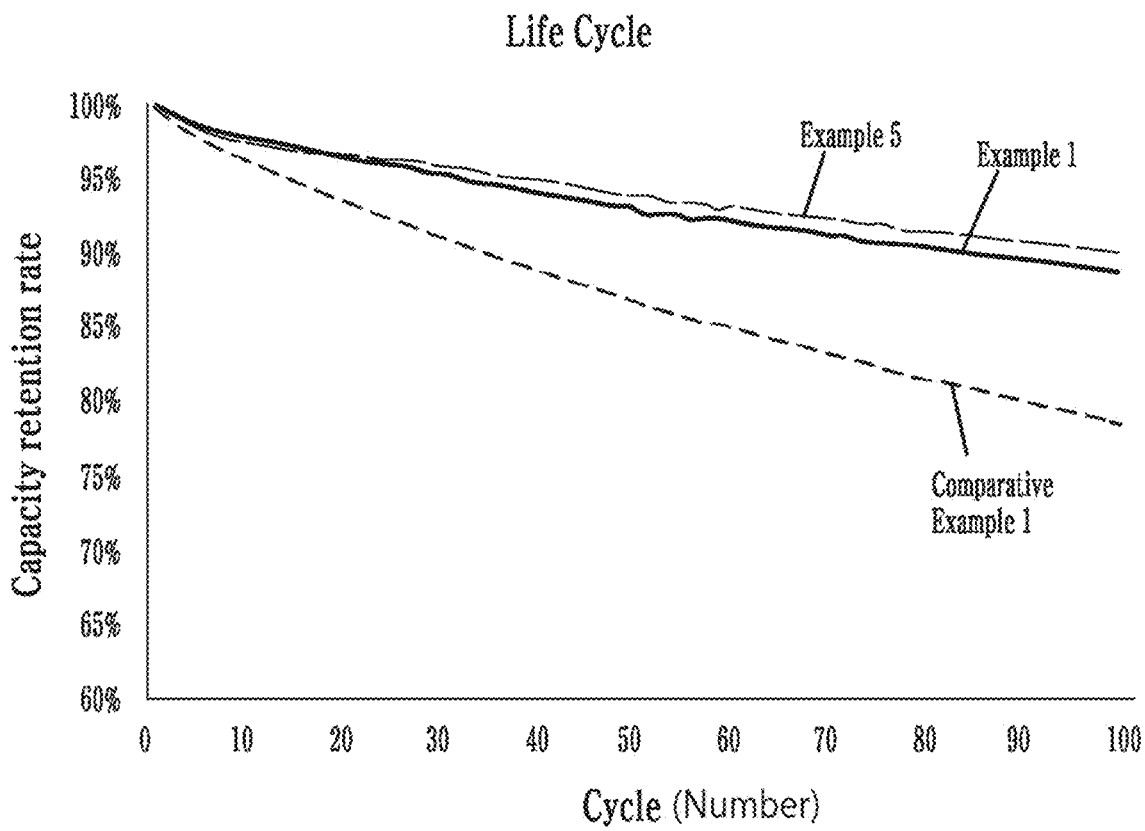
FIG. 9 is a graph depicting capacity retention ratios of coin half-cells of Examples 1 and 5 and Comparative Example 1.

Evaluation of capacity retention ratio: Among the secondary batteries of Examples and Comparative Examples, the secondary batteries of Examples 1, 5 and Comparative Example 1 were evaluated as to capacity retention ratio upon 100 charge/discharge cycles under 1 C/1 C charge/discharge conditions and evaluation results are shown in FIG. 9. FIG. 9 is a graph depicting capacity retention ratios of coin half-cells of Examples 1 and 5 and Comparative Example 1. Referring to FIG. 9, the full-cell of Example 1 had a single-cycle (0.1 C/0.1 C) efficiency of 84.2%. As a result, it could be seen that the anode materials of Examples 1 and 5 had higher capacity retention ratios than the anode material of Comparative Example 1.

Experimental Example (4): Preparation of Lithium Secondary Battery (Pouch Full-Cell)

A cathode, an anode (capacity: 478 mAh/g) and an electrolyte were prepared in the same manner as in Experimental Example (1). Next, a porous separator was disposed between the cathode and the anode to form an electrode assembly, which in turn was placed inside a case. Then, the electrolyte was injected into the case, thereby preparing a pouch full cell (4 cm×5 cm) secondary battery. Here, the secondary battery had an anode/cathode material capacity ratio (N/P ratio) of 1.09, an anode current density of 3.1 mAh/cm$^2$ (@ 0.1 C), and a pouch cell capacity of 1,100 mAh.

Evaluation of efficiency, capacity and lifespan (capacity retention ratio) of secondary battery: Battery efficiency, capacity and lifespan (capacity retention ratio) of each of secondary batteries (pouch full-cells) of Examples and Comparative Examples were evaluated.

In evaluation of the secondary batteries of Examples and Comparative Examples, each cycle was performed under predetermined charge/discharge conditions (charge: 1.0 C, cutoff: 0.05 C and 4.2 V/1.0 C, discharge: 2.7 V) and charge/discharge efficiency was evaluated in one-cycle (0.1 C/0.1 C) and in a standard cycle (1 cycle, 0.2 C/0.2 C) to calculate the capacity of the anode material. Results are shown in Table 2. In evaluation of the capacity retention ratio, the secondary batteries of Example 1 and Comparative Example 1 were operated for 1,000 cycles and evaluation results are shown in FIG. 10.

TABLE 2

| Item | Experimental Example (4)-(Example) | | | | | Comparative Example |
|---|---|---|---|---|---|---|
| | 1 | 2 (half) | 3 | 4 | 5 | 1 |
| Cycle charge/discharge efficiency (0.1 C/0.1 C)(%) | 83.8 | 91.2 | 84.3 | 84.1 | 84.5 | 83.2 |
| Standard cycle charge/discharge efficiency (0.2 C/0.2 C)(%) | 98.9 | 98.7 | 98.7 | 99.0 | 98.8 | 97.9 |
| Anode material capacity (mAh/g) | 495 | 502 | 512 | 488 | 521 | 488 |

Figure 10:
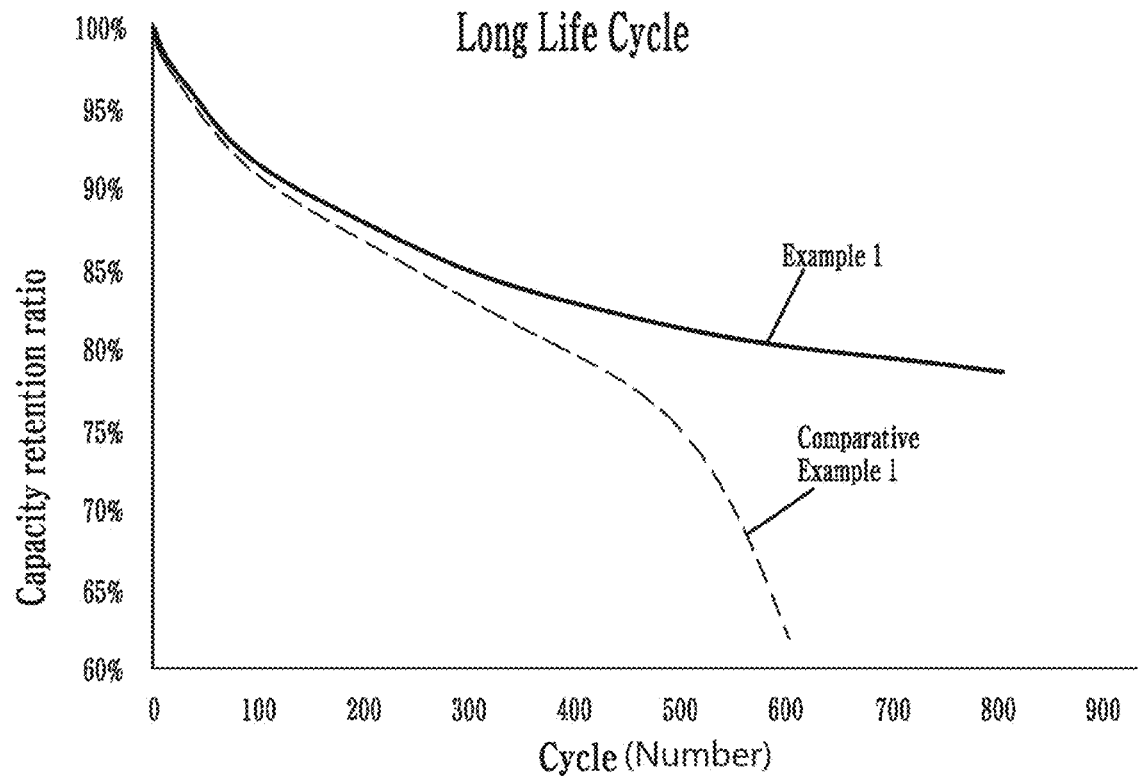
FIG. 10 is a graph depicting capacity retention ratios of pouch full-cells of Example 1 and Comparative Example 1.

FIG. 10 is a graph depicting capacity retention ratios of pouch full-cells of Example 1 and Comparative Example 1. Referring to Table 2 and FIG. 10, it could be seen that the secondary batteries of Examples 1 to 5 had better charge/discharge efficiency and long lifespan characteristics than the secondary battery of Comparative Example 1. The full-cell secondary battery of Example 1 had a formation efficiency of 83.8% in one cycle (0.1 C/0.1 C) and an efficiency of 98.9% in the standard cycle (0.2 C/0.2 C).

Experimental Example (5): Preparation of Lithium Secondary Battery (Pouch Full-Cell)

A pouch cell type lithium secondary battery was prepared. Specifically, an anode was prepared by depositing a mixture of natural graphite, the anode material prepared in each of Examples and a binder onto an anode conductor plate. A cathode was prepared by depositing NCM622 containing nickel, cobalt and manganese in a weight ratio of 6:2:2 on a cathode conductor plate.

Here, an electrolyte was prepared by mixing 90 wt % of a solution containing ethylene carbonate (EC), ethylmethyl carbonate (EMC) and dimethyl carbonate (DMC) in a weight ratio of 3:5:2 with 10 wt % of fluoroethylene carbonate (FEC). $LiPF_6$ was used as a lithium salt and the content of the electrolyte was adjusted to a concentration of 1 M. A conductor plate, a binder, a pouch and the like were prepared using products used in a typical lithium secondary battery. A completed pouch cell had a capacity of about 1,500 mAh.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of preparing an anode material, comprising:
drying a first mixture comprising graphite balls, a nano-silicon slurry, pitch, and flake graphite to prepare a dried product;
sintering the dried product to prepare a sintered product comprising a hard coating layer formed on an outermost surface thereof and containing amorphous hard carbon;
mixing the sintered product with a carbon precursor, followed by heat treatment to form a soft coating layer on an outer circumferential surface of the sintered product; and
forming a carbon nanotube layer on an outer circumferential surface of the soft coating layer.

2. The method according to claim 1, wherein:
the nano-silicon slurry is prepared by dispersing silicon powder and a dispersant in a first solvent to prepare a dispersion, followed by grinding the dispersion;
the graphite balls are prepared by preparing a graphite mixture comprising pitch and graphite, sintering the graphite mixture at 400° C. to 650° C. after compression of the graphite mixture, and grinding the sintered graphite mixture;
the first solvent comprises at least one selected from among water, ethanol, isopropyl alcohol, and potassium hydroxide; and
the graphite mixture further comprising at least one second solvent selected from among N-methyl pyrrolidone, ethanol, and water.

3. The method according to claim 1, wherein the carbon precursor comprises at least one selected from among polyimide, polyacrylonitrile, polyvinyl pyrrolidone, glucose, cellulose, hydrogenated nitrile butadiene rubber, nitrile butadiene rubber, polyvinylidene fluoride, styrene butadiene rubber, and sucrose.

4. The method according to claim 1, wherein the first mixture comprises the graphite balls, flake graphite, pitch and nano-silicon in a weight ratio of 1:2 to 8:1 to 25:5 to 70.

5. A method of preparing an anode material, comprising:
drying a first mixture comprising graphite balls, a nano-silicon slurry, and flake graphite to prepare a dried product;
mixing the dried product with pitch, followed by sintering to prepare a sintered product comprising a hard coating layer formed on an outermost surface thereof and containing amorphous hard carbon;
mixing the sintered product with a carbon precursor, followed by heat treatment to form an intermediate product comprising a first soft coating layer and a second soft coating layer on an inner circumferential surface and an outer circumferential surface of the hard coating layer, respectively; and
forming a carbon nanotube layer on an outer circumferential surface of the intermediate product.

6. A method of preparing an anode material, comprising:
drying a first mixture comprising graphite balls and a nano-silicon slurry to prepare a dried product;
sintering the dried product to prepare a sintered product comprising a hard coating layer formed on an outermost surface thereof and containing amorphous hard carbon;
mixing the sintered product with a carbon precursor, followed by primary heat treatment to form an intermediate product comprising a first soft coating layer on an outer circumferential surface of the hard coating layer; and
mixing the intermediate product with carbon nanotubes and a carbon precursor, followed by secondary heat treatment to form a second soft coating layer on an outer circumferential surface of the first soft coating layer.

7. A method of preparing an anode material, comprising:
drying a first mixture comprising graphite balls, a nano-silicon slurry, flake graphite, and pitch to prepare a dried product;
mixing the dried product with pitch, followed by primary sintering to form a primary sintered product comprising a first hard coating layer formed on an outermost surface thereof and containing amorphous hard carbon;
mixing the primary sintered product with pitch, followed by secondary sintering to form a secondary sintered product comprising a second hard coating layer on an outer circumferential surface of the first hard coating layer; and
forming a carbon nanotube layer on an outer circumferential surface of the secondary sintered product.

8. A method of preparing an anode material, comprising:
drying a first mixture comprising graphite balls, a nano-silicon slurry, pitch, and flake graphite to prepare a dried product;
performing primary sintering of the dried product to form a primary sintered product comprising a first hard coating layer formed on an outermost surface thereof and containing amorphous hard carbon;
mixing the primary sintered product with a carbon precursor, followed by heat treatment to form an intermediate product comprising a soft coating layer on an outer circumferential surface of the first hard coating layer;
mixing the intermediate product with pitch, followed by secondary sintering to form a secondary sintered product; and
forming a carbon nanotube layer on an outer circumferential surface of the secondary sintered product,
wherein the secondary sintered product comprises a first hard coating layer containing amorphous hard carbon, an amorphous carbon layer, and a second hard coating layer containing amorphous hard carbon sequentially formed on an outermost surface thereof.

9. An anode material comprising:
a core comprising a porous matrix containing nano-silicon and amorphous hard carbon, and flake graphite dispersed in the porous matrix;
a hard coating layer formed on an outer circumferential surface of the core and containing amorphous hard carbon;
a soft coating layer formed on an outer circumferential surface of the hard coating layer; and
a carbon nanotube layer formed on an outer circumferential surface of the soft coating layer.

10. The anode material according to claim 9, comprising: 25 wt % to 80 wt % of the nano-silicon, 1 wt % to 60 wt % of the flake graphite, 5 wt % to 50 wt % of the amorphous hard carbon, 0.1 wt % to 10 wt % of the hard coating layer, 0.1 wt % to 5 wt % of the soft coating layer, and 0.01 wt % to 10 wt % of the carbon nanotube layer.

11. An anode material comprising:
a core comprising a porous matrix containing nano-silicon and amorphous hard carbon, and flake graphite dispersed in the porous matrix;
a first soft coating layer formed on an outer circumferential surface of the core;
a hard coating layer formed on an outer circumferential surface of the first soft coating layer and containing amorphous hard carbon;
a second soft coating layer formed on an outer circumferential surface of the hard coating layer; and
a carbon nanotube layer formed on an outer circumferential surface of the second soft coating layer.

12. The anode material according to claim 11, comprising: 25 wt % to 80 wt % of the nano-silicon, 60 wt % or less of the flake graphite, 5 wt % to 50 wt % of the amorphous hard carbon, 0.1 wt % to 10 wt % of the hard coating layer, 0.1 wt % to 15 wt % of the first soft coating layer, 0.1 wt % to 15 wt % of the second soft coating layer, and 0.01 wt % to 10 wt % of the carbon nanotube layer.

13. An anode material comprising:
a core comprising a porous matrix containing nano-silicon and amorphous hard carbon;
a hard coating layer formed on an outer circumferential surface of the core and containing amorphous hard carbon;
a first soft coating layer formed on an outer circumferential surface of the hard coating layer and containing soft carbon; and
a second soft coating layer formed on an outer circumferential surface of the first soft coating layer and containing carbon nanotubes and soft carbon.

14. The anode material according to claim 13, comprising: 25 wt % to 80 wt % of the nano-silicon, 5 wt % to 50 wt % of the amorphous hard carbon, 0.1 wt % to 15 wt % of the hard coating layer, 0.1 wt % to 15 wt % of the first soft coating layer, and 0.1 wt % to 15 wt % of the second soft coating layer.

15. An anode material comprising:
a core comprising a porous matrix containing nano-silicon and amorphous hard carbon, and flake graphite dispersed in the porous matrix;
a first hard coating layer and a second hard coating layer sequentially formed on an outer circumferential surface of the core and each containing amorphous hard carbon; and
a carbon nanotube layer formed on an outer circumferential surface of the second hard coating layer,
wherein the first hard coating layer has higher hardness than the second hard coating layer.

16. The anode material according to claim 15, comprising: 25 wt % to 80 wt % of the nano-silicon, 60 wt % or less of the flake graphite, 5 wt % to 50 wt % of the amorphous hard carbon, 0.1 wt % to 35 wt % of the first hard coating layer, 0.1 wt % to 35 wt % of the second hard coating layer, and 0.01 wt % to 10 wt % of the carbon nanotube layer.

17. An anode material comprising:
a core comprising a porous matrix containing nano-silicon and amorphous hard carbon, and flake graphite dispersed in the porous matrix;
a first hard coating layer formed on an outer circumferential surface of the core and containing amorphous hard carbon;
an amorphous carbon layer formed on an outer circumferential surface of the first hard coating layer;
a second hard coating layer formed on an outer circumferential surface of the amorphous carbon layer and containing amorphous hard carbon; and
a carbon nanotube layer formed on an outer circumferential surface of the second hard coating layer,
wherein each of the first hard coating layer and the second hard coating layer has higher hardness than the amorphous carbon layer.

18. The anode material according to claim 17, comprising: 25 wt % to 80 wt % of the nano-silicon, 60 wt % or less of the flake graphite, 5 wt % to 50 wt % of the amorphous hard carbon, 0.1 wt % to 35 wt % of the first hard coating layer, 0.1 wt % to 15 wt % of the amorphous carbon layer, 0.1 wt % to 35 wt % of the second hard coating layer, and 0.01 wt % to 10 wt % of the carbon nanotube layer.

19. A secondary battery comprising:
a cathode;
an anode; and
an electrolyte disposed between the cathode and the anode,
wherein the anode comprises the anode material according to claim 9.

20. The secondary battery according to claim 19, wherein, in performance evaluation of a full-cell secondary battery comprising the anode, the cathode comprising an active material oxide, and the electrolyte,
the anode being formed to have a capacity of 410 mAh/g or more (with reference to a value measured at a cutoff voltage of 1.5V in evaluation of a half-cell comprising a lithium (Li) electrode as a cathode),
the active material oxide having a structure of $LiNi_xCo_yMn_zO_2$ (x, y and z satisfying x+y+z=1, 0.50<x<0.91, 0.04<y<0.25, and 0.04<z<0.35),
capacity of the cathode comprising the active material oxide (with reference to a value measured at a cutoff voltage of 4.2 V in evaluation of a half-cell comprising a lithium (Li) electrode as a cathode) and capacity of the anode comprising the anode material satisfying a relation: 1.04<anode capacity/cathode capacity <1.17,
the electrolyte comprising 1.1 M $LiPF_6$ and 0.1 M LiBOB and containing ethyl carbonate (EC)/ethyl methyl carbonate (EMC)/fluoroethylene carbonate (FEC) in a weight ratio of 65%/30%/5% (in unit of wt %),
the performance evaluation being carried out under conditions that the full-cell secondary battery is operated at a voltage of 2.50 V to 4.20 V for 600 or more charge/discharge cycles and charging/discharging is performed to have a capacity of 0.1 C for a first cycle and is performed to have a capacity of 1.0 C for subsequent 20 cycles (second to twenty-first cycles), wherein the anode material is maintained at 4.2 V until charge current reaches 0.05 C to complete charging in each cycle.

\* \* \* \* \*